(12) United States Patent
Iwami et al.

(10) Patent No.: US 10,377,230 B2
(45) Date of Patent: Aug. 13, 2019

(54) FILLER CAP FOR FUEL TANK

(71) Applicants: Masao Iwami, Ota (JP); Masashi Iwami, Ota (JP)

(72) Inventors: Masao Iwami, Ota (JP); Masashi Iwami, Ota (JP)

( * ) Notice: Subject to any disclaimer, the term of this patent is extended or adjusted under 35 U.S.C. 154(b) by 131 days.

(21) Appl. No.: 15/377,352

(22) Filed: Dec. 13, 2016

(65) Prior Publication Data

US 2017/0166047 A1    Jun. 15, 2017

(30) Foreign Application Priority Data

Dec. 14, 2015 (JP) .................................. 2015-243662
Dec. 7, 2016 (JP) .................................. 2016-238013

(51) Int. Cl.

| | |
|---|---|
| *B60K 15/035* | (2006.01) |
| *F16K 24/04* | (2006.01) |
| *B60K 15/04* | (2006.01) |
| *F16K 24/06* | (2006.01) |
| *B60K 15/03* | (2006.01) |

(52) U.S. Cl.
CPC ........ *B60K 15/03504* (2013.01); *B60K 15/04* (2013.01); *B60K 15/0406* (2013.01); *F16K 24/04* (2013.01); *F16K 24/06* (2013.01); *B60K 2015/03296* (2013.01)

(58) Field of Classification Search
CPC .......... B60K 15/03504; B60K 15/0406; B60K 15/04; B60K 2015/03296; F16K 24/06; F16K 24/04
See application file for complete search history.

(56) References Cited

U.S. PATENT DOCUMENTS

| 4,696,409 A | 9/1987 | Vize | |
|---|---|---|---|
| 4,716,920 A * | 1/1988 | Crute ................. | B60K 15/0406 137/39 |
| 4,735,226 A | 4/1988 | Szlaga | |

(Continued)

FOREIGN PATENT DOCUMENTS

| JP | S60-072782 U | 5/1985 |
|---|---|---|
| JP | H03-123971 U | 12/1991 |
| JP | H05-133287 A | 5/1993 |
| JP | H06-219461 A | 8/1994 |

(Continued)

*Primary Examiner* — James N Smalley
(74) *Attorney, Agent, or Firm* — Oliff PLC

(57) ABSTRACT

A filler cap for a fuel tank is disclosed that can prevent environmental pollution and also improve fuel consumption without discharging fuel or harmful gas evaporated therefrom to an exterior of the fuel tank, until a pressure in the fuel tank reaches a predetermined value. In summary, immediately after attaching the filler cap to a fill opening, pressures are balanced between an interior and an exterior of the fuel tank. A spring raises a valve body and the rise/fall member, so that a lateral outer circumference of the valve body point contacts with plural convex portions of a second side wall, thereby closing the valve portion. In such a state, coming and going of a fluid between a first space and an opening is not allowed. When a pressure in the fuel tank reaches 5 kPa, the fluid rise a first air passage formed in spaces between respective convex portions on the second side wall, passing the valve portion. Rising fluid lowers the valve body to allow discharging an excessive pressure to the exterior of the fuel tank.

1 Claim, 17 Drawing Sheets

(56) References Cited

U.S. PATENT DOCUMENTS

| | | | |
|---|---|---|---|
| 4,736,863 A * | 4/1988 | Harris | B60K 15/03519 |
| | | | 137/533.11 |
| 4,796,777 A | 1/1989 | Keller | |
| 4,913,303 A | 4/1990 | Harris | |
| 4,922,954 A | 5/1990 | Blomquist et al. | |
| 5,148,934 A | 9/1992 | Kasugai et al. | |
| 5,518,018 A * | 5/1996 | Roetker | B60K 15/03519 |
| | | | 137/43 |
| 6,866,056 B1 | 3/2005 | Scott | |
| 7,578,405 B2 | 8/2009 | Hagano | |
| 7,654,403 B2 | 2/2010 | DeCapua et al. | |
| 7,823,611 B2 | 11/2010 | Iwami et al. | |
| 8,353,418 B2 | 1/2013 | Bork | |
| 8,657,140 B2 | 2/2014 | Iwami et al. | |
| 2006/0254641 A1 * | 11/2006 | Callahan | A01D 34/82 |
| | | | 137/43 |
| 2008/0000543 A1 * | 1/2008 | Iwami | B60K 15/03519 |
| | | | 141/325 |
| 2015/0360561 A1 | 12/2015 | Iwami et al. | |

FOREIGN PATENT DOCUMENTS

| | | |
|---|---|---|
| JP | H07-034985 A | 2/1995 |
| JP | 2005-163690 A | 6/2005 |
| JP | 2006-046136 A | 2/2006 |
| JP | 2007-255386 A | 10/2007 |
| JP | 2008-7095 A | 1/2008 |
| JP | 2010-064593 A | 3/2010 |
| JP | 5030152 B2 | 9/2012 |
| JP | 5749636 B2 | 7/2015 |
| JP | 2016-003027 A | 1/2016 |

* cited by examiner

FILLER CAP FOR FUEL TANK

TECHNICAL FIELD

The present invention relates to a filler cap for a fuel tank provided in automobile etc. and opening/closing a fuel filler port.

BACKGROUND ART

Conventionally, the filler cap for the fuel tank of an internal-combustion engine is provided in the automobile that is required to draw an atmosphere therein by the volume corresponding to a fuel consumed in the fuel tank. For such drawing, an air passage for drawing the atmosphere is provided in the filler cap.

For this reason, when the fuel tank provided in the automobile etc. inclines at more than a predetermined angle, there was a danger of the fuel leaking from the air passage and catching fire.

In view of the above, the applicant has proposed a filler cap (refer to patent documents 1 and 2). When the fuel tank inclines at the predetermined angle, this filler cap can securely suppress the inconvenience that the fuel in the fuel tank flows out of the air passage provided in a main body of the filler cap.

In the filler cap disclosed in the above patent documents 1 and 2, with the fuel tank inclined at the predetermined angle and the fuel flowing into a cylinder main body, when a float constituting a valve mechanism portion provided in the air passage floats externally, a sphere also constituting the valve mechanism portion is pressed on a reduced-diameter portion of the cylinder main body by the float, thereby closing the air passage. However, in the state where the above fuel tank is not inclined, harmful gas evaporated from the fuel may be discharged to an exterior of the fuel tank from a gap existed between a piston and an inner surface of the cylinder main body. This harmful gas has a problem of causing environmental pollution that leads to difficulty in a consumption improvement of the fuel.

PRIOR ART DOCUMENT

[Patent document 1] Japanese Patent No. 5,030,152
[Patent documents 2] U.S. Pat. No. 7,823,611

SUMMARY

In view of the above situation, an embodiment has a first object to provide a filler cap for a fuel tank that does not discharge the harmful gas evaporated or the fuel to an exterior of the fuel tank, until pressure in the fuel tank reaches a predetermined value, thereby preventing environmental pollution and also improving a fuel consumption. The embodiment has a second object to provide a filler cap for a fuel tank that does not discharge the fuel to the exterior of the fuel tank, when the fuel flows into from the fuel tank due to the inclination of the fuel tank at a predetermined angle, thereby preventing the environmental pollution and also improving the fuel consumption.

In a first aspect, an embodiment provides a filler cap for a fuel tank attached to the fuel tank, the filler cap comprising a cap main body including an outer cap and an inner cap, the filler cap having an air passage for communicating an interior and an exterior of the fuel tank, and a valve mechanism portion disposed in the air passage, the valve mechanism portion comprising:
a cylinder main body generally centrally disposed inside the inner cap, the cylinder main body formed with a cylindrical first space communicated with the interior of the fuel tank, a second space of truncated cone shape communicated with the first space from above, and an opening communicated with the second space from above and communicated with the exterior of the fuel tank at an upper surface, the cylinder main body formed with, on an inner surface that forms the second space, plural convex portions elongate in an up/down direction and protruding inwardly with keeping an interval to form a first air passage between respective convex portions, or on the inner surface, plural concave portions elongate in the up/down direction with keeping an interval to form a second air passage;

a rise/fall member of end closed hollow cylindrical shape having an upper surface and opened at a lower surface, the rise/fall member having a large-diameter portion at lower part and being accommodated in the first space, and a small-diameter portion of truncated cone shape in an outer profile at an upper part and accommodated in the second space;

a spherical valve body placed on an upper surface of the small-diameter portion of the rise/fall member, a lateral outer circumference of the valve body point contacting with the plural convex portions protruded to the inner surface of the cylinder main body that forms the second space, or the lateral outer circumference line contacting with the inner surface of the cylinder main body that forms the second space; and an urge member disposed in a space of the large-diameter portion of the rise/fall member, the urge member pushing up the rise/fall member so that the lateral outer circumference of the valve body placed on the small-diameter portion is pressed onto the plural convex portions for urging a point-contact therewith, or pushing up the rise/fall member so that the lateral outer circumference of the valve body placed on the small-diameter portion is pressed onto the inner surface of the cylinder main body for urging a line-contact therewith, wherein a valve portion is comprised of (a) a part of the lateral outer circumference of the valve body on the rise/fall member located between the point-contact positions, where the lateral outer circumference of the valve body is pressed onto the plural convex portions, that is not point contacted, or (b) a part of the lateral outer circumference of the valve body located between line-contact positions on the rise/fall member, where the lateral outer circumference of the valve body is pressed onto the inner surface, that is not line contacted, and (c) a first communication port that is a cut port of the first air passage obtained by cutting the inner surface and the both convex portions respectively adjacent to the inner surface forming the first air passage, by a surface obtained by outwardly extending a surface formed by connecting a center of the valve body and the lateral outer circumference, or (d) a second communication port that is a cut port of the second air passage obtained by cutting a plane for forming concave portions to form the second air passage, by a surface obtained by outwardly extending a surface formed by connecting a center of the valve body and the lateral outer circumference, in a state where the lateral outer circumference of the valve body on the rise/fall member is pressed onto the convex portions for point contacting therewith, or in a state where the lateral outer circumference of the valve body on the rise/fall member is pressed onto the inner surface of the cylinder main body for line contacting therewith, with increase of a pressure in the fuel tank due to an evaporated gas resulted from a vaporized fuel in the fuel tank, when the pressure in the fuel tank reaches a predetermined pressure value set based on a first passage resistance or a second passage resistance set up based on an area size of the valve portion constituted of the part of the lateral outer circumference not point contacted or the part of the lateral outer circumference not line contacted and the first communication port or the second communication port, and a magnitude of an urge force of the urge member that is more than a total weight of the valve body and the rise/fall member, the evaporated gas rises in the first air passage against the first passage resistance, or in the second air passage against the second passage resistance, passing through the valve portion, and the rising evaporated gas lowers the valve body and the rise/fall member downwardly against the urge force of the urge member, and opens the valve portion to discharge an excessively large pressure in the fuel tank to the exterior of the fuel tank through the first space, the second space and the opening.

In a second aspect, an embodiment provides a filler cap for a fuel tank attached to the fuel tank, the filler cap comprising a cap main body including an outer cap and an inner cap, the filler cap having an air passage for communicating an interior and an exterior of the fuel tank, and a valve mechanism portion disposed in the air passage, the valve mechanism portion comprising:

a cylinder main body generally centrally disposed inside the inner cap, the cylinder main body formed with a cylindrical first space communicated with the interior of the fuel tank, a second space of truncated cone shape communicated with the first space from above, and an opening communicated with the second space from above and communicated with the exterior of the fuel tank at an upper surface, the cylinder main body formed with, on an first inner surface that forms the second space, plural convex portions elongate in an up/down direction and protruding inwardly with keeping an interval to form a first air passage between respective convex portions, or on the first inner surface, plural concave portions elongate in the up/down direction with keeping an interval to form a second air passage;

a rise/fall member of end closed hollow cylindrical shape having an upper surface and opened at a lower surface to form a space inside, the rise/fall member having a large-diameter portion at lower part and being accommodated in the first space, and a small-diameter portion of truncated cone shape in an outer profile at an upper part and accommodated in the second space;

a spherical valve body placed on an upper surface of the small-diameter portion of the rise/fall member, a lateral outer circumference of the valve body point contacting with the plural convex portions protruded to the first inner surface of the cylinder main body that forms the second space, or the lateral outer circumference line contacting with the first inner surface of the cylinder main body that forms the second space;

a coil spring disposed in the space of the rise/fall member, the coil spring pushing up the rise/fall member so that the lateral outer circumference of the valve body placed on the small-diameter portion is pressed onto the plural convex portions for urging a point-contact therewith, or pushing up the rise/fall member so that the lateral outer circumference of the valve body placed on the small-diameter portion is pressed onto the first inner surface of the cylinder main body for urging a line-contact therewith, a blow-up member of hollow cylindrical shape including a small-diameter portion loosely inserted into the coil spring accommodated in the space of the rise/fall member and formed a small-diameter space, a step portion having a diameter larger than that of the small-diameter portion and supporting a lower portion of the coil spring on an upper surface, and a large-diameter portion having a diameter larger than that of the step portion and formed with a large-diameter space communicated with the small diameter space;

a resistance member for reducing the pressure of an evaporated gas or a fuel from the fuel tank, the resistance member including a lower portion of circular shape in a planar view having a communication port communicated with the small-diameter space of the blow-up member and the fuel tank, and a cylindrical upper portion centrally studded on an upper surface of the lower portion, the lower portion being accommodated in the large-diameter space of the blow-up member to the undersurface of the step portion with abutting an upper surface peripheral portion of the lower portion, and the upper portion being accommodated in the small-diameter space with separated from a second inner surface defining the small-diameter space, wherein a valve portion is comprised of (a) a part of the lateral outer circumference of the valve body on the rise/fall member located between the point-contact positions, where the lateral outer circumference of the valve body is pressed onto the plural convex portions, that is not point contacted, or (b) a part of the lateral outer circumference of the valve body located between line-contact positions on the rise/fall member, where the lateral outer circumference of the valve body is pressed onto the first inner surface, that is not line contacted, and (c) a first communication port that is a cut port of the first air passage obtained by cutting the first inner surface and the both convex portions respectively adjacent to the first inner surface forming the first air passage, by a surface obtained by outwardly extending a surface formed by connecting a center of the valve body and the lateral outer circumference, or (d) a second communication port that is a cut port of the second air passage obtained by cutting a plane for forming concave portions to form the second air passage, by a surface obtained by outwardly extending a surface formed by connecting a center of the valve body and the lateral outer circumference, and in a state where the lateral outer circumference of the valve body on the rise/fall member is pressed onto the convex portions for point contacting therewith, or in a state where the lateral outer circumference of the valve body on the rise/fall member is pressed onto the first inner surface of the cylinder main body for line contacting therewith, with increase of a pressure in the fuel tank due to the evaporated gas resulted from a vaporized fuel or an expansion of the fuel in the fuel tank, when the pressure in the fuel tank reaches a predetermined pressure value set based on a first passage resistance or a second passage resistance set up based on an area size of the valve portion constituted of the part of the lateral outer circumference not point contacted or the part of the lateral outer circumference not line contacted and the first communication port or the second communication port, and a magnitude of an urge force of the coil spring that is more than a total weight of the valve body and the rise/fall member, the evaporated gas or the expanded fuel rises through the communication port of the resistance member, the small-diameter space of the blow-up member, a gap between a lower end of the rise/fall member and the large-diameter portion of the blow-up member, a gap between the rise/fall member and the cylinder main body, in the first air passage against the first passage resistance or in the second air passage against the second passage resistance, passing through the valve portion, and the rising evaporated gas or the rising expanded fuel lowers the valve body and the rise/fall member downwardly against the urge force of the coil spring, and opens the valve portion to discharge an excessively large pressure in the fuel tank to the exterior of the fuel tank through the first space, the second space and the opening.

In a third aspect, an embodiment provides a filler cap for a fuel tank attached to the fuel tank, the filler cap comprising a cap main body including an outer cap and an inner cap, the filler cap having an air passage for communicating an interior and an exterior of the fuel tank, and a valve mechanism portion disposed in the air passage, the valve mechanism portion comprising:
a cylinder main body generally centrally disposed inside the inner cap, the cylinder main body formed with a cylindrical first space communicated with the interior of the fuel tank, a second space of truncated cone shape communicated with the first space from above, and an opening communicated with the second space from above and communicated with the exterior of the fuel tank at an upper surface, the cylinder main body formed with, on an inner surface that forms the second space, plural convex portions elongate in an up/down direction and protruding inwardly with keeping an interval to form a first air passage between respective convex portions, or on the inner surface plural, concave portions elongate in the up/down direction with keeping an interval to form a second air passage;

a rise/fall member of end closed hollow cylindrical shape having an upper surface and opened at a lower surface to form a space inside, the rise/fall member having a large-diameter portion at lower part and being accommodated in the first space, and a small-diameter portion of truncated cone shape in an outer profile at an upper part and accommodated in the second space;

a spherical valve body placed on an upper surface of the small-diameter portion of the rise/fall member in a state a lateral outer circumference capable of point contacting with the plural convex portions protruded to the inner surface of the cylinder main body that forms the second space, or in a state the lateral outer circumference of the valve body capable of line contacting with the inner surface of the cylinder main body that forms the second space;

a coil spring disposed in the space of the rise/fall member for pushing up the rise/fall member to allow the lateral outer circumference of the valve body placed on the small-diameter portion to be pressed onto the plural convex portions for point contacting therewith, or for pushing up the rise/fall member to allow the lateral outer circumference of the valve body placed on the small-diameter portion to be pressed onto the inner surface of the cylinder main body for line contacting therewith;

a blow-up member of hollow cylindrical shape including a small-diameter portion loosely inserted into the coil spring accommodated in the space of the rise/fall member and formed a small-diameter apace, a step portion having a diameter larger than that of the small-diameter portion and supporting a lower portion of the coil spring on an upper surface, and a large-diameter portion having a diameter larger than that of the step portion, being formed with a large-diameter space communicated with the small—diameter space, and being accommodated in a space formed in a bottom wall of the inner cap; and a resistance member of circular shape in a planar view having a communication port communicated with the large-diameter space of the blow-up member and the fuel tank, the resistance member being accommodated in the space formed in the bottom wall of the inner cap with abutting to an undersurface of the large-diameter portion of the blow-up member;

wherein a valve portion is comprised of (a) a part of the lateral outer circumference of the valve body on the rise/fall member located between the point-contact positions, where the lateral outer circumference of the valve body is pressed onto the plural convex portions, that is not point contacted, or (b) a part of the lateral outer circumference of the valve body located between line-contact positions on the rise/fall member, where the lateral outer circumference of the valve body is pressed onto the inner surface, that is not line contacted, and (c) a first communication port that is a cut port of the first air passage obtained by cutting the inner surface and the both convex portions respectively adjacent to the inner surface forming the first air passage, by a surface obtained by outwardly extending a surface formed by connecting a center of the valve body and the lateral outer circumference, or (d) a second communication port that is a cut port of the second air passage obtained by cutting a plane for forming concave portions to form the second air passage, by a surface obtained by outwardly extending a surface formed by connecting a center of the valve body and the lateral outer circumference, and in a state where the rise/fall member and the valve body are lowered by the urge force that is less than a total weight of the valve body and the rise/fall member with compressing the coil spring, and the lateral outer circumference of the valve body on the rise/fall member is not point contacted with the plural convex portions, or the lateral outer circumference of the valve body on the rise/fall member is not line contacted with the inner surface of the cylinder main body thereby opening the valve portion, in an inclined state of the fuel tank, a weight of the rise/fall member and the valve body applied to the coil spring decreases according to the inclined angle, when the coil spring expands its length to have a predetermined length, the valve body contacts with the convex portions on the inner surface or contacts with the inner surface of the cylinder main body, and the fuel spouts, after a pressure reduction at the communication port of the resistance member, into the space of the rise/fall member from the small-diameter space of the blow-up member, so that the spouted fuel pushes up the valve body and the rise/fall member thereby closing the valve portion together with the urge force of the coil spring.

In a fourth aspect, an embodiment provides A valve body device for a fuel tank, comprising a filler cap and a valve mechanism element, the filler cap opening/closing a fill opening provided on an upper surface of the fuel tank storing a fuel to be supplied to an engine, and interrupting communication of the fuel tank and an atmosphere through the fill opening in a closure of the fill opening, the valve mechanism element including:
a cylinder main body composed of a cylindrical outer cylinder main body portion, an inner cylinder main body portion being generally centrally connected to a lower part of the outer cylinder main body portion via a connection portion and being formed with a storage portion in an upper part thereof, and an attaching portion having a step stepped below relative to the connection portion at a lower end part of the outer cylinder main body portion and extending outwardly, the inner cylinder main body portion being formed with a first cylindrical space, a second space of truncated cone shape communicated with the first space from above, a third space being formed by cutting and removing an inner end part of the connection portion and a lower end part of the inner cylinder main body portion and communicated with the first space from below, a fourth space formed by stepping the connecting portion and the attaching portion and connected to the third space from below, and an opening for communicating the second space with the exterior of the fuel tank, the cylinder main body being formed with, on a first inner surface that forms the second space, plural convex portions elongate in an up/down direction and protruding inwardly with keeping an interval to form a first air passage between respective convex portions, or, on the first inner surface, plural concave portions elongate in the up/down direction with keeping an interval to form a second air passage;

a rise/fall member of end closed hollow cylindrical shape having an upper surface and opened at a lower surface to form a space inside, the rise/fall member having a large-diameter portion at lower part and being accommodated in the first space, and a small-diameter portion of truncated cone shape in an outer profile at an upper part and accommodated in the second space;

a spherical valve body placed on an upper surface of the small-diameter portion of the rise/fall member, in a state a lateral outer circumference of the valve body capable of point contacting with the plural convex portions protruded to the first inner surface of the cylinder main body that forms the second space, or in a state the lateral outer circumference capable of line contacting with the first inner surface of the cylinder main body that forms the second space;

a coil spring disposed in the space of the rise/fall member for pushing up the rise/fall member to allow the lateral outer circumference of the valve body placed on the small-diameter portion to be pressed onto the plural convex portions for point contacting therewith, or for pushing up the rise/fall member to allow the lateral outer circumference of the valve body placed on the small-diameter portion to be pressed onto the inner surface of the cylinder main body for line contacting therewith;

a blow-up member of hollow cylindrical shape including a small-diameter portion loosely inserted into the coil spring accommodated in the space of the rise/fall member and formed a small-diameter apace, a step portion having a diameter larger than that of the small-diameter portion and supporting a lower portion of the coil spring on an upper surface, and a large-diameter portion having a diameter larger than that of the step portion and formed with a large-diameter space communicated with the small-diameter space and accommodated in the fourth space formed in the cylinder main body;

a resistance member composed of a lower portion of circular shape in a planar view having a communication port communicated with the small-diameter space of the blow-up member and the fuel tank, and a cylindrical upper portion centrally studded on an upper surface of the lower portion, the lower portion being accommodated in the large-diameter space of the blow-up member to the undersurface of the step portion with abutting an upper surface peripheral portion of the lower portion, and the upper portion being accommodated in the small-diameter space with separated from a second inner surface defining the small-diameter space;

an attaching member attached to an undersurface of the attaching portion of the cylinder main body, and being formed with a communication path communicated with an opening defined in the fuel tank to be attached to the fuel tank directly or indirectly, in a state where the blow-up member that accommodates the lower portion of the resistance member in the large-diameter space thereof and that is disposed with the upper portion in the small-diameter space thereof, is loosely inserted in the coil spring disposed in the space of the rise/fall member, and the rise/fall member is accommodated in the first space and the second space of the cylinder main body that places the valve body on an upper surface thereof;

an accommodation member of hollow cylindrical shape accommodating a porous filter with a space that collects a foreign matter thereof for preventing entry into the fuel tank, and being attached to the inner cylinder main body portion of the cylinder main body; and an upper cap attached to the outer cylinder main body portion from above so that a space in the accommodation member and a space in the outer cylinder main body portion are communicated with an atmosphere;

wherein a valve portion is comprised of (a) a part of the lateral outer circumference of the valve body on the rise/fall member located between the point-contact positions, where the lateral outer circumference of the valve body is pressed onto the plural convex portions, that is not point contacted, or (b) a part of the lateral outer circumference of the valve body located between line-contact positions on the rise/fall member, where the lateral outer circumference of the valve body is pressed onto the first inner surface, that is not line contacted, and (c) a first communication port that is a cut port of the first air passage obtained by cutting the first inner surface and the both convex portions respectively adjacent to the first inner surface forming the first air passage, by a surface obtained by outwardly extending a surface formed by connecting a center of the valve body and the lateral outer circumference, or (d) a second communication port that is a cut port of the second air passage obtained by cutting a plane for forming concave portions to form the second air passage, by a surface obtained by outwardly extending a surface formed by connecting a center of the valve body and the lateral outer circumference, and in a state where the rise/fall member and the valve body are lowered by the urge force that is less than a total weight of the valve body and the rise/fall member with compressing the coil spring, and the lateral outer circumference of the valve body on the rise/fall member is not point contacted with the plural convex portions, or the lateral outer circumference of the valve body on the rise/fall member is not line contacted with the first inner surface of the cylinder main body thereby opening the valve portion, in an inclined state of the fuel tank, a weight of the rise/fall member and the valve body applied to the coil spring decreases according to the inclined angle, when the coil spring expands its length to have a predetermined length, the valve body contacts with the convex portions on the first inner surface or contacts with the first inner surface of the cylinder main body, and the fuel from the fuel tank through the communication path of the attaching member is reduced the pressure at the communication port of the resistance member and the small-diameter space of the blow-up member that accommodates the upper portion of the resistance member, and then the fuel spouts into the space of the rise/fall member from the small-diameter space of the blow-up member, so that the spouted fuel pushes up the valve body and the rise/fall member thereby closing the valve portion together with the urge force of the coil spring, and when the pressure of the fuel from the fuel tank reaches a predetermined pressure value, the rise/fall member and the valve body are lowered thereby opening the valve portion, the fuel from the fuel tank flows in the space of the accommodation member from the first space and the second space of the cylinder main body through the opening, the flow-in fuel is absorbed in the space inside the filter, in a returned horizontal state of the fuel tank, during the pressure in the fuel tank changing to a negative pressure due to consumption for driving the engine, the fuel absorbed in the filter is stored in the store portion and is returned to the fuel tank.

In a fifth aspect, an embodiment provides a valve body device for a fuel tank, comprising a filler cap and a valve mechanism element, the filler cap opening/closing a fill opening provided on an upper surface of the fuel tank storing a fuel to be supplied to an engine, and interrupting communication of the fuel tank and an atmosphere through the fill opening in a closure of the fill opening, the valve mechanism element including:

a cylinder main body composed of a cylindrical outer cylinder main body portion, an inner cylinder main body portion being generally centrally connected to a lower part of the outer cylinder main body portion via a connection portion and being formed with a storage portion in an upper part thereof, and an attaching portion having a step stepped below relative to the connection portion at a lower end part of the outer cylinder main body portion and extending outwardly, the inner cylinder main body portion being formed with a first cylindrical space, a second space of truncated cone shape communicated with the first space from above, a third space being formed by cutting and removing an inner end part of the connection portion and a lower end part of the inner cylinder main body portion and communicated with the first space from below, a fourth space formed by stepping the connecting portion and the attaching portion and connected to the third space from below, and an opening for communicating the second space with the exterior of the fuel tank, the cylinder main body being formed with, on a first inner surface that forms the second space, plural convex portions elongate in an up/down direction and protruding inwardly with keeping an interval to form a first air passage between respective convex portions, or, on the first inner surface, plural concave portions elongate in the up/down direction with keeping an interval to form a second air passage;

a rise/fall member of end closed hollow cylindrical shape having an upper surface and opened at a lower surface to form a space inside, the rise/fall member having a large-diameter portion at lower part and being accommodated in the first space, and a small-diameter portion of truncated cone shape in an outer profile at an upper part and accommodated in the second space;

a spherical valve body placed on an upper surface of the small-diameter portion of the rise/fall member, a lateral outer circumference of the valve body point contacting with the plural convex portions protruded to the first inner surface of the cylinder main body that forms the second space, or the lateral outer circumference of the valve body line contacting with the first inner surface of the cylinder main body that forms the second space;

a coil spring disposed in the space of the rise/fall member, the coil spring pushing up the rise/fall member so that the lateral outer circumference of the valve body placed on the small-diameter portion is pressed onto the plural convex portions for urging a point-contact therewith, or pushing up the rise/fall member so that the lateral outer circumference of the valve body placed on the small-diameter portion is pressed onto the first inner surface of the cylinder main body for urging a line-contact therewith, a blow-up member of hollow cylindrical shape composed of a small-diameter portion loosely inserted into the coil spring accommodated in the space of the rise/fall member and formed a small-diameter space, a step portion having a diameter larger than that of the small-diameter portion and supporting a lower portion of the coil spring on an upper surface, and a large-diameter portion having a diameter larger than that of the step portion and formed with a large-diameter space communicated with the small-diameter space and accommodated in the fourth space formed in the cylinder main body;

a resistance member composed of a lower portion of circular shape in a planar view having a communication port communicated with the small-diameter space of the blow-up member and the fuel tank, and a cylindrical upper portion centrally studded on an upper surface of the lower portion, the lower portion being accommodated in the large-diameter space of the blow-up member to the undersurface of the step portion with abutting an upper surface peripheral portion of the lower portion, and the upper portion being accommodated in the small-diameter space with separated from a second inner surface defining the small-diameter space;

an attaching member attached to an undersurface of the attaching portion of the cylinder main body, and being formed with a communication path communicated with an opening defined in the fuel tank to be attached to the fuel tank directly or indirectly, in a state where the blow-up member that accommodates the lower portion of the resistance member in the large-diameter space thereof and that is disposed with the upper portion in the small-diameter space thereof, is loosely inserted in the coil spring disposed in the space of the rise/fall member, and the rise/fall member is accommodated in the first space and the second space of the cylinder main body that places the valve body on an upper surface thereof;

an accommodation member of hollow cylindrical shape accommodating a porous filter with a space that collects a foreign matter thereof for preventing entry into the fuel tank, and being attached to the inner cylinder main body portion of the cylinder main body; and an upper cap attached to the outer cylinder main body portion from above so that a space in the accommodation member and a space in the outer cylinder main body portion are communicated with an atmosphere;

wherein a valve portion is comprised of (a) a part of the lateral outer circumference of the valve body on the rise/fall member located between the point-contact positions, where the lateral outer circumference of the valve body is pressed onto the plural convex portions, that is not point contacted, or (b) a part of the lateral outer circumference of the valve body located between line-contact positions on the rise/fall member, where the lateral outer circumference of the valve body is pressed onto the first inner surface, that is not line contacted, and (c) a first communication port that is a cut port of the first air passage obtained by cutting the first inner surface and the both convex portions respectively adjacent to the first inner surface forming the first air passage, by a surface obtained by outwardly extending a surface formed by connecting a center of the valve body and the lateral outer circumference, or (d) a second communication port that is a cut port of the second air passage obtained by cutting a plane for forming concave portions to form the second air passage, by a surface obtained by outwardly extending a surface formed by connecting a center of the valve body and the lateral outer circumference, and in a state where the lateral outer circumference of the valve body on the rise/fall member is pressed onto the convex portions for point contacting therewith, or in a state where the lateral outer circumference of the valve body on the rise/fall member is pressed onto the first inner surface of the cylinder main body for line contacting therewith, with increase of a pressure in the fuel tank due to an evaporated gas resulted from a vaporized fuel in the fuel tank or due to an expanded fuel, when the pressure in the fuel tank reaches a predetermined pressure value set based on a first passage resistance or a second passage resistance set up based on an area size of the valve portion constituted of the part of the lateral outer circumference not point contacted or the part of the lateral outer circumference not line contacted and the first communication port or the second communication port, and a magnitude of an urge force of the coil spring that is more than a total weight of the valve body and the rise/fall member, the evaporated gas or the expanded fuel rises via the communication port of the resistance member, the small-diameter space of the blow-up member, a gap between a lower end of the rise/fall member and the larger-diameter portion of the blow-up member, and a gap between the rise/fall member and the cylinder main body, in the first air passage against the first passage resistance or in the second air passage against the second passage resistance, passing through the valve portion, and the rising evaporated gas or the rising evaporated fuel lowers the valve body and the rise/fall member downwardly against the urge force of the coil spring, and opens the valve portion to discharge an excessively large pressure in the fuel tank to the exterior of the fuel tank and to absorb the expanded fuel in the filter through the first space, the second space and the opening.

DESCRIPTION (1) First Embodiment of a Filler Cap (Refer to FIG. 1 to FIG. 14)

(1-1) First Embodiment of Cylinder Main Body 16 (Valve Body VA, Refer to FIG. 1 to FIG. 12)

Figure 1:
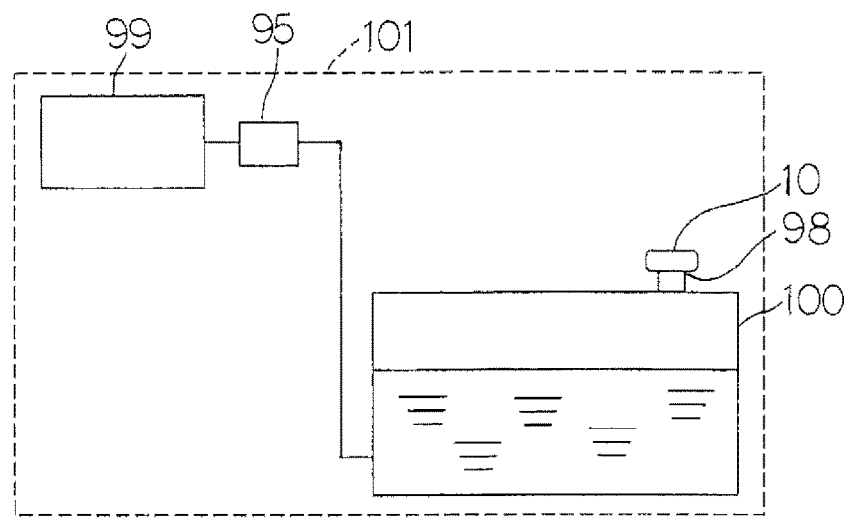
FIG. 1 is a schematic view showing an automobile applied with a filler cap for a fuel tank according to an embodiment.

In the following, an embodiment will be described with reference figures. Firstly, as shown in FIG. 1, a filler cap 10 for a fuel tank 100 according to the present embodiment is mounted on an automobile, an agricultural machinery, a power generator, a lawn mower, a motor cycle, a boat and a ship, a construction machine, a roadwork machine, and so on (hereinafter, referred to as "automobile 101" collectively). The filler cap opens/closes a filler opening 98 of the fuel tank 100 that supplies a fuel (gasoline in this embodiment) to an engine 99. Meanwhile, an evaporator 95 is connected with a pipe arrangement between the fuel tank 100 and the engine 99.

Figure 2:
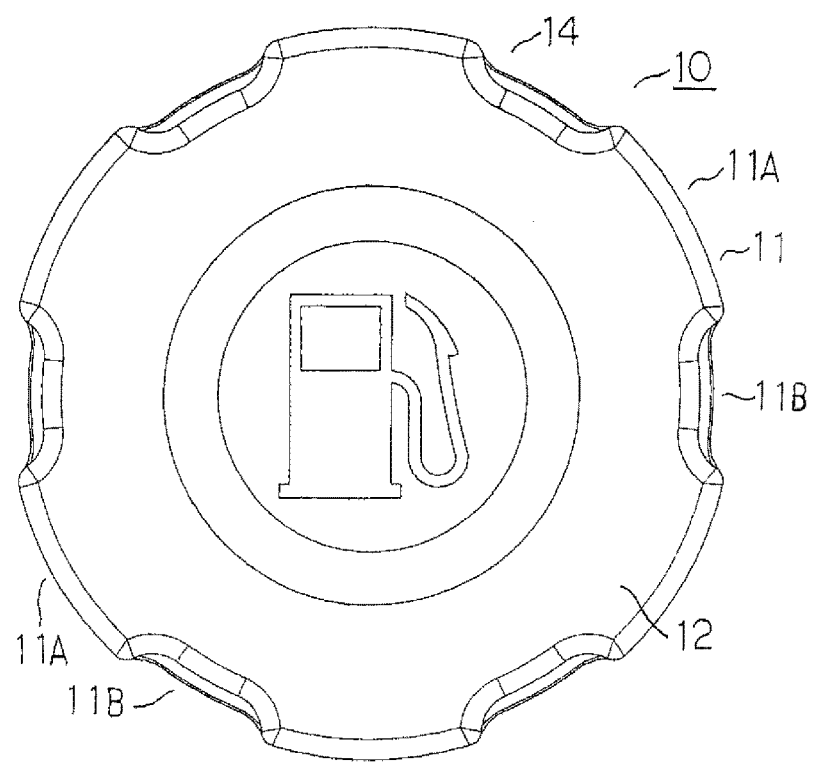
FIG. 2 is a plan view showing the filler cap.
Figure 3:
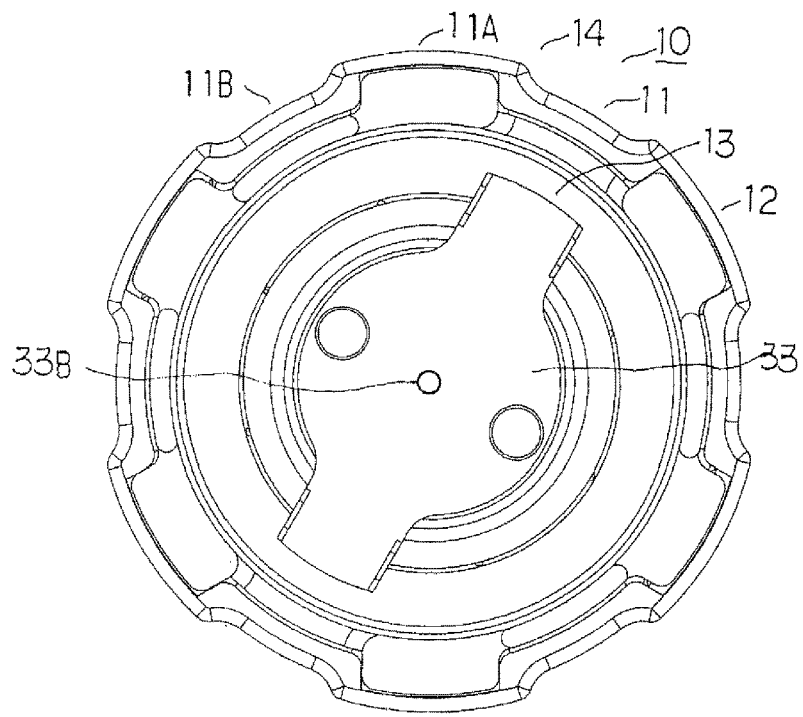
FIG. 3 is a backside view showing the filler cap.
Figure 4:
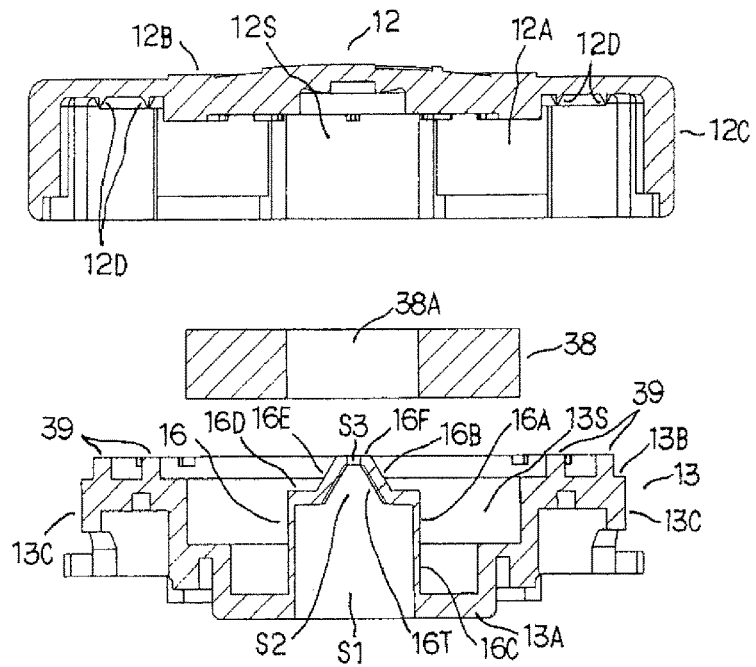
FIG. 4 is a longitudinal section view showing an outer cap and inner cap constituting the filler cap in a disassembled state.

The filler cap 10 is composed of, as shown in FIG. 2, FIG. 3, and FIG. 4, a cap main body 14 composed of an outer case 12 having an accommodation space 12A and formed with convexo-concave portion 11 on a side wall 12C for a manual twist (hereinafter referred to as "outer cap"), and an inner case 13 attached into the accommodation space 12A of this outer cap 12 (hereinafter to as "inner cap"). This inner cap 13 is equipped with a valve mechanism portion to be described later. The convexo-concave portion 11 includes convex portions 11A and concave portions 11B arranged alternately.

The outer cap 12 has a generally cylindrical shape with a closed end including an upper wall 12B and the side wall 12C. The accommodation space 12A formed by the upper wall 12B and the side wall 12C accommodates therein the inner cap 13 attached with a filter 38 to be described later.

Figure 6:
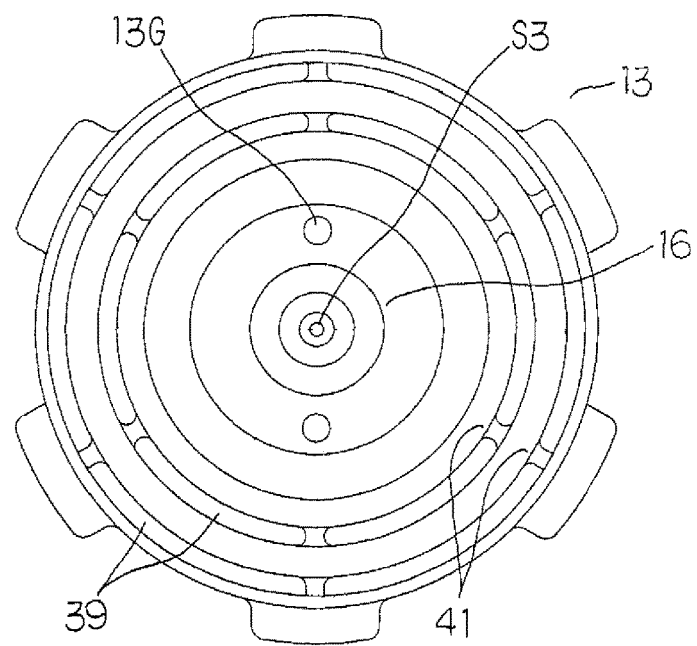
FIG. 6 is a front view showing the inner cap constituting the filler cap.
Figure 7:
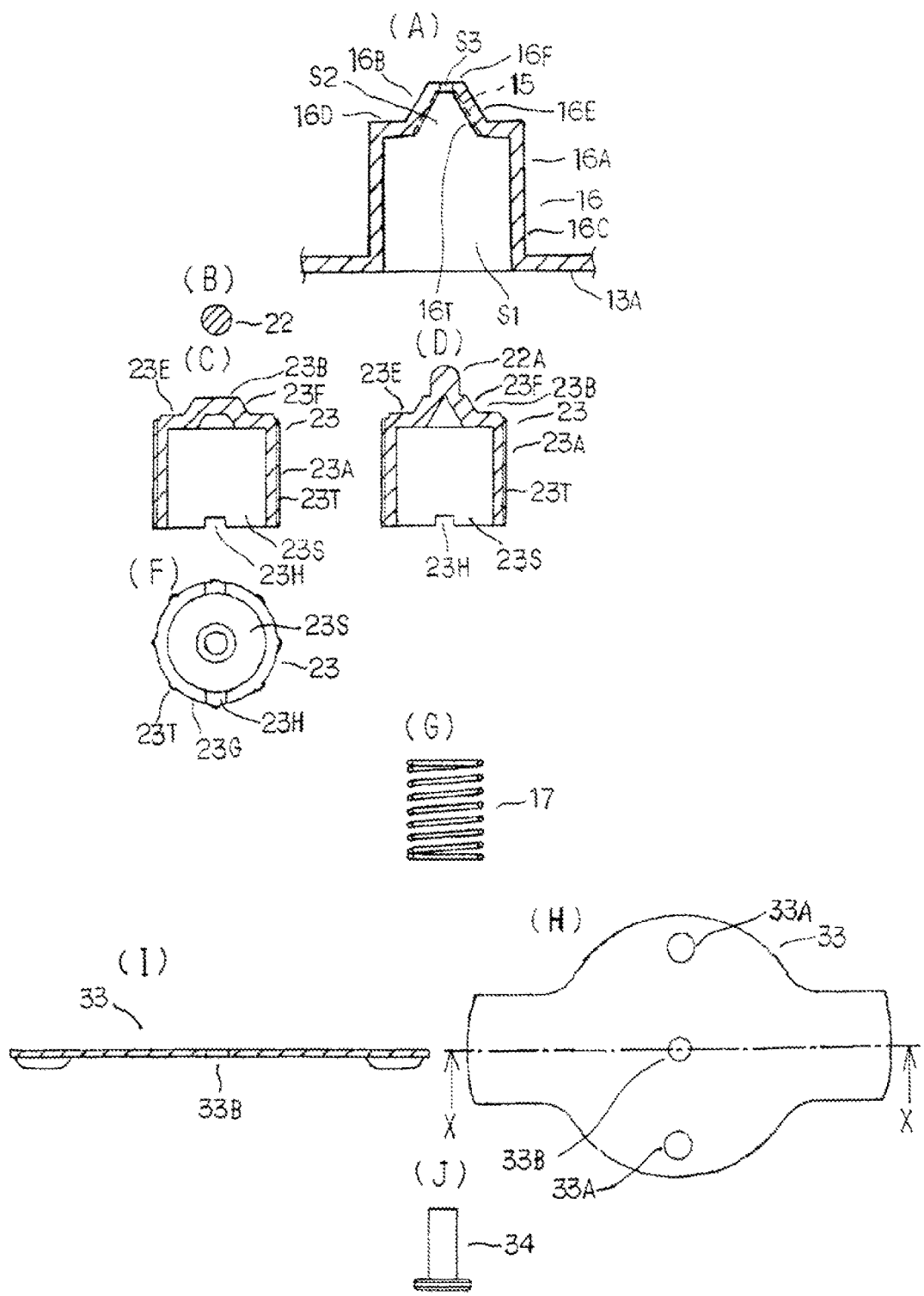
FIG. 7 is longitudinal section views and plan views showing a cylinder main body and respective members accommodated therein, which include a longitudinal section view of the cylinder main body (A), a longitudinal section view of a valve body (B), a longitudinal section view of a rise/fall member (C), a longitudinal section view of the rise/fall member according to other embodiment (D), a backside view of the rise/fall member (F), a longitudinal section view of a coil spring (G), a plan view of a spring (H), a section view along a X-X-line in the plan view (H) of the spring (I), and a side view of a rivet (I)

As shown in FIG. 4, FIG. 6 and FIG. 7, a hollow cylinder main body 16 is studded at a generally central position on an inner surface side of the inner cap 13 integral with a bottom wall 13A thereof. The cylinder main body 16 is composed of a main body portion 16A having a hollow cylindrical shape equipped with a cylindrical first space S1, and an air passage forming portion 16B that includes a second space S2 of truncated cone-shaped at an upper part of the main body portion 16A, and has an external profile of an truncated cone shape. As mentioned above, the cylinder main body 16 has been originally formed integral with the bottom wall 13A of the inner cap 13, but a separate cylinder main body 16 may be fixed to the bottom wall 13A of the inner cap 13.

The cylinder main body 16 is composed of a first side wall 16C, a lower horizontal wall 16D provided on the side wall 16C, a second side wall 16E provide on the lower horizontal wall 16D, and an upper horizontal wall 16F provided on the second side wall 16E in the named order from the bottom. The upper horizontal wall 16F is centrally formed with an opening S3 to communicate a space (including the second space S2) in the cylinder main body 16 and an exterior (atmosphere) of the fuel tank 100. The second side wall 16E has an inner surface 16E1 of which an inner diameter reduces upwardly.

Figure 8:
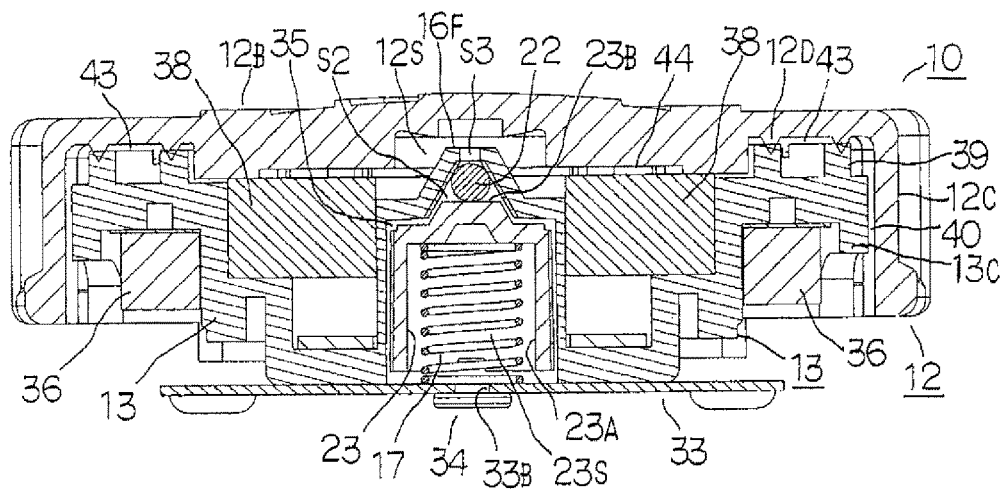
FIG. 8 is a longitudinal section view of the filler cap.

As shown in FIG. 8, with the inner cap 13 attached to the outer cap 12 in an accommodated state, the upper horizontal wall 16F of the cylinder main body 16 is accommodated in a space 12S formed on an undersurface of the upper wall 12B of the outer cap 12 for entry, such that the upper horizontal wall 16F does not abut onto the undersurface of the upper wall 12B with leaving a gap therebetween.

Plural first air passage 15, communicated with the opening S3 and the second space S2, is formed on the second side wall 16E of the cylinder main body 16. Described in detail, a transverse plane is formed in an inner surface 16E1 (inner surface defining the second space S2) of the second side wall 16E. The transverse plane is for example composed of plural (for example, eight) convex portions 16T each having a triangle shape and extending in an up/down direction, leaving predetermined gaps therebetween. The convex portions 16T have the same height along the inner surface 16E1 and protrude into the second space S2 so that the first air passages 15 are formed between convex portions 16T. That is, the convex portions 16T and the first air passages S15 are alternately formed on the inner surface 16E1 of the second side wall 16E of the cylinder main body 16.

As shown in FIG. 7 to FIG. 11, a valve body 22 constituted of a spherical ball made of stainless steel is accommodated in the second space S2. The valve body 22 is placed on an upper surface of a small-diameter portion 23B of the rise/fall member 23 so that its part contacts with the convex portions 16T to be described later.

The rise/fall member 23 supporting the placed valve body 22 thereon is closed at an upper surface and is opened at a lower surface to have an end-closed hollow cylindrical shape. It is composed of a lower large-diameter portion 23A and the upper small-diameter portion 23B. The large-diameter portion 23A is accommodated in the cylindrical first space S1. The small-diameter portion 23B is accommodated in the second space S2, and has a profile of truncated cone shape. When the valve body 22 is placed on the small-diameter portion 23B, its upper portion faces the opening S3.

In the space 23S formed in the rise/fall member 23, a coil spring 17 functioning as an urge member (hereinafter, referred to as "spring") is accommodated. The spring 17 is set to urge the rise/fall member 23 in the raising direction in an expanded state thereof. A rivet 34 is inserted into a fixed hole 13G formed in the bottom wall 13A of the inner cap 13 (refer to FIG. 6), and a fixed hole 33A formed in the spring 33 as an attaching member. The spring 33 is fixed to the bottom wall 13A by the rivet 34. Meanwhile, the spring 33 is made of a metal material that is hard to rust and does not dissolve with the fuel.

The spring 33 made of a blade spring material is centrally formed with an opening 33B constituting communication path, which forms the air passage communicated with the space 23S of the rise/fall member 23 and the fuel tank 100. Meanwhile, the spring 33 is a passage forming member that forms the air passage, and also is a fixing tool for fixedly attaching the filler cap 10 (the cap main body 14) to the fill opening 98 of the fuel tank 100.

Accordingly, the valve body 22 is placed on the upper surface of the small-diameter portion 23B, and simultaneously, the rise/fall member 23 of which the space 23S accommodates the spring 17 therein is accommodated in the first space S1 and the second space S2 of the cylinder main body 16. Then, the rivet 34 is inserted into the fixed hole 13G of the bottom wall 13A of the inner cap 13 and the fixed hole 33A of the spring 33 to fix the spring 33 to the bottom wall 13A of the inner cap 13.

Then, with the valve body 22 place on the small-diameter portion 23B of the rise/fall member 23, an urge force of the spring 17 pushes up the rise/fall member 23 upwards, so that an outer circumference in a lateral direction, i.e., a lateral outer circumference CF of the valve body 22 constituting the valve mechanism portion is pressed onto top portions of the plural convex portions 16T by the urge force of the spring 17 for making a point-contact. Here, the lateral outer circumference CF is an outer circumstance of a surface obtained by cutting an upper hemisphere horizontally at ½ position in an up/down direction ("an outer circumstance of a plane cut horizontally" referred to as "the lateral outer circumference CF of the valve body 22" hereinafter). The top portions are top portions of the plural convex portions 16T, in the protruded direction into the second space S2, that are protruded into the inner surface 16E1 of the second side wall 16E.

In this embodiment, the valve portion VA is composed of a part CF1 of the lateral outer circumference CF of the valve body 22 located between the point-contact positions and does not make a point-contact, and a first communication port RA which is a cut port of the first air passage 15. The above part can be expressed otherwise as an outer circumference part. One or more valve portion(s) is (are) included. This applies to all embodiments to be described in the following. At the point-contact positions, the lateral outer circumference CF of the valve body 22 is pressed onto the top portions of the plural convex portions 16T protruded into the inner surface 16E1 of the second side wall 16. The first communication port RA is obtained by cutting the inner surface forming the first air passage 15 and the both convex portions 16T respectively adjacent to the inner surface, by a surface obtained by outwardly extending, more specifically, radially outwardly extending, or obliquely upwardly extending a surface CS (for example, a conic surface) formed by connecting a center CO of the valve body 22 and the lateral outer circumference CF.

In the valve portion VA, there are formed a region where the lateral outer circumference CF of the valve body 22 point contacts with the top points of the plural convex portions 16T of the second side wall 16E, and a region where it does not contact with the second side wall 16E. Accordingly, as mentioned above, there is formed the valve portion VA having an extremely small cross-section area, that is constituted of the part CF1 of the lateral outer circumference CF not point contacting, and the first communication port RA.

Figure 9:
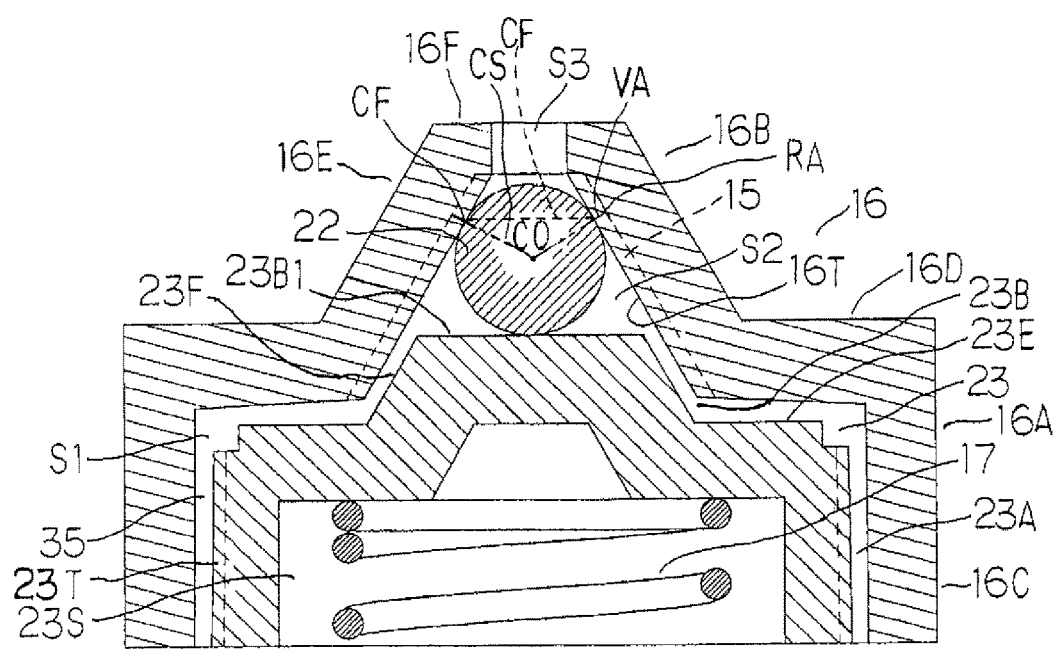
FIG. 9 is a longitudinal section view showing principal members in a state where a lateral outer circumference of the valve body is point-contacted with the cylinder main body at top portions of the plural convex portions protruded to an inner surface of a second side wall.

The cylinder main body 16 is composed of a lower large-diameter portion, and an upper small-diameter portion having a profile of truncated cone shape. FIG. 9 is a longitudinal section view that passes through a center of the upper horizontal wall 16F having a circular shape in a planer view. In this embodiment, as shown in FIG. 9, an angle formed by intersecting extension lines that extend upwardly from the top portions of the convex portions 16T is 60 degrees (preferably, 50 degrees or more to 70 degrees or less). Thus, as mentioned above, at the ½ position in the up/down direction of the upper hemisphere of the valve body 22, the lateral outer circumference CF of the valve body 22 point contacts with the top portions of the plural convex portions 16T.

Meanwhile, the angles formed by the intersected extension lines that extend upwardly from the top portions of the convex portions 16T are equal at all height positions of the convex portions 16T. In this embodiment, when the upper horizontal wall 16F is sectioned longitudinally through a center of the upper horizontal wall 16F, the space S2 has a profile of trapezoid shape. An angle formed by the intersected extension lines extending upwardly from oblique sides of trapezoid is also 60 degrees. However, preferably, this angle is not limited to 60 degrees, but may be 50 degrees or more to 70 degree or less. The space S2 sufficiently has the truncated cone shape. Here, the rise/fall member 23, and the cylinder main body 16 etc. will be describe in detail with reference to FIG. 8 or FIG. 11. An outer diameter of the large-diameter portion 23A of the rise/fall member 23 is slightly smaller than a diameter of the first space S1 formed by the first side wall 16C of the cylinder main body 16. The rise/fall member 23 can move up and down in this first space S1. The rise/fall member 23 is raised by the urge force of the spring 17 so that the lateral outer circumference CF of the valve body 22 is pressed onto the top portions of the plural convex portions 16T to point contact therewith. However, a step wall 23E located between the large-diameter portion 23A and the small-diameter portion 23B of the rise/fall member 23, and a side wall 23F of the small-diameter portion 23B do not contact with the lower horizontal wall 16D and the second side wall 16E of the cylinder main body 16. Accordingly, there is formed a small gap among them.

Meanwhile, a gap 35 is formed between an inner surface of the first side wall 16C of the cylinder main body 16 and an outer surface of the side wall 23G of the large-diameter portion 23A of the rise/fall member 23. Convex portions 23T outwardly protruding are formed on a surface of the side wall 23G to extend in an up/down direction. Gaps are formed also between the convex portions 23T and the inner surface of the first side wall 16C. Accordingly, when the side wall 16C and the convex portions 23T contact with each other during rising/falling of the rise/fall member 23, the small contact surface area therebetween allows the rise/fall member 23 to rise or to fall smoothly. Meanwhile, plural ablated portions 23H are formed on the lower end of the side wall 23G with a predetermined gap.

Accordingly, the rise/fall member 23 and the valve body 22 are raised by the urge force of the spring 17 so that the lateral outer circumference CF of the valve body 22 point contacts with the top portions of the plural convex portions 16T. Then, the pressure in the fuel tank 100 increases until it reaches an atmospheric pressure, or 5 kPa or more to be described later to realize the state of a positive pressure.

In the positive pressure state, since the first passage resistance (resistance generated when a fluid (evaporated gas of the fuel or the fuel) passes therethrough) based on size of an area of the valve portion VA is large, the point-contact is not released. For this reason, even when the first space S1 communicates with the opening S3 through the first air passage 15, due to closure of the valve portion VA, the fluid does not come and go between the upper space and the lower space in this valve portion VA.

That is, in spite of communication of an interior of the cylinder main body 16 with the air, as long as the pressure in the fuel tank 100, in other words, pressure in the space located below the valve portion VA is less than a predetermined set value (for example, less than 5 KPa in the set value), the interior of the cylinder main body 16 located below the valve portion VA is interrupted from the air by the first passage resistance. Thus, the valve portion VA is closed, which does not allow the fluid to come and go between the upper space and the lower space of the closed valve portion VA.

Meanwhile, in the embodiment (1-1), the pressure value 5 kPa is set based on the first passage resistance set up based on size of an area of the valve portion VA, and magnitude of the urge force of the spring 17 that is more than a total weight of the valve body 22 and the rise/fall member 23.

With increase of the air temperature, the fuel evaporates in the fuel tank 100, and the pressure increases in the filler cap 10. The pressure that flows in from an undersurface opening of the cylinder main body 16 also becomes equal to an inner pressure of the fuel tank 100. As mentioned above, since the cylinder main body 16 is interrupted in its interior from the air by the valve portion VA, so it does not discharge the pressure flowing into its inner space from the undersurface opening to an exterior of the filler cap 10. Thus, the inner pressures are equal between the cylinder main body 16 and the fuel tank 100.

Meanwhile, as mentioned above, the first passage resistance is set based on the area size of the valve portion VA, and combination of the first passage resistance and magnitude of the urge force of the spring 17 can be used to set up an open pressure of the valve portion VA. In this embodiment, the open pressure is set in 5 kPa or more as mentioned above. The area of the valve portion VA is extremely small and has for example 0.002 $mm^2$ or more to 0.02 $mm^2$ or less, which sets the first passage resistance large. An area of a valve portion VB to be described later is small likewise, and has the similar sizes.

If the urge force of the spring 17 is excessively large, the rise/fall member 23 and the valve body 22 cannot be lowered, unless the fuel tank 100 is also set in a quite large negative pressure. Accordingly, the urge force of the spring 17 is selected as 1.0 time(s) or more, for example 1.1 times or more to 2.0 times or less, of the total weight of the rise/fall member 23 and the valve body 22. The spring 17 can have the urge force sufficiently small to raise the valve body 22 and the rise/fall member 23 such that the lateral outer circumference CF of the valve body 22 is slightly contacted, i.e., point contacted with the plural convex portions 16T formed in the second side wall 16E. That is, the urge force of the spring 17 is, for example about 1.1 times of the total weight of the rise/fall member 23 and the valve body 22 in the engine of free fall type as mentioned above, and for example about 2.0 times of the same in the engine of fuel supplying pump type.

With increase of the air temperature, the fuel in the fuel tank 100 evaporates to generate gas (Volatile Organic Compounds Gas, abbreviated to as "VOC gas"). The fuel may expand in the fuel tank 100 filled with the fuel or the near to this state A fluid pressure of such gas of fuel will be described. When this fluid pressure is less than for example 5 kPa, the VOC gas or the fuel that flows into the gap 35 located between the cylinder main body 16 and the rise/fall member 23 through the opening 33B of the spring 33, also flows into the rise/fall member 23 to increase the pressure therein. The increased pressure raises the rise/fall member 23 and the valve body 22 together with urge force of the spring 17, thereby closing the valve portion VA. Thanks to the first passage resistance set based on an area size of the valve portion VA, no VOC gas or no fuel in the first space S1 flows out to the exterior of the fuel tank 100, i.e., to the exterior of the filler cap 10 through the second space S2 and the opening S3.

However, since the interior of the cylinder main body 16 is communicated with the air through the opening S3, i.e., through the first communication port RA constituting the valve portion VA, the space in the cylinder main body 16 is not kept in a sealed and closed state. The VOC gas flowing into the second space S2 through the gap 35 between the cylinder main body 16 and the rise/fall member 23, or the fuel expanding in the fuel tank 100 filled with the fuel or the near to this state has the fluid pressure. When these fluid pressures reach the value that can pass through the valve portion VA, for example 5 kPa or more, the VOC gas or the fuel flowed into the second space S2 located below the valve portion VA is discharged to the exterior of the filler cap 10 from the opening S3 after rising in the first air passage 15. The pressure during this discharge lowers the valve body 22 and the rise/fall member 23 against the urge force of the spring 17, thereby opening the valve portion VA.

Accordingly, when the filler cap 10 is attached to the fuel tank 100, the pressure in the this fuel tank 100 is not discharged externally until the rise/fall member 23 and the valve body 22 are lowered by the increased pressure for example, 5 kPa in the fuel tank 100.

Meanwhile, in this embodiment, the outer cap 12, the inner cap 13 and the rise/fall member 23 are made of the synthetic resin material for example, nylon6, and the nylon 66 that have solvent resistance to the solvent fuel, such as gasoline, light oil, ethanol and methanol.

As mentioned above, when the cap main body 14 is attached to the fill opening 98 of the fuel tank 100 by the spring 33, with abutment of the ring-like gasket 36 to the fill opening 98, the fill opening 98 is closed by the cap main body 14 (refer to FIG. 8). Meanwhile in FIG. 4, the filter 38 is a porous filter including an activated carbon filter excellent in an oil-proof property or a filter made of an urethane synthetic resin. It filters the air and collects foreign matters such as dirt contained therein to prevent its entry into the fuel tank 100. With the filter 38 accommodated in the space 13S around the cylinder main body 16 of the inner cap 13, the inner cap 13 is accommodated in the outer cap 12 to fix the outer cap 12 and the inner cap 13. That is, the cylinder main body 16 is inserted into the hollow portion 38A centrally opened in the filter 38, and the filter 38 is accommodated in the space 13S of the inner cap 13, to fix the outer cap 12 and the inner cap 13.

Here, ring-like convex portions 39 are doubly protruded from the upper wall 13B located at peripheral portion of the inner cap 13, and the inner cap 13 is accommodated in the outer cap 12 with heading the convex portion 39. On the other hand, two lines of the adhered ribs 12D are protruded to an undersurface of the upper wall 12B of the outer cap 12 for every predetermined interval, and each adhered rib 12D and each convex portion 39 are adhered by an ultrasonic wave.

Figure 12:
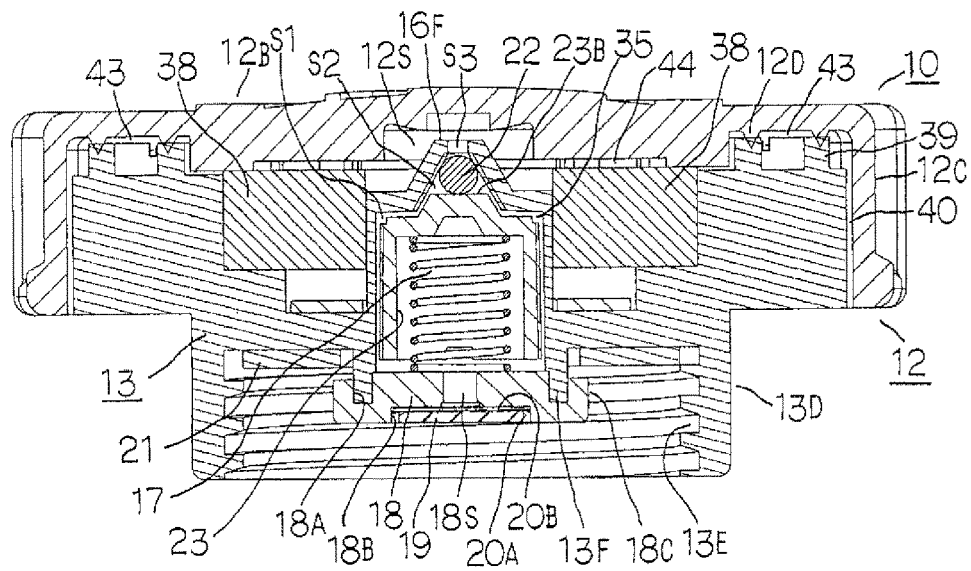
FIG. 12 is a longitudinal section view showing the filler cap having a structure attached to a filler opening by a screw.

With the inner cap 13 accommodated in the outer cap 12, there is formed a gap 40 between an inner surface of the side wall 12C of the outer cap 12 and an outer surface of the side wall 13C of the inner cap 13 (refer to FIG. 8 and FIG. 12). The lower end of the gap 40 opens to form a vent communicated with the atmosphere outside the filler cap 10 (exterior of the automobile 101).

Figure 5:
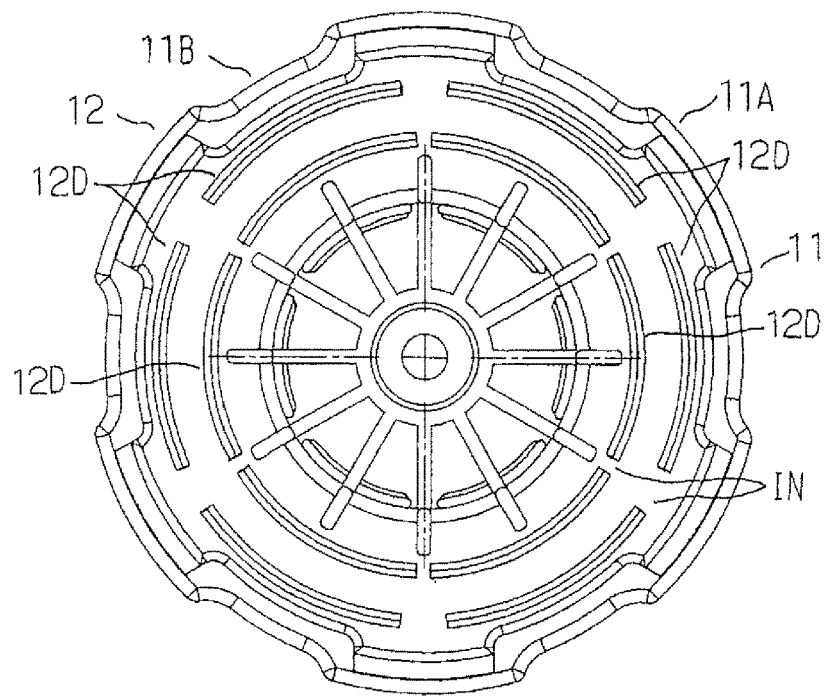
FIG. 5 is a backside view showing the outer cap constituting the filler cap.

In FIG. 5 and FIG. 6, there are formed plural grooves 41 with a predetermined interval at each convex portion 39 on the upper surface of the inner cap 13. However, the plural adhesion ribs 12D protruded on the outer cap 12 are deviated from the positions (keeping intervals IN) opposing the groove 41 provided in the each convex portion 39 of the inner cap 13, and are not provided at this positions. Thus, the outer cap 12 and the inner cap 13 are constituted so that the groove 41 provided in the each convex portion 39 is not be closed by the adhesion rib 12D, on adhering of the both caps 12 and 13 by the ultrasonic wave.

In this way, the air passage 43 is formed between the outer cap 12 and the inner cap 13, which allows the air to be introduced into the fuel tank 100 through the filler cap 10. The generated VOC gas or the expanded fuel increases the inner pressure of the fuel tank 100. Only when the inner pressure reaches the value that can lower the rise/fall member 23 and the valve body 22, the increased pressure can be discharged external to the fuel tank 100, through the space 44 between the filter 38 and the undersurface of the outer cap 12, the air passage 43 and the gap 40.

Meanwhile, in the pressure unable to lower the rise/fall member 23 and the valve body 22, the lateral outer circumference CF of the valve body 22 is point contacted with the top portions of the plural convex portions 16T of the valve body 22, thereby closing the valve portions VA. Thanks to the first passage resistance, no VOC gas or fuel in the first space S1 is discharged to the exterior of the fuel tank 100, i.e., exterior of the filler cap 10, through the second space S2 and the opening S3.

Accordingly, the valve mechanism portion composed of the cylinder main body 16, the rise/fall member 23, the spring 17 and the valve body 22 functions as a safety valve. Next, an assembly of the filler cap 10 constituted as mentioned above will be described. Meanwhile, it is assumed that on assembling, with the cylinder main body 16 of the inner cap 13 inserted into the hollow portion 38A of the filter 38, the inner cap 13 is accommodated in the outer cap 12. Each adhesion rib 12D of the outer cap 12 and each convex portion 39 of the inner cap 13 are melted and fixed by ultrasonic wave to fix the inner cap 13 and the outer cap 12.

First, the rise/fall member 23 is accommodated in the space of the cylinder main body 16, for example with the valve body 22 placed thereon. Then, the small-diameter portion 23B of the rise/fall member 23 with placing the valve body 22 thereon enters the second space S2, and also the large-diameter portion 23A enters the first space S1. Next, the spring 17 is accommodated in the space 23S of the rise/fall member 23, and the rivet 34 is inserted into the fixed hole 13G of the bottom wall 13A of the inner cap 13, and the fixed hole 33A of the spring 33 to fix the spring 33 to the bottom wall 13A. In this way, assembling of the filler cap 10 equipped with the valve mechanism portion is completed. The filler cap 10 thus assembled is attached to the fill opening 98 in use.

In this state, the spring 17 raises the valve body 22 and the rise/fall member 23 by its urge force. Consequently, the lateral outer circumference CF of the valve body 22 point contacts with the top portions of the plural convex portions 16T of the second side wall 16E of the cylinder main body 16. Here, the large first passage resistance set in the valve portion VA contributes to close the valve portion VA and to hinder a release of the point-contact. Accordingly, no fluid comes and goes through the first communication port RA constituting the valve portion VA between the first space S1 and the opening S3.

Next, an operation of the filler cap 10 in a generally horizontal state of the fuel tank 100 will be described. First, immediately after filling the fuel in the fuel tank 100, and attaching the filler cap 10 to the fill opening 98, the pressures are balanced between the interior and the exterior of the fuel tank 100. Accordingly, the spring 17 raises the valve body 22 and the rise/fall member 23, and the lateral outer circumference CF of the valve body 22 point contacts with the plural convex portions 16T of the second side wall 16E, thereby closing the valve portion VA. Since the first passage resistance does not release the point-contact, no fluid comes and goes between the first space S1 and the opening S3, which interrupts the communication between interior and exterior of the fuel tank 100.

That is, there are formed the gap 40, the air passage 43, the space 44, the space 12S, and the opening S3. However, the valve portion VA is closed by the large first passage resistance resulting from the point-contact of the lateral outer circumference CF of the valve body 22 with the plural convex portions 16T of the second side wall 16E. The atmosphere outside the filler cap 10 is prevented from flowing into the first space S1 through the opening S3 and the second space S2.

There are formed the opening 33B of the spring 33, the first space S1 of the cylinder main body 16, and the gap 35 located between the cylinder main body 16 and the rise/fall member 23. However, since the valve portion VA is closed by the first passage resistance of large magnitude, no VOC gas or fuel in the fuel tank 100 is discharged through the opening S3 to the exterior of the fuel tank 100, i.e., exterior of the filler cap 10, thanks to the first passage resistance.

Next, an operation under the risen air temperature during stoppage of the engine 99 will be described. The temperature rise causes evaporation of the fuel in the fuel tank 100 leading to generation of the harmful VOC gas, or expansion of the fuel in the fuel tank 100 filled with the fuel or the near to this state. These increase the inner pressure of the fuel tank 100. However, with the point-contact of the lateral outer circumference CF of the valve body 22 by the spring 17 with the top portions of the plural convex portions 16T, the valve portion VA is closed as long as the inner pressure of the fuel tank 100 is less than for example 5 kPa. As a result, there is no VOC gas or fuel in the first space S1 to be discharged through the second space S2 and the opening S3 to the exterior of the fuel tank 100, i.e., exterior of the filler cap 10, thanks to the first passage resistance.

Accordingly, in spite of the generation of the VOC gas resulted from evaporation of the fuel in the fuel tank 100, and expansion of the fuel as mentioned above, the VOC gas or the fuel of the automobile 101 is suppressed from discharge. Thus, non-discharge of the fuel and the harmful VOC gas evaporated therefrom exterior the automobile 101 can prevent the environmental pollution.

The air temperature may further rise during stoppage of the engine 99. Then, the fuel in the fuel tank 100 evaporates to further increase the generated amount of the VOC gas, and the fuel expands in the fuel tank 100 filled with the fuel or the near to this state, both further increasing pressure in the fuel tank 100. When the inner pressure reaches for example 5 kPa or more, the high-pressure VOC gas or the expanded fuel flows in the first air passage 15 formed between respective convex portions 16T of the second side wall 16E upwardly, against the first passage resistance set based on the area size of the valve portion VA. The VOC gas or the fuel passes through the valve portion VA where the lateral outer circumference CF of the valve body 22 is point contacted with the convex portions 16T. For this reason, the VOC gas or the fuel that flows upwardly passing through the valve portion VA acts on the valve body 22 to depress it from obliquely upward to obliquely downward.

Figure 10:
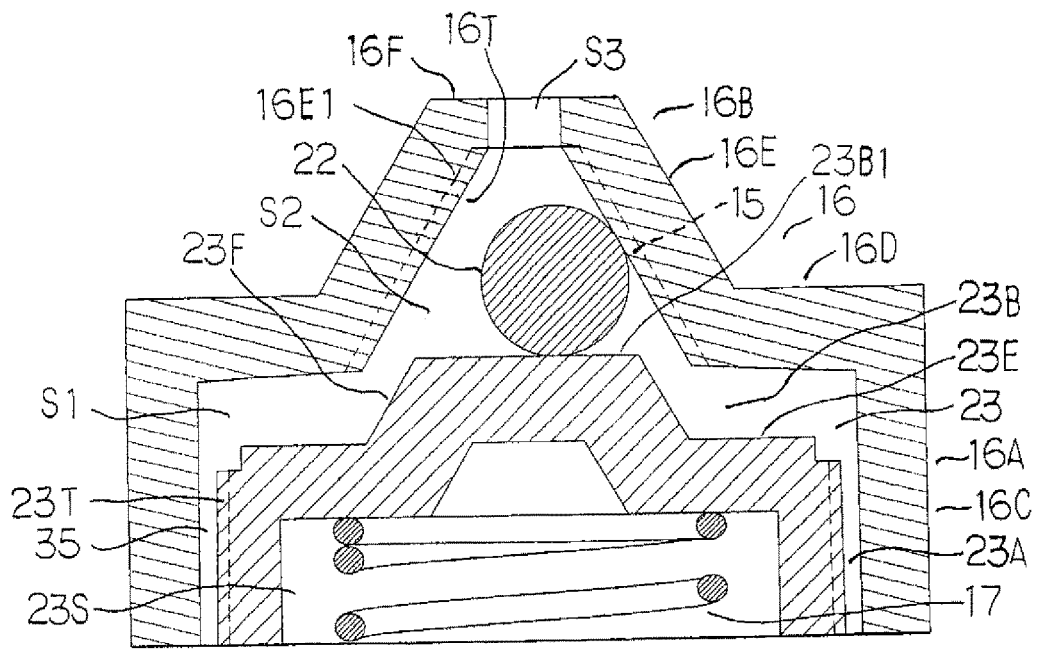
FIG. 10 is a longitudinal section view showing principal members when the valve body and the rise/fall member are lowered.
Figure 11:
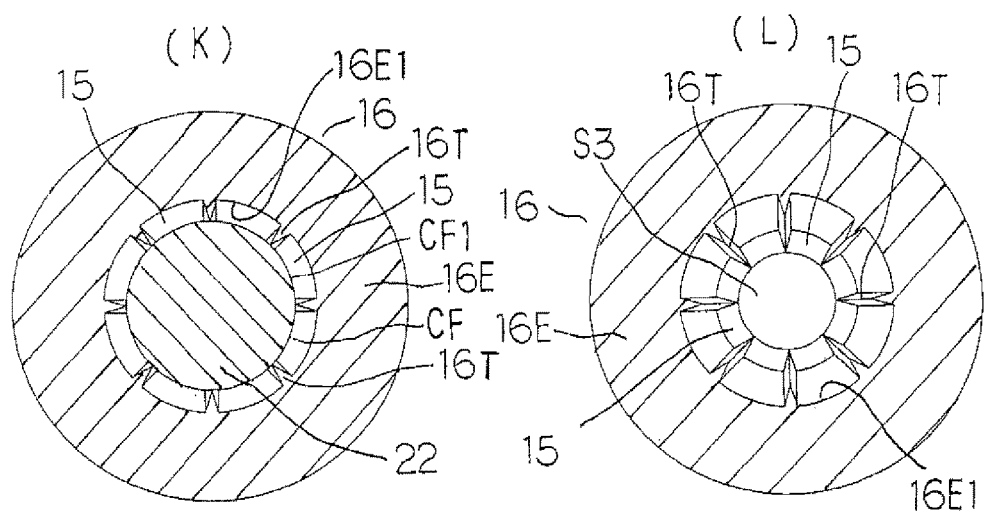
FIG. 11 includes a bottom view (K) sectioned at a position where the lateral outer circumference of the valve body is point contacted with the cylinder main body at the top portions of the plural convex portions protruded to the inner surface of a second side wall, and a bottom view (L) sectioned at the same position with the valve body removed.

Accordingly, the valve body 22 and the rise/fall member 23 is lowered by the VOC gas or the fuel against the urge force of the spring 17, thereby opening the valve portion VA (refer to FIG. 10).

In this way, when pressure in the fuel tank 100 having reached 5 kPa or more opens the valve portion VA as mentioned above, the excessively large pressure (including the VOC gas and the fuel) in the fuel tank 100 is discharged exterior the filler cap 10, i.e., exterior the automobile 101 through the opening 33B, the first space S1 (the gap 35), the second space S2 (including the first air passage 15), the opening S3, the space 12S, the space 44, the air passage 43, and the gap 40.

As result of this discharge, pressure in the fuel tank 100 immediately reaches the pressure value of less than 5 kPa to close the valve portion VA as shown in FIG. 8 or FIG. 9, so that the valve mechanism portion functions as the safety valve. That is, as mentioned above, when the urge force of the spring 17 raises the rise/fall member 23 and the valve body 22, the lateral outer circumference CF of the valve body 22 point contacts with the top portions of the plural convex portions 16T, thereby closing the valve portion VA. The valve mechanism portion having the safety valve function can not only improve the fuel consumption, but also prevent environmental contamination. As mentioned above, when the pressure in the fuel tank 100 increases to the pressure value set, the VOC gas or the fuel in the first space S1 is discharged through the second space S2, and the opening S3 to the exterior of the fuel tank 100, i.e., exterior of the filler cap 10. This is because unless the VOC gas or the fuel is discharged, on removing the filler cap 10 from the automobile 101, there is a risk of the fuel scattering to the exterior of the automobile 101 by the pressure in the fuel tank 100. In this way, the valve mechanism portion functions as the safety valve.

Next, when the lateral outer circumference CF of the valve body 22 is point contacted with the top portions of the plural convex portions 16T to close the valve portion VA, change of the inner pressure of the fuel tank 100 to the negative pressure will be described, which results from the fuel consumption for driving the engine 99 of the automobile 101.

Even when the inner pressure of the fuel tank 100 changes to the negative pressure by consumption of the fuel, the inner pressure of the rise/fall member 23 also changes to the negative pressure via the opening 33B of the spring 33. Due to the rise/fall member 23 lowered by the negative pressure against the spring 17, the valve body 22 is also lowered to open the valve portion VA.

Then, the atmosphere moves between the opening S3 and the first space S1, and flows into the fuel tank 100 through the gap 40, the air passage 43, the space 44, the space 12S, the opening S3, the second space S2 (including the first air passage 15), the first space S1 (the gap 35) and the opening 33B. Thus, the fuel is supplied to the engine. Accordingly, when the inner pressure of the fuel tank 100 having received the fuel therein changes to an atmospheric pressure state, the valve body 22 and the rise/fall member 23 raised by the urge force of the spring 17 closes the valve portion VA. When there becomes loss of the atmosphere flowing into the first space S1 through the opening S3 and the second space S2, the inner pressure of the tank changes to the negative pressure again, which causes the atmosphere to flow into the first space S1. Hereinafter, the same operations will be repeated. The above-mentioned operation achieved by the negative pressure in the fuel tank 100 for driving the engine 99 resulted from consumption, with the valve portion VA closed, are similarly applied to all the embodiments relating to the filler cap 10 and the valve mechanism portion 60 to be describe later.

Meanwhile, the filler cap 10 (the cap main body 14) is attached to the fill opening 98 by the spring 33 made from a blade spring. Method or structure of attaching the filler cap 10 is not limited to the blades spring type, but can be a screw type. In particular, a screw type attaching method or structure is not limited, an embodiment of which will described hereinafter.

First, as shown in FIG. 12, a hollow outer cylindrical portion 13D as an attaching member is formed at a lower part of the inner cap 13, and a female screw 13E is formed on an inner surface of the outer cylindrical portion 13D having the space as communication path. The female screw 13E is meshed with a male screw formed in the fill opening 98 to attach the filler cap 10 (the cap main portion 14) to the fill opening 98.

An inner cylindrical portion 13F is formed inward of the outer cylindrical portion 13D. The inner cylindrical portion 13F is engaged with an engagement groove 18A formed in a peripheral portion of the cap 18 to prevent the rise/fall member 23 accommodated in the first space S1 from falling. Thus, the cap 18 fixed to the inner cap 13 holds the spring 17 supporting the rise/fall member 23, resulting in support of the rise/fall member 23 in a fall preventing way.

An air passage 18S communicated with the first space S1 is centrally formed in the cap 18, and a lower portion thereof is communicated with the interior of the fuel tank 100. That is, a lid body or a lid cap 19 for preventing a fluid wave motion is provided in a groove 18B opened on the undersurface of the cap 18. The undersurface opening of the groove 18B is closed by the lid cap 19 except for a part (a fluid draw/discharge port) 20A thereof communicated with the interior of fuel tank 100. A fluid passage 20B communicated with the fluid draw/discharge port 20A and the air passage 18S are formed above the lid cap 19.

There is provided a centrally opened gasket 21. An outer diameter of the cap 18 is larger than an inner diameter of the opening of the gasket 21. Accordingly, when the inner cylindrical portion 13F is fitted to the engaging groove 18A of the cap 18, a turned piece 18C of the cap 18 prevents the gasket 21 from falling. On attaching the filler cap 10 to the fill opening 98, the male screw formed in the fill opening 98 is meshed with the female screw 13E formed in an inner wall surface of the outer cylindrical portion 13D. Then, a capsule of the fill opening 98 is abutted to the gasket 21 to seal and close the fill opening 98.

Figure 13:
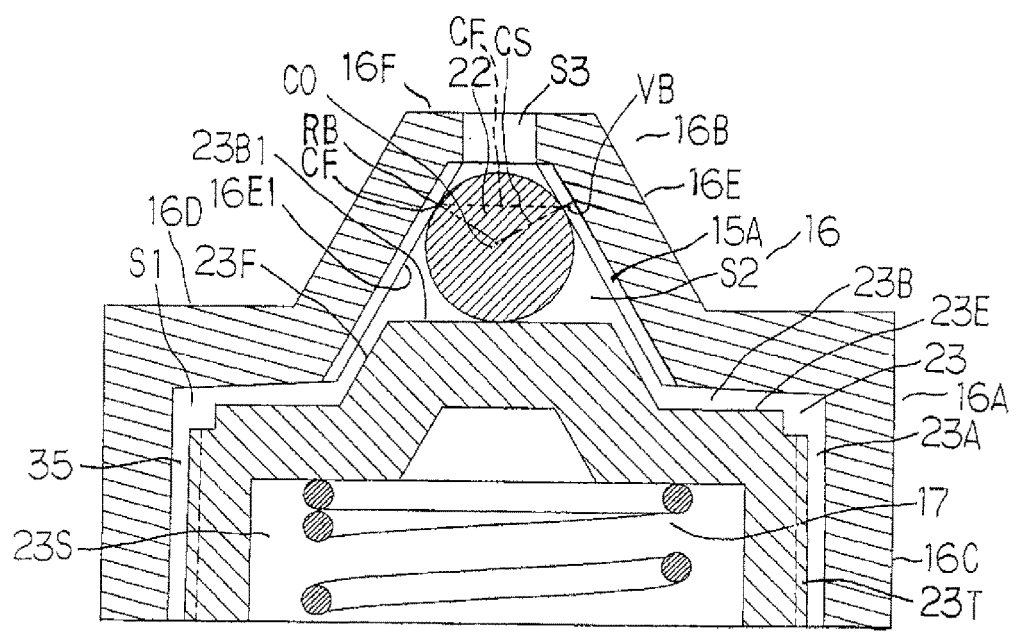
FIG. 13 is a longitudinal section view of the principal members a state where the lateral outer circumference of the valve body is line contacted with the cylinder main body at an inner surface of the second side wall thereof.
Figure 14:
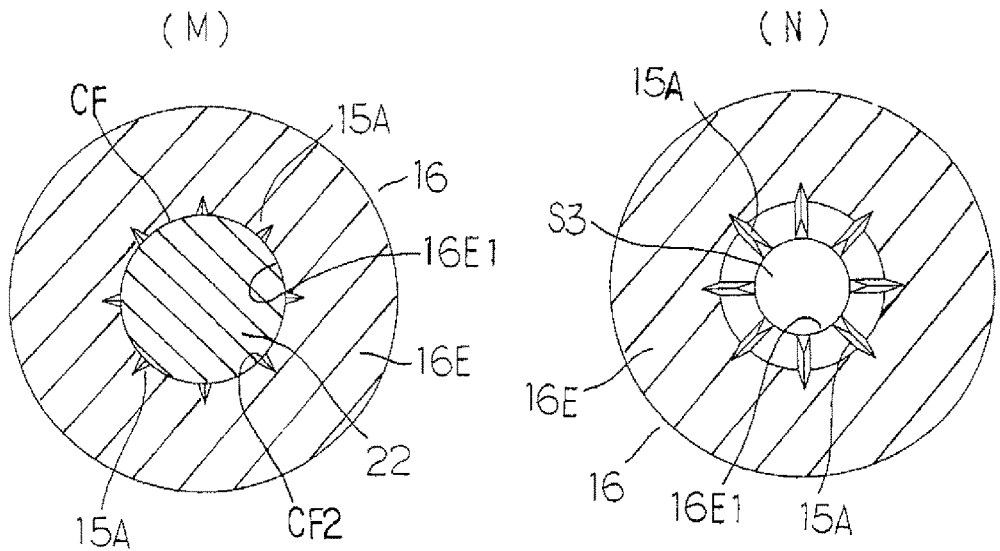
FIG. 14 includes a bottom view (N) sectioned at a position where the lateral outer circumference of the valve body is line contacted with the cylinder main body at the inner surface of the second side wall thereof, and a bottom view (M) sectioned at the same position with the valve body removed.

(1-2) Second Embodiment of the Cylinder Main Body 16 (Refer to the Valve Portion VB, FIG. 13 and FIG. 14)

Next, the second embodiment of the cylinder main body 16 will be described with reference to FIG. 13 and FIG. 14. This is also applicable to all the embodiments to be described hereinafter. In the first embodiment of the cylinder main body 16, the plural convex portions 16T extending in the up/down direction are protruded from the inner surface 16E1 of the second side wall 16E, and the first air passage 15 is formed between respective convex portions 16T.

However, in this second embodiment, plural second air passages 15A communicated with the opening S3 and the second space S2 are formed on the second side wall 16E of the cylinder main body 16. Described in detail, a transverse plane is formed in an inner surface 16E1 (inner surface defining the second space S2) of the second side wall 16E. The transverse plane is for example composed of plural (for example, eight) concave portions (formed by concaving the inner surface 16E1 outwardly), each having a triangle shape and extending in an up/down direction, leaving a predetermined gap therebetween. That is, the first air passages 15, that are the concave portions and the inner surface 16E1 of the second side wall 16E with which the valve body 22 contacted, are alternately formed on the inner surface 16E1 of the second side wall 16E of the cylinder main body 16.

Meanwhile, as mentioned above, when the space S2 is sectioned longitudinally through a center of the upper horizontal wall 16F, it has a profile of trapezoid shape. An angle formed by intersecting extension lines that extend upwardly from an oblique side of this trapezoid shape upwardly is for example 60. The concave portions forming the second air passage 15A have the same depth over the whole region. Accordingly, as shown in FIG. 13, an angle formed by the intersected extension lines that extend upwardly from the deepest portions of the concaved portions is also 60 degrees. However, this angle is not limited to 60 degrees, but may be 50 degrees or more to 70 degree or less. The space S2 is sufficiently has the truncated cone shape. The valve portion VB in this second embodiment is composed of a part CF2 of the lateral outer circumference part CF of the valve body 22 located between line-contact positions and does not make the line-contact, and a second communication port RB which is a cut port of the second air passage 15A. At the line-contact positions, the lateral outer circumference CF of the valve body 22 is pressed onto the inner surface 16E1 of the second side wall 16E. The second air passage 15A is obtained by cutting a plane for forming concave portions to form the second air passage, by the surface obtained by outwardly extending the surface CS (for example, the conic surface) formed by connecting the center CO of the valve body 22 and the lateral outer circumference CF. Thus, the part CF2 of the lateral outer circumference part CF not line contacting and the second air passage RB constitute the valve portion VB having an extremely small area.

The cylinder main body 16 of the second embodiment thus constituted has the operation that is the same as the operation of the first embodiment. Only especially different operations will be described. In a generally horizontal state of the fuel tank 100, during stoppage of the engine 99, the valve portion VA is closed when the increasing inner pressure in the fuel tank 100 is less than for example 5 kPa. Such disclosure is brought by the line-contact of the lateral outer circumference CF of the valve body 22 with the top portions of the plural convex portions 16T by the spring 17. As a result, no VOC gas or no fuel in the first space S1 is discharged through the second space S2 and the opening S3 to the exterior of the fuel tank 100, i.e., exterior of the filler cap 10, thanks to the second passage resistance set based on a size of area of the valve portion VB (resistance generated during passage of the fluid through the valve portion VB).

In the embodiment of (1-2), the pressure value 5 kPa is set based on the second passage resistance based on the area size of the valve portion VB, and magnitude of the urge force of the spring 17 that is more than a total weight of the valve body 22 and the rise/fall member 23.

Accordingly, in spite of generation of the VOC gas resulted from evaporation of the fuel in the fuel tank 100, and expansion of the fuel as mentioned above, discharge of the VOC gas or the fuel to the exterior of the automobile 101 is suppressed. Thus, the suppressed discharge of the fuel or the harmful VOC gas evaporated therefrom outside the automobile 101 can prevent the environmental pollution.

Also during stoppage of the engine 99, when the pressure in the fuel tank 100 reaches for example 5 kPa, the high-pressure VOC gas or the expanded fuel rises in the second air passage 15A of the second side wall 16E against the second passage resistance. The gas or fuel passes through the valve portion VB where the lateral outer circumference CF of the valve body 22 is line contacted with the inner surface 16E1 of the second side wall 16E. Accordingly, the rising VOC gas or fuel acts on the valve body 22 to depress it downwardly, so that the valve body 22 and the rise/fall member 23 are lowered against the urge force of the spring 17. Then, the excessively large pressure (including the VOC gas and the fuel) in the fuel tank 100 is discharged to the exterior of the automobile 101, through the opening 33B, the first space S1 (the gap 35), the second space S2 (including the second air passage 15A), the opening S3, the space 12S, the space 44, the air passage 43 and the gap 40, i.e., through the filler cap 10.

As result of this discharge, pressure in the fuel tank 100 immediately reaches the value of less than 5 kPa to close the valve portion VB, so that the valve mechanism portion functions as the safety valve to improve the fuel consumption and to prevent the environmental contamination.

Consumption of the fuel changes inner pressure of the fuel tank 100 to the negative pressure. The operation in this state is the same as the above operation of the first embodiment of the cylinder main body 16, so its explanation is omitted.

Meanwhile, in the first embodiment and the second embodiment of the cylinder main body 16, with setting the open pressure of the valve portion VA or VB in for example 5 kPa, in spite of the inclined state of the fuel tank 100, the valve portion VA or VB does not open as long as the pressure in the fuel tank 100 is less than 5 kPa.

In the inclined state of the fuel tank 100, the VOC gas or the fuel flows in the cylinder main body 16, which has a pressure larger than an open pressure of for example 5 kPa set in the valve portion VA or VB. Operation of such case will be described hereinafter. The valve body 22 falls downwardly from the point-contacted state of the valve body 22, or from the line-contacted state of the valve body 22 with the cylinder main body 16 by a downward stroke of the rise/fall member 23, as explained in the cylinder main body 16 of the first embodiment. In the point-contacted state, the valve body 22 is point contacted with the top portions of the plural convex portions 16T protruded from the inner surface 16E1 of the second side wall 16E of the cylinder main body 16. In the line-contacted state, the valve body 22 is line contacted with the inner surface 16E1 of the second side wall 16E. As a result of the downward falling of the valve body 11, the VOC gas or the fuel in the fuel tank 100 is discharged to the exterior of the automobile 101 through the filler cap 10.

In this case, in the second space S2 of the inclined cylinder main body 16, the valve body 22 moves onto the inner surface 16E1 located below the cylinder main body 16 to be separated away from the longitudinal central axis of the second space S2.

In view of this, for minimizing the separation of the valve body 22 away from the longitudinal central axis of the second space S2, ribs or a fences for guidance (both not shown) are provided, with keeping distance (interval) of for example 0.1 mm or more to 0.4 mm or less from the spherical valve body 22, inwardly orienting toward the inner surface 16E1 of the second side wall 16E. The ribs or the fences are formed at a lower position than the valve portion VA or VB, so that their inner side ends extend downwardly to be parallel to a central line in the up/down direction of the second space S2 having the truncated cone-shaped space.

Provision of the distance (the interval) makes easy the rising and falling of the valve body 22 guided by the inner end of the ribs or the fences, which stabilizes an opening/closing operation of the valve portion VA or VB. Meanwhile, an up/down movement stroke of the valve body 22 and the rise/fall member 23 is selected smaller than a half of the diameter of the valve body 22.

Figure 15:
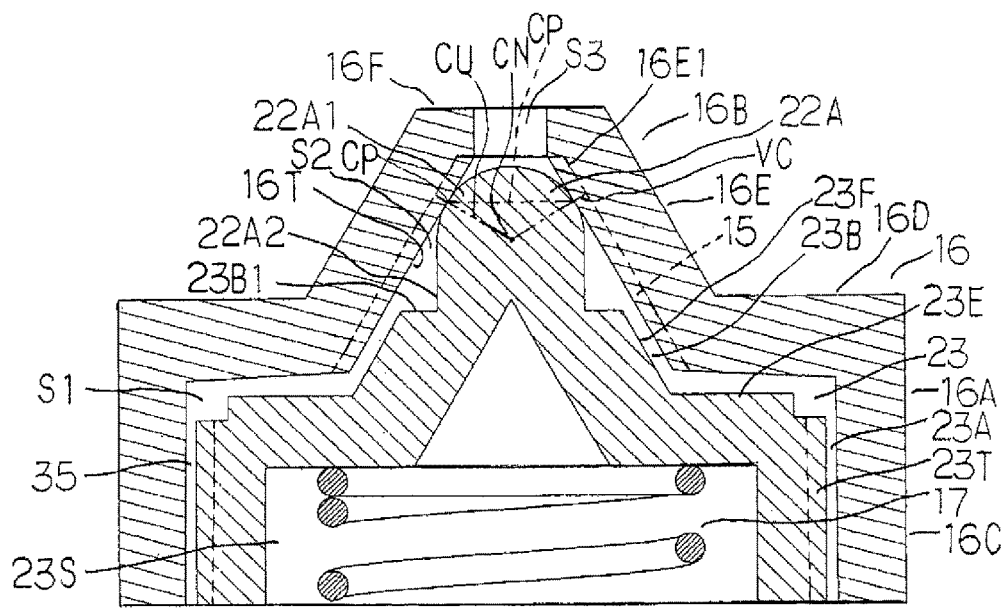
FIG. 15 is a longitudinal section view showing the principal members, of a second embodiment in which the valve body and the rise/fall members are formed integrally, in a state where a lateral outer circumference of a valve body portion is point contacted with the cylinder main body at an inner surface of the second side wall thereof.
Figure 16:
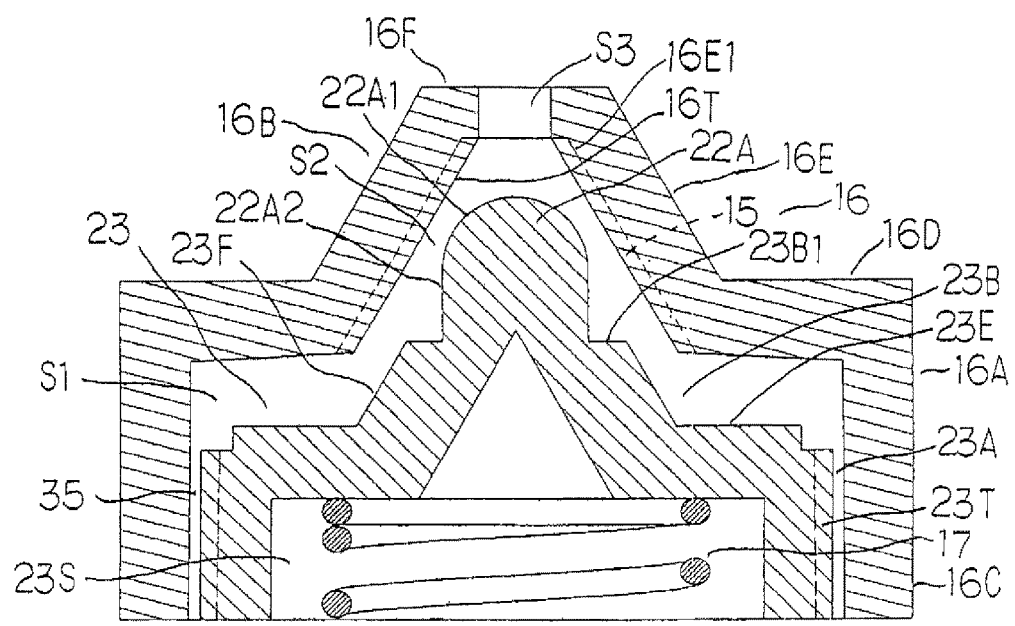
FIG. 16 is a longitudinal section view of the principal members in the state where the rise/fall member is lowered, in the second embodiment shown in FIG. 15.

(2) Second Embodiment of the Valve Body 22 and the Rise/Fall Member 23 (Refer to Valve Portion VC, FIG. 7 (D), FIG. 15 and FIG. 16)

Next, the second embodiment of the valve body 22 and the rise/fall member 23 will be described with reference to FIG. 7 (D), FIG. 15 and FIG. 16. In the first embodiment, the valve body 22 and the rise/fall member 23 are constituted of separate members, but in the second embodiment, they are constituted integrally, as described hereinafter.

The second embodiment of the valve body 22 and the rise/fall member 23 are described, which is applied to the cylinder main body 16 forming the first air passage 15 shown in FIG. 7, FIG. 9 and FIG. 10, but it can be applied to the cylinder main body 16 shown in FIG. 13 and FIG. 14 forming the second air passage 15A. The other structures are the same each other. However, when the cylinder main body 16 is formed with the second air passage 15A as shown in FIG. 13 and FIG. 14, a lateral outer circumference CP of a hemisphere portion 22A1 of a valve body portion 22A in the up/down direction thereof, for example at the ½ position ("an outer circumstance of a plane cut horizontally" referred to as "the lateral outer circumference CP of the hemisphere portion 22A1" hereinafter), to be explained latter, line contacts with the inner surface 16E1 of the second side wall 16E except the concave portions forming the second air passage 15A. With understanding the following explanation is also understood in this way, explanation is omitted for the embodiment where the second air passage 15A is formed in the cylinder main body 16.

First, the rise/fall member 23 has a generally hollow cylindrical shape with a closed end, and is composed of a lower large-diameter portion 23A, an upper small-diameter portion 23B, and the valve body portion 22A centrally formed on the upper surface of the upper wall 23B1 of the small-diameter portion 23B. The valve body portion 22A is composed of an upper generally hemisphere portion 22A1, and a lower pillar portion 22A2. When sectioned longitudinally, the valve body portion 22A shows an upper semicircular portion and a lower rectangular portion (refer to FIG. 15).

A step wall 23E located between the large-diameter portion 23A and the small-diameter portion 23B of the rise/fall member 23, and a side wall 23F of the small-diameter portion 23B do not contact with the lower horizontal wall 16D and the second side wall 16E of the cylinder main body 16. Accordingly, there are formed small gaps among them.

The urge force of the spring 17 accommodated in the large-diameter portion 23A pushes up the rise/fall member 23 upwards. As a result, the lateral outer circumference CP of the hemisphere portion 22A1 of the valve body portion 22A constituting the valve mechanism portion is pressed onto the top portions (the top portions protruded into the second space S2) of the plural convex portions 16T to make a point-contact with such top portions.

Described in detail, the lateral outer circumference CP of an upper hemisphere in the up/down direction, for example at the ½ position of the valve body portion 22A, assuming that the upper hemisphere is an upper half of a whole sphere, is point contacted with plural convex portions 16T of the second side wall 16E1 of the cylinder main body 16.

In this embodiment, the valve portion VC is composed of an outer circumference part of the lateral outer circumference CP of the valve body portion 22A located between the point-contact positions and does not make a point-contact, and a first communication port which is a cut port of the first air passage 15. At the point-contact positions, the lateral outer circumference CP of the valve body portion 22A is pressed onto the top portions of the plural convex portions 16T protruded into the inner surface 16E1 of the second side wall 16. The first communication port is obtained by cutting the inner surface 16E1 forming the first air passage 15 and the both convex portions 16T each adjacent to the inner surface 16E1, by a surface obtained by outwardly extending, more specifically, radially outwardly extending, or obliquely upwardly extending a surface CU (for example, a conic surface) formed by connecting a center CN of the valve body portion 22A outwardly assuming that valve body portion 22A is the upper half of the whole sphere and the lateral outer circumference CP.

The cylinder main body 16 of this embodiment thus composed has the operation that is the same as the operation of the first embodiment, so only different operations of which will be described briefly. In a generally horizontal state of the fuel tank 100, during stoppage of the engine 99, when the increased inner pressure in the fuel tank 100 is less than for example 5 kPa, the lateral outer circumference CP of the hemisphere portion 22A1 of the valve body portion 22A is point-contacted with the plural convex portions 16T protruded from the second side wall 16 by the spring 17, thereby closing the valve portion VC. As a result, no VOC gas or no fuel in the first space S1 is discharged through the second space S2 and the opening S3 to the exterior of the fuel tank 100, i.e., exterior of the filler cap 10, thanks to the first passage resistance (resistance generated during passage of the fluid through the valve portion) set in the first valve portion (refer to FIG. 15).

Also during stoppage of the engine 99, when the pressure in the fuel tank 100 reaches for example 5 kPa, the high-pressure VOC gas or the expanded fuel rises in the first air passage 15 of the second side wall 16E against the first passage resistance, and it passes through the valve portion VC where the lateral outer circumference CP of the valve body portion 22A is point contacted with the convex portions 16T of the second side wall 16E. Accordingly, the rising VOC gas or fuel acts to depress the rise/fall member 23 downwardly and lowers it against the urge force of the spring 17, thereby opening the valve portion VC (refer to FIG. 16). Then, the excessively large pressure (including the VOC gas and the fuel) in the fuel tank 100 is discharged to the exterior of the automobile 101, through the opening 33B, the first space S1 (the gap 35), the second space S2 (including the first air passage 15), the opening S3, the space 12S, the space 44, the air passage 43, and the gap 40, i.e., through the filler cap 10.

As a result of this discharge, pressure in the fuel tank 100 immediately reaches the value of less than 5 kPa to close the valve portion VC, so that the valve mechanism portion functions as the safety valve to improve the fuel consumption and to prevent the environmental contamination.

Meanwhile, the valve body portion 22A can be applied to the cylindrical main body 16 forming the second air passages 15A shown in FIG. 13 and FIG. 14. In this case, a valve portion is composed of the outer circumference part of the lateral outer circumference CP of the hemisphere portion 22A1 of the valve body portion 22A between the line-contact positions and does not make a line-contact, and a second communication port that is a cut port of the second air passage 15A. At the line-contact positions, the lateral outer circumference CP of the hemisphere portion 22A1 of the valve body portion 22A is pressed onto the inner surface 16E1 of the second side wall 16E of the cylinder main body 16. The second communication port is obtained by cutting the surface for forming the concave portions that form the second air passage 15A by a plane obtained by outwardly extending the surface CU (for example, the conic surface) formed by connecting the center CN of the valve body portion 22A outwardly assuming that valve body portion 22A is the upper half of the whole sphere and the lateral outer circumference CP.

In this case, when the lateral outer circumference CP of the hemisphere portion 22A1 of the valve body portion 22A is pressed onto and is line contacted with the inner surface 16E1 of the side wall 16E of the cylinder main body 16 by the spring 17, the VOC gas generated from evaporation of the fuel or the expanded fuel in the fuel 100 increase pressure in the fuel tank 100. When the increased pressure in the fuel tank 100 reaches for example 5 kPa, the VOC gas or the fuel rises in the second air passage 15A formed in the second side wall 16E against the second passage resistance based on the area size of the valve portion and passes through the valve portion. Accordingly, the rising VOC gas or fuel depresses and lowers the rise/fall member 23 against the urge force of the spring 17 to open the valve portion. Then, the excessively large pressure in the fuel tank 100 is discharged through the first space S1, the second space S2 and the opening S3 to the exterior of the fuel tank 100.

The fuel consumption changes the inner pressure of the fuel tank 100 the negative pressure. The operations of the two embodiments both using the above valve body portion 22A in the negative pressure are the same as the operation of the above embodiment where the valve body 22 is applied to the cylindrical main body 16 formed with the first air passage 15, the second air passage 15A. Accordingly, the explanation is omitted.

The pressure value 5 kPa in the above embodiment (2) is set based on the first passage resistance of the second passage resistance set up based on the area sizes of the valve portion VC or the valve portion, and magnitude of the urge force of the urge member 17 that is more than a weight of the rise/fall member 23 having the valve body portion 22A.

(3) Embodiment of the Urge Force of the Spring being Selected Less than 1.0 Time(s) of the Total Weight of the Rise/Fall Member 23 and the Valve Body 22, or the Weight of the Rise/Fall Member 23 Having the Valve Body Portion 22A (Refer to FIG. 1 to FIG. 16)

In the above all embodiments shown in FIG. 1 to FIG. 16, the urge force of the spring 17 was selected 1.0 time(s) or more e.g., 1.1 times or more to 2.0 times or less of the total weight of the rise/fall member 23 and the valve body 22 (refer to FIG. 8 and FIG. 13), or the weight of the rise/fall member 23 having the valve body portion 22A (refer to FIG. 15). Hereinafter, the embodiments where the times is selected less than 1.0, for example 0.8 or more to 0.93 or less will be described.

For the embodiment where the times is 0.8 or more to 0.93 or less, in a generally horizontal state the fuel tank 100, the rise/fall member 23 and the valve body 22, or the rise/fall member 23 having the valve body portion 22A is lowered regardless of the pressure value in the fuel tank 100 with compressing the spring 17.

Accordingly, the valve body 22 and the valve body portions 22A do not contact with the convex portions 16T on the second side wall 16E or with the inner surface 16E1 of the cylinder main body 16, thereby opening the valve portions VA, VB and VC etc. (referred to as "valve portion VA etc." hereinafter).

However, in the inclined state of the fuel tank 100, the total weight of the rise/fall member 23 and the valve body 22, or the weight which the rise/fall member 23 having the valve body portion 22A applies to the spring 17 decreases, according to this inclined angle until the inclined angle reaches 90 degrees. The spring 17 increases in an expanded length thereof. Then, when the spring 17 expands to a predetermined length, the valve body 22 or the valve body portion 22A contacts with the convex portions 16T on the second side wall 16E or the inner surface 16E1 of the cylinder main body 16.

For this reason, in the inclined state of the fuel tank 100, the fuel flows in the gap 35 between the cylinder main body 16 and the rise/fall member 23 through the opening 33B of the spring 33. Fuel also flows in the rise/fall member 23 to increase the inner pressure thereof. The increased pressure push up the rise/fall member 23 and the valve body 22, or the rise/fall member 23 having the valve body portion 22A together with the urge force of the spring 17. Consequently, the lateral outer circumferences CF, CP of an upper hemisphere of the valve body 22 and the hemisphere portion 22A1 of the valve body portion 22A in the up/down direction, e.g. at ½ position are pressed onto the top portions of the convex portions 16T for point contacting therewith (or the lateral outer circumference CF, CP is pressed onto the inner surface 16E1 of the second side wall 16E for line contacting therewith). Thus, the valve portion VA etc. are closed. The fuel in the first space S1 does not flow out to the exterior of the fuel tank 100, i.e., exterior of the filler cap 10 through the second space S2 and the opening S3, thanks to the first passage resistance or the second passage resistance set in the valve portion VA etc.

As mentioned above, in the inclined state of the fuel tank 100, the valve portion VA etc. is kept closed until the inner pressure reaches the predetermined value, for example 5 kPa, so the fuel does not flow out to the exterior of the filler cap 10.

Accordingly, with suppressing discharge of the fuel to the exterior of the fuel tank 100, the valve mechanism portion functions as the safety valve, which can improve the fuel consumption and prevent the environmental contamination.

Also in the inclined state of the fuel tank 100, when pressure of the fuel (liquid pressure) from the fuel tank 100 reaches in the liquid pressure thereof for example 5 kPa, it lowers the rise/fall member 23 and the valve body 22 against the urge force of the spring 17, thereby opening the valve portion.

Operation of the embodiment when the fuel tank 100 returns to a horizontal state (including "a generally horizontal state") will be described. In this case, the rise/fall member 23 and the valve body 22 fall with the total weight thereof, or the weight of the rise/fall member 23 having the valve body portion 22A, so that the valve portions VA etc. open regardless of the pressure value in the fuel tank 100.

The pressure value 5 kPa in the above embodiment (3) is set based on the first passage resistance or the second passage resistance set up based on the area size of the valve portion VA etc., and magnitude of the urge force of the spring 17 that is less than a total weight of the valve body 22 and the rise/fall member 23.

(4) Filler Cap 10 of the Second Embodiment (Refer to FIG. 17 to FIG. 20)

The following explanation of the embodiments (4-1) and (4-2) relates to the filler cap 10 employing the valve portion VA, but they are also applicable to the filler cap 10 using the valve portion VB.

Figure 17:
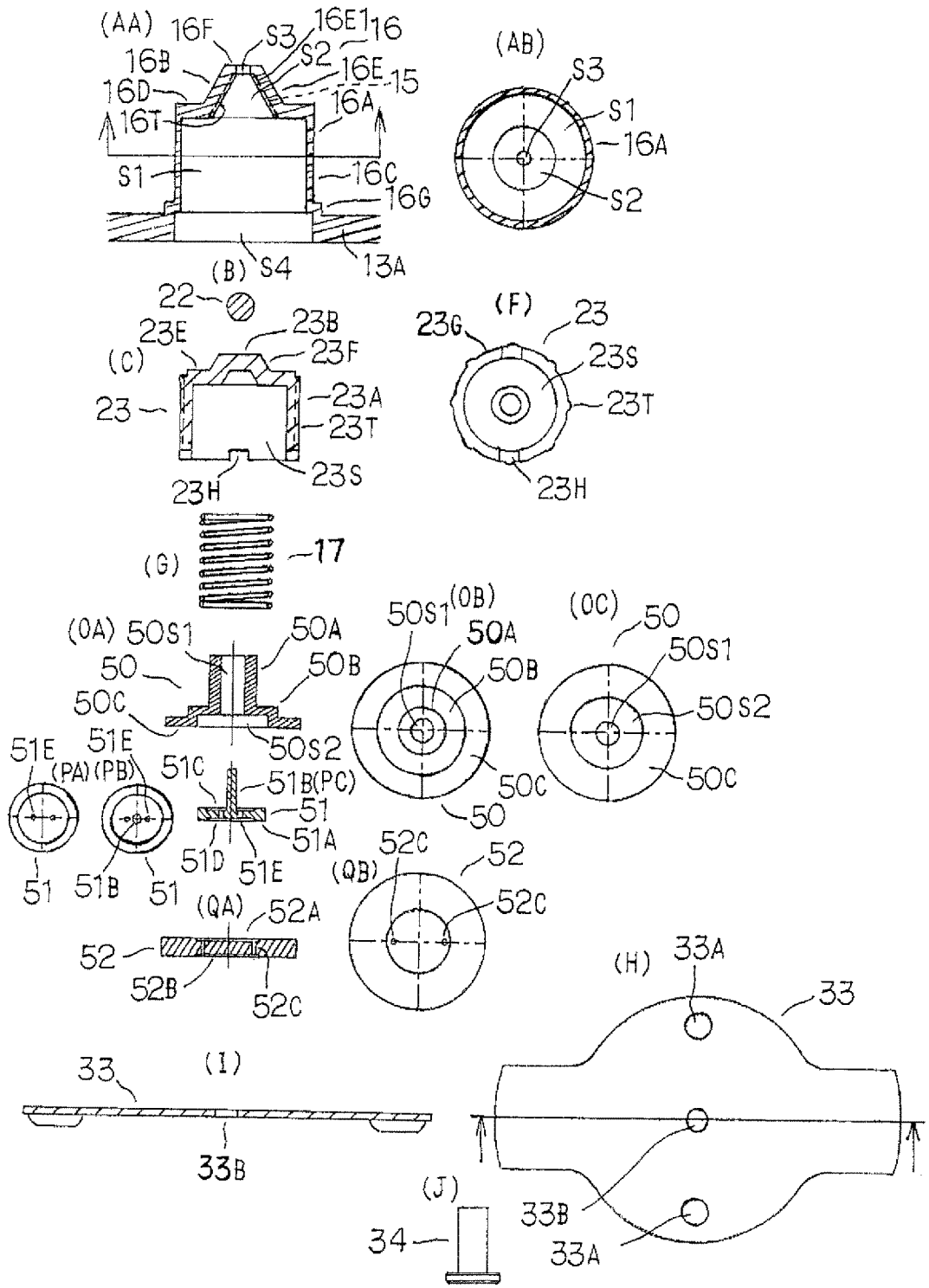
FIG. 17 is longitudinal section views, plan views and bottom views showing a cylinder main body and respective parts accommodated therein according to the second embodiment, which include a longitudinal section view of the cylinder main body (AA), a bottom view sectioned at the side wall of the cylinder main body (AB), a longitudinal section view of the rise/fall member (C), a backside view of the rise/fall member (F), a longitudinal section view of the spring (G), a longitudinal section view of a blow-up member (OA), a plan view of the blow-up member (OB), a bottom view of the blow-up member (OC), a bottom view of a first resistance member (PA), a plan view of a second resistance member (PB), a longitudinal section view of the first resistance member (PC), a longitudinal section view of the second resistance member (QA), a plan view of the second resistance member (QB), a plan view of the lid cap (H), a section view along a X-X-line in the plan view (H) of the lid cap, and a side view of the rivet (j)
Figure 18:
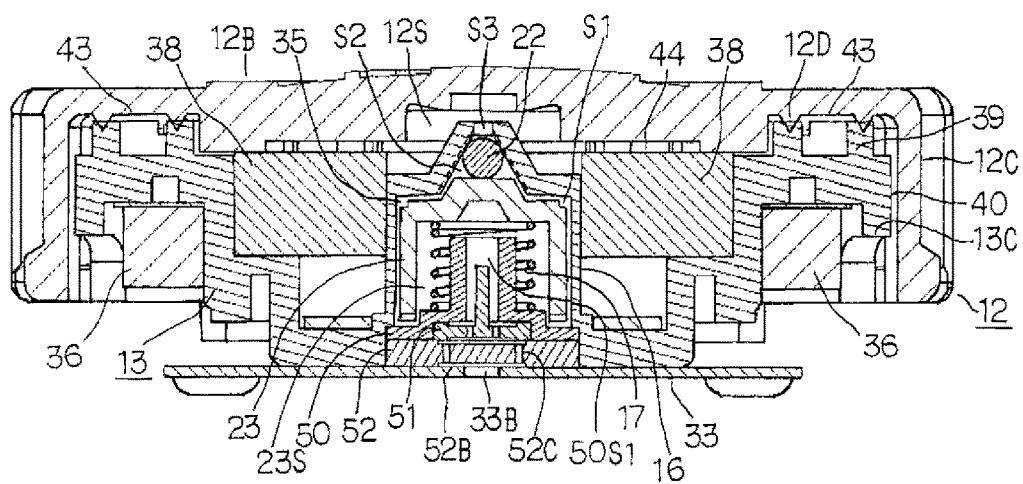
FIG. 18 is a longitudinal section view showing the filler cap according to the second embodiment in a raised state of the valve body.
Figure 19:
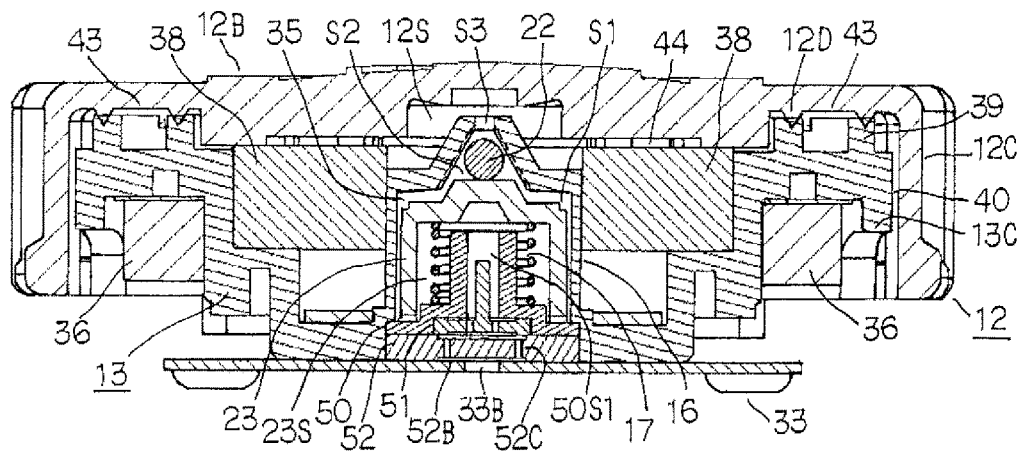
FIG. 19 is a longitudinal section view showing the filler cap according to the second embodiment in a lowered state of the valve body.

(4-1) Embodiment of the Urge Force of the Spring 17 being 1.0 Time(s) or More of the Total Weight of the Rise/Fall Member 23 and the Valve Body 22 (Refer to FIG. 17 to FIG. 19)

Next, the filler cap 10 of other embodiments will be described with reference to FIG. 17 to FIG. 20. This embodiment employs a cylinder main body 16 and members or parts accommodated in the inner cap 13 that are partially different from those shown in FIG. 7. First, the main body 16 is formed with at the lower end of the first side wall 16C thereof a step portion 16G that spreads outwardly from the bottom wall 13A of the inner cap 13. As a result, a space S4 is formed, that has a diameter larger than that of the first space S1 and is communicated with the first space S1, at the bottom wall 13A of the inner cap 13.

A blow-up member 50 having a generally hollow cylindrical shape includes a small-diameter portion 50A, a step portion 50B and a large-diameter portion 50C. The small-diameter portion 50A is loosely inserted into the spring 17 accommodated in the space 23S of the rise/fall member 23 ("inserted and arranged with keeping a gap between the interior of the spring 17 and the small-diameter portion", same as above). The step portion 50B has a diameter larger than that of the small-diameter portion 50A, and supports a lower portion of the spring 17 on an upper surface thereof. The large-diameter portion 50C has a diameter larger than that of the step portion 50B, and is equipped with an upper surface abutting onto an undersurface of the step portion 16G. Provision of the step portion 50B connecting the small-diameter portion 50A and the large-diameter portion 50C serves to form, in the blow-up member 50, a small-diameter space 50S1 and a large-diameter space 50S2 communicated with a lower portion of small-diameter space 50S1.

A first resistance member 51 is composed of a lower portion 51A having a circular shape in a planar view, and a cylindrical upper portion 51B centrally studded on an upper surface of the lower portion 51A. The lower portion 51A is accommodated (arranged), with abutting an upper surface peripheral portion of the lower portion 51A to the undersurface of the step portion 50B, in the large-diameter space 50S2 of the blow-up member 50. Here, the upper portion 51B is accommodated in the small-diameter space 50S1 with separated from an inner surface thereof defining the small-diameter space 50S1. Accordingly, when the upper portion 51B is accommodated in the small-diameter space 50S1, a transverse plane area of the small-diameter space 50S1 is small by a volume corresponding to the upper portion 51B accommodated. The resultantly increased passage resistance decreases pressure of the VOC gas or the fuel flowing into the small-diameter space 50S1.

Meanwhile, the lower portion 51A of the first resistance member 51 is formed with, on the upper surface and the undersurface thereof, circular-shaped grooves 51C and 51D in the planar view that extend to the position where the outer diameter thereof does not reach a circumferential end. The above-mentioned upper surface and the undersurface are also formed with two communication ports 51E that connect the grooves 51C and 51D. These communication ports 51E makes, due to their small transverse plane areas and the large passage resistances, the passage resistance for the VOC gas or the fuel passing large to decrease pressure of the VOC gas or the fuel flowing into the small-diameter space 50S1. Meanwhile, the groove 51C has depth of e.g., 0.2 mm, and the groove 51D has depth of e.g., 0.3 mm.

A second resistance member 52 having a circular shaped in a planar view is accommodated in the large-diameter space 50S2 of the blow-up member 50, with abutting an upper surface peripheral portion thereof to the undersurface of the step portion 50B. The second resistance member 52 is formed with, on the upper surface and the undersurface thereof, circular-shaped grooves 52A and 52B in the planar view. The grooves 52A and 52B extend to the position where the outer diameter thereof does not reach a circumferential end. The above upper surface and the undersurface are also formed with two communication ports 52C that connect the grooves 51C and 51D. These communication ports 52C make, due to their small transverse plane areas and the large passage resistances, the passage resistance for the VOC gas or the fuel passing large to decrease pressure of the VOC gas or the fuel flowing into the small-diameter space 50S1 through the first communication port 51F of the first resistance member 51. Meanwhile, the groove 52A has depth of e.g., 0.2 mm, and the groove 51D has depth of e.g., 0.3 mm. A passage resistance is formed and set by the transverse plane area of the grooves 52A and 52B, and the transverse plane area and length of the communication port 52C, which decreases the pressure of the fluid passing therethrough.

The fuel has viscosity larger than that of gas. In the inclined state of the fuel tank 100, the fuel from the fuel tank 100 flows into the small-diameter space 50S1 of the blow-up member 50 through the communication port 51E of the first resistance member 51. Even when the temperature rise of the external air increases the pressure of the fuel, the fuel pressure can be decreased thanks to the passage resistance established in the blow-up member 50, the second resistance member 52 and the first resistance member 51. Consequently, the small pressure applied to the valve portion VA (or the valve portion VB) can suppress the outflow of fuel to the exterior of the filler cap 100 through the valve portion VA (or the valve portion VB). The embodiment (4) employs the first resistance member 51, but does not necessarily employ the second resistance member 52.

The valve mechanism portion of the embodiment shown in FIG. 17 to FIG. 20 is composed of the cylinder main body 16, the rise/fall member 23, the valve body 22, the spring 17, the blow-up member 50, the first resistance member 51, and the second resistance member 52, etc.

Next, assembly of the filler cap 10 of other embodiments employing such structure will be described. This embodiment employs a cylinder main body 16 and members accommodated in the inner cap 13 that are partially different from those shown in FIG. 7. It is assumed that with inserting the cylinder main body 16 of the inner cap 13 into the hollow portion 38A of the filter 38, the inner cap 13 is accommodated in the outer cap 12 to fix the inner cap 13 and the outer cap 12.

First, for example, the rise/fall member 23 is accommodated, with placing the valve body 22 thereon, in the space of the cylinder main body 16. Then, the small-diameter portion 23B of the rise/fall member 23 enters, with placing the valve body 22 thereon into the second space S2, and also the large-diameter portion 23A enters the first space S1.

Next, the spring 17 is accommodated in the space 23S of the rise/fall member 23, and the lower portion 51A of the first resistance member 51 is accommodate in the large-diameter space 50S2 of the blow-up member 50. During such accommodation, an upper surface of the second resistance member 52 is abutted to an undersurface of the large-diameter portion 50C of the blow-up member 50, and an undersurface of the first resistance member 51, and the upper surface of the large-diameter portion 50C is abutted at a periphery thereof to the undersurface of the step portion 16G. In this way the small-diameter portion 50A of the blow-up member 50 is accommodated in the spring 17 accommodated in the space 23S of the rise/fall member 23, and the large-diameter portion 50C and the second resistance member 52 are accommodated in the space S4 formed in the bottom wall 13A of the inner cap 13. In this state, the rivet 34 is inserted into the fixed hole 13G formed in the bottom wall 13A of the inner cap 13, and the fixed hole 33A of the spring 33 to fix the spring 33 to the bottom wall 13A.

In this way, assembling of the filler cap 10 equipped with the valve mechanism portion is completed. The filler cap 10 thus assembled is attached to the fill opening 98 in use.

129 Hereinafter, an operation of the filler cap 10 in the embodiment will be described, in which the urge force of the spring 17 is selected 1.0 time(s) or more, for example 1.1 times or more to 2.0 times or less of the total weight of the rise/fall member 23 and the valve body 22.

First, in a generally horizontal state of the fuel tank 100, during stoppage of the engine 99, with increase of the air temperature, when the increased inner pressure in the fuel tank 100 is less than for example 5 kPa, the lateral outer circumference CF of the valve body 22 is pressed onto the top portions of the convex portions 16T for point contacting (or the lateral outer circumference CF is line contacted with the inner surface 16E1 of the second side wall 16E) by the urge force of the spring 17. Thus, the valve portion VA (or the valve portion VB) is closed. As a result, no VOC gas or no fuel in the first space S1 is discharged through the second space S2 and the opening S3 to the exterior of the fuel tank 100, i.e., exterior of the filler cap 10, thanks to the first passage resistance set in the valve portion VA (or the second passage resistance set in the valve portion VB).

The pressure value SkPa in the embodiment (4-1) is set based on the first passage resistance or the second passage resistance set up based on the area size of the valve portion VA or the valve portion VB, and magnitude of the urge force of the urge member 17 that is more than a total weight of the valve body 22 and the rise/fall member 23. The pressure value 5 kPa in the embodiments (5-2) and (6-1) to be described hereinafter is set likewise.

Here, the communication port 52C is formed in the second resistance member 52, the communication port 51E is formed in the first resistance member 51, and further the cylindrical upper portion 51B of the first resistance member 51 exists in the small-diameter space 5051 of the blow-up member 50, thereby increasing the passage resistance. The increased passage resistance decreases the pressure of the VOC gas or the fuel flowing into the cylindrical main body 16, which suppresses discharge of the VOC gas or the fuel to the exterior of the tank 100.

Thus, no harmful VOC gas evaporated from the fuel or no fuel is discharged to the exterior of the automobile 101, which can render the valve mechanism portion the function as the safety valve, thereby improving the fuel consumption and preventing the environmental pollution.

Also during stoppage of the engine 99, with further temperature rise of the external air, the VOC gas further increases in the generated amount thereof, or the fuel expands in the fuel tank 100 filled with the fuel or the near to this state, which results in further pressure increase in the fuel tank 100. When the inner pressure reaches for example 5 kPa, the VOC gas or the fuel from the fuel tank 100 enters the space 23S of the rise/fall member 23 through the opening 33B, the groove 52B, the communication port 52C and the groove 52A of the second resistance member 52, the groove 51D, the communication port 51E and the groove 51C of the first resistance member 51, the large-diameter space 50S2 of the blow-up member 50, and the small-diameter space 50S1 around the upper portion 51B. Here, the pressure of the VOC gas or the fuel is reduced in the liquid pressure thereof at the communication port 51E of the first resistance member 51. Simultaneously, the pressure of the VOC gas or the fuel passing through the small-diameter space 50S1 by the upper portion 51B of the first resistance member 51 around the upper portion 51B is reduced in the liquid pressure. In this way, the VOC gas or the fuel having increased in the flow velocity thereof spouts into the space 23S of the rise/fall member 23. Accordingly, the VOC gas or the fuel is discharged to the exterior of the automobile 101, through the gap between a side wall lower portion of the large-diameter portion 23A of the rise/fall member 23 and the large-diameter portion 50C of the blow-up member 50, the first space S1 (the gap 35), the second space S2 (including the first air passage 15 or the second air passage), the opening S3, the space 12S, the space 44, the air passage 43, and the gap 40, i.e., through the filler cap 10.

Namely, the high-pressure VOC gas or the expanded fuel rises in the first air passage 15 formed between respective convex portions 16T of the second side wall 16E (the second air passage 15A formed on the inner surface 16E1 of the second side wall 16E), against the first passage resistance set in the valve portion VA (or the second passage resistance set in the valve portion VB), passing through the valve portion VA (or the valve portion VB). Accordingly, the VOC gas or the fuel passes through and flows upwardly the first communication port RA (or the second communication port RB), which acts on the valve body 22 to depress it from obliquely upward to obliquely downward.

Accordingly, the valve body 22 and the rise/fall member 23 are lowered by the VOC gas or the fuel against the urge force of the spring 17, until the rise/fall member 23 abuts to the upper surface of the large-diameter portion 50C of the blow-up member 50 at the side wall lower portion of the large-diameter portion 23A of, thereby opening the valve portion VA (or the valve portion VB) (refer to FIG. 19).

When the pressure in the fuel tank 100 having reached 5 kPa or more opens the valve portion VA (or the valve portion VB) as mentioned above, the excessive pressure (including the VOC gas or the fuel) in the fuel tank 100 is discharged to the exterior of the filler cap 10 i.e., exterior of the automobile 101.

This immediately changes pressure in the fuel tank 100 to the pressure value of less than 5 kPa, and the rise/fall member 23 and the valve body 22 are raised by the urge force of the spring 17, so that the lateral outer circumference CF of the valve body 22 point contacts with the top portions of the plural convex portions 16T (or the lateral outer circumference CF of the valve body 22 line contacts with the inner surface 16E1). Thus, the valve portion VA (or the valve portion VB) is closed to realize the state as shown in FIG. 18. Thus, the valve mechanism portion functions as the safety valve, which can improve the fuel consumption and prevent the environmental contamination.

The operation for the generally horizontal state of the fuel tank 100 explained with reference to FIG. 17 to FIG. 19 can be applied to the operational explanations for the inclined state of the fuel tank 100.

That is, with setting the open pressure of the valve portion VA (or the valve portion VB) for example in 5 kPa, in spite of the inclined state of the fuel tank 100, the valve portion VA (or the valve portion VB) does not open as long as the pressure in the fuel tank 100 is less than 5 kPa. Accordingly, the valve mechanism portion functions as the safety valve, which can improve the fuel consumption and prevent the environmental contamination.

In the inclined state of the fuel tank 100, when the VOC gas or the fuel having the open pressure of 5 kPa or more flows in the cylinder main body 16, the valve body 22 falls downwardly. Specifically, the valve body 22 falls downwardly, from the point-contacted state with the top portions of the plural convex portions 16T protruded from the inner surface 16E1 of the second side wall 16E of the cylinder main body 16 (or from the line-contacted state with the inner surface 16E1 of the second side wall 16E of the cylinder main body 16) by the downward stroke of the rise/fall member 23. The VOC gas or the fuel in the fuel tank 100 is discharged to the exterior of the automobile 101 through the filler cap 10.

Figure 20:
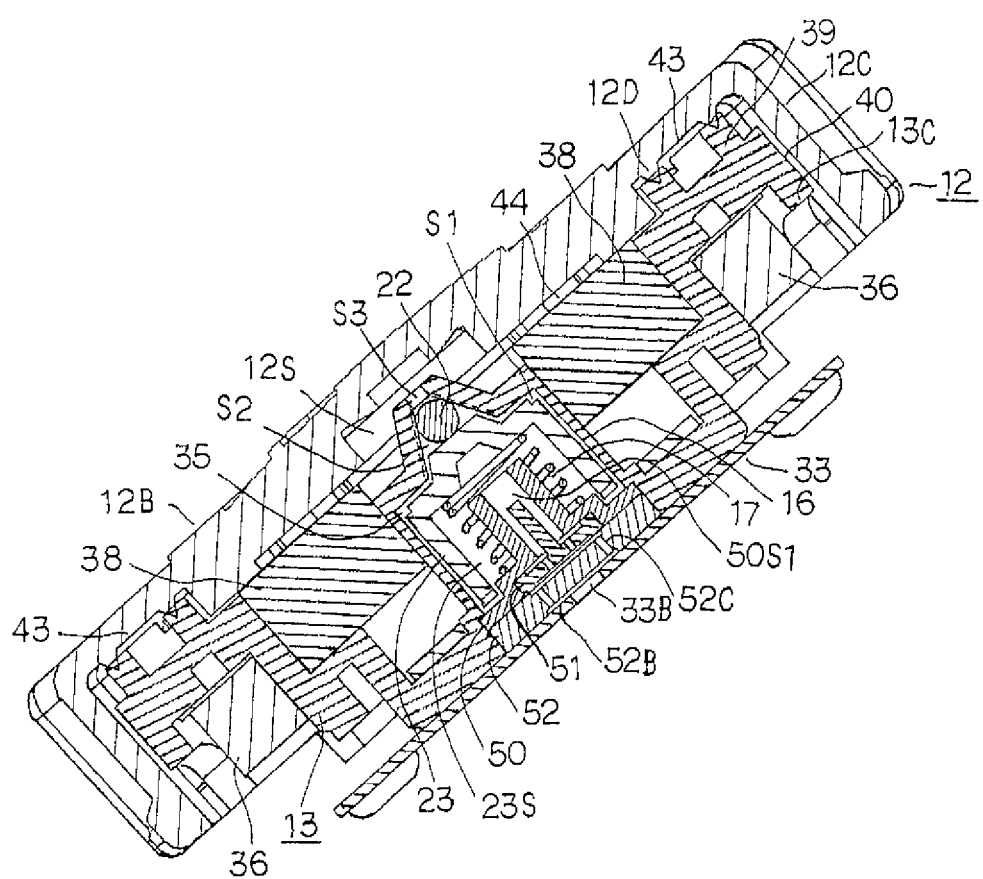
FIG. 20 is a longitudinal section view showing the filler cap according to the second embodiment in an inclined state of the valve body.

(4-2) Embodiment of the Urge Force of the Spring 17 being Less than 1.0 Time(s) of the Total Weight of the Rise/Fall Member 23 and the Valve Body 22 (Refer to FIG. 17, FIG. 19 and FIG. 20)

In the embodiments shown in FIG. 17 to FIG. 19, the urge force of the spring 17 was selected 1.0 time(s) or more e.g., 1.1 times or more to 2.0 times or less, of the total weight of the rise/fall member 23 and the valve body 22 (refer to FIG. 8 and FIG. 13). Hereinafter, the embodiments where the times is selected less than 1.0, for example 0.8 or more to 0.93 or less will be described.

In the embodiment where the times is selected 0.8 or more to 0.93 or less, in a generally horizontal state of the fuel tank 100 as shown in FIG. 19, the rise/fall member 23 and the valve body 22 are lowered with the compressing the spring 17 by the urge force less than the total weight thereof, regardless of the pressure value in the fuel tank 100.

Accordingly, the valve body 22 is not point contacted with the convex portions 16T formed on the inner surface 16E1 of the second side wall 16E (is not line contacted with the inner surface 16E1 of the second side wall 16E) of the cylinder main body 16, thereby opening the valve portion VA (the valve portion VB).

However, in the inclined state of the fuel tank 100, the total weight of the rise/fall member 23 and the valve body 22 applied to the spring 17 decreases according to this inclined angle until it reaches 90 degrees, so that the spring 17 increases in an expansion length thereof. Accordingly, with decrease of the weight applied to the spring 17, the spring 17 pushes up the valve body 22 by the urge force thereof. In the predetermined length of the spring 17, the lateral outer circumference CF of the valve body 22 is pressed onto and contacts with the top portions of the convex portions 16T on the second side wall 16E (or with the inner surface 16E1 of the second side wall 16E) of the cylinder main body 16.

Accordingly, as shown in FIG. 20, in the inclined state of the fuel tank 100, the fuel enters the space 23S of the rise/fall member 23, through the opening 33B of the spring 33, the groove 52B, the communication port 52C and the groove 52A of the second resistance member 52, and the groove 51D, the communication port 51E, the small-diameter space 50S1 around the upper portion 51B and the groove 51C of the first resistance member 51. Here, the fuel pressure is reduced at the communication port 51E of the first resistance member 51. Simultaneously, the pressure of the fuel passing through the small-diameter space 50S1 around the upper portion 51B of the first resistance member 51 is reduced by the upper portion 51B. In this way, the fuel having increased in the flow velocity thereof spouts into the space 23S of the rise/fall member 23. Accordingly, the spouted liquid pushes up the valve body 22 and the rise/fall member 23 quickly together with the urge force of the spring 17, thereby closing the valve portion VA (the valve portion VB).

The pressure value 5 kPa in the embodiment (4-2) is set based on the first passage resistance (or the second passage resistance) set up based on the area size of the valve portion VA (or the valve portion VB), and magnitude of the urge force of the spring 17 that is less than a total weight of the valve body 22 and the rise/fall member 23. This also applies to the pressure value 5 kPa in the embodiments (5-1) and (6-2) to be described in the following.

As mentioned above, in the inclined state of the fuel tank 100, the valve portion VA (or the valve portion VB) is kept closed until the inner pressure reaches the predetermined value, for example 5 kPa. Accordingly, no fuel in the first space S1 is discharged to the exterior of the fuel tank 100, i.e., exterior of the filler cap 10, through the gap between the side wall lower portion of the large-diameter portion 23A of the rise/fall member 23 and the blow-up member 50, the first space S1 (the gap 35), the second space S2 (including the first air passage 15) and the opening S3, thanks to the first passage resistance (or the second passage resistance) set in the valve portion VA (or the valve portion VB).

Accordingly, with suppressing discharge of the fuel to the exterior of the fuel tank 100, the valve mechanism portion functions as the safety valve, which can improve the fuel consumption and prevent the environmental contamination.

Also in the inclined fuel tank 100, when pressure of the fuel (liquid pressure) from the fuel tank 100 reaches for example 5 kPa, it lowers the rise/fall member 23 and the valve body 22 against the urge force of the spring 17, thereby opening the valve portion VA (or the valve portion VB).

When the fuel tank 100 returns to a horizontal state (including "a generally horizontal state"), the rise/fall member 23 and the valve body 22 fall with the total weight thereof to open the valve portion VA (or the valve portion VB) regardless of the pressure value in the fuel tank 100.

(5) Third Embodiment of the Filler Cap 10

The following explanations of the embodiments (5-1) and (5-2) relates to the filler cap 10 employing the valve portion VA, but they are also applicable to the filler cap 10 employing the valve portion VB.

Figure 21:
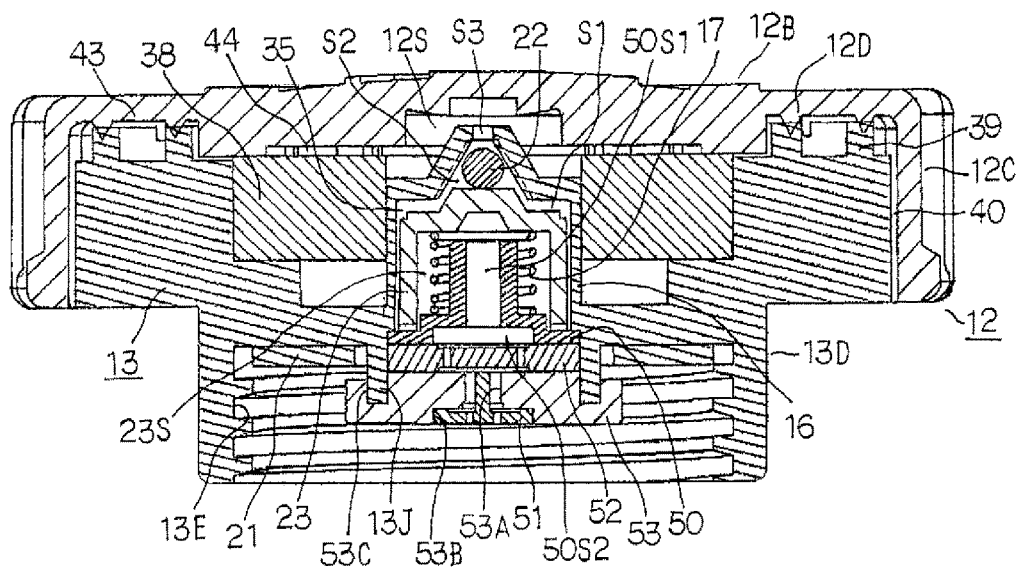
FIG. 21 is a longitudinal section view showing the filler cap according to the third embodiment in a lowered state of the valve body.
Figure 22:
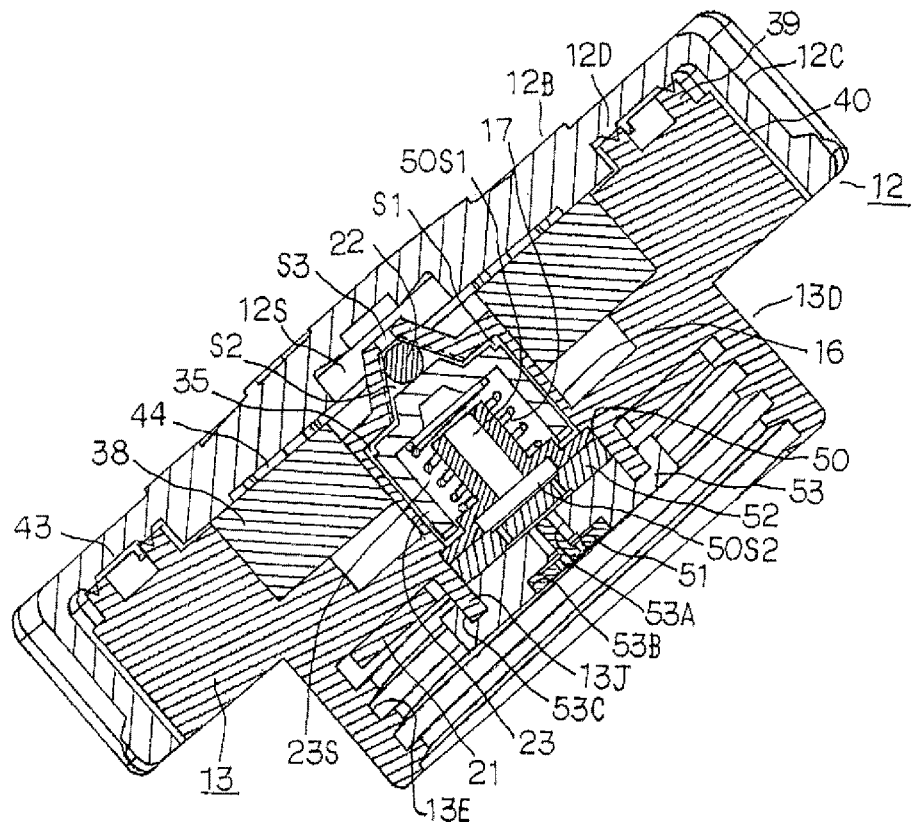
FIG. 22 is a longitudinal section view showing the filler cap according to the third embodiment in an inclined state of the valve body.

(5-1) Embodiment of the Urge Force of the Spring 17 being Less than 1.0 Time(s) of the Total Weight of the Rise/Fall Member 23 and the Valve Body 22 (Refer to FIG. 21 and FIG. 22)

Next, the other embodiments of the filler cap 10 will be described with reference to FIG. 21 and FIG. 22 by focusing on an operation resulted from an especially different structure from the embodiment shown in FIG. 17 to FIG. 20.

First, it is assumed that the inner cap 13 is accommodated, with inserting the cylinder main body 16 of the inner cap 13 into the hollow portion 38a of the filter 38, in the outer cap 12 to fix the inner cap 13 and the outer cap 12. For example, the rise/fall member 23 is, with placing the valve body 22 thereon, accommodated in the space of the cylinder main body 16. Then, the rise/fall member 23 enters the second space S2 with placing the valve body 22 on the small-diameter portion 23B thereof, and the large-diameter portion 23A of the rise/fall member 23 enters the first space S1.

Next, the spring 17 is accommodated in the space 23s of the rise/fall member 23, and an upper surface of the second resistance member 52 is abutted to the undersurface of the large-diameter portion 50c of the blow-up member 50, so that the large-diameter portion 50c and the second resistance member 52 are accommodated in a hollow cylindrical cylinder 13J hung from the bottom wall 13A of the inner cap 13 located below the step portion 16G.

A circular lid cap 53 is provided, that has small-diameter space 53A, a large-diameter space 53b communicated with a lower portion thereof at a central portion, and a ring-like engagement groove 53C in a planer view formed on the upper surface thereof. The lid cap 53 engages, in the engagement groove 53C thereof, with the cylinder 13J, so that the upper surface of lid cap 53 is abutted to the underside surface of the circumference of the second resistance member 52, for attaching the lid cap 53 to the inner cap 13.

The first resistance member 51 is attached to the lid cap 53 so that the upper portion 51B thereof enters the small-diameter space 53A of the lid cap 53, and the lower portion 51A thereof is accommodated in the large-diameter space 53B.

Meanwhile, likewise the structure shown in FIG. 12, the male screw formed on the fill opening 98 is meshed with the female screw 13E formed in an inner wall surface of an outer cylindrical portion 13D formed at the lower part of the inner cap 13. Thus, the filler cap 10 is attached to the fill opening 98.

Meanwhile, the valve mechanism portion of the embodiment shown in FIG. 21 to FIG. 22 is composed of the cylinder main body 16, the rise/fall member 23, the valve body 22, the spring 17, the blow-up member 50, the first resistance member 51, and the second resistance member 52, etc.

In the above-mentioned embodiment shown in FIG. 21 and FIG. 22, the urge force of the spring 17 is selected less than 1.0 time(s) e.g., 0.8 times or more times to 0.93 times or less of the total weight of the rise/fall member 23 and the valve body 22. Hereinafter, the operation of this embodiment will be described.

In the embodiment where the times is selected 0.8 or more to 0.93 or less, in a generally horizontal state of the fuel tank 100 as shown in FIG. 21, the rise/fall member 23 and the valve body 22 are lowered with compressing the spring 17 by the urge force less than the total weight thereof, regardless of the pressure value in the fuel tank 100. Accordingly, the valve body 22 is not point contacted with the convex portions 16T formed on the inner surface 16E1 of the second side wall 16E (is not line contacted with the inner surface 16E1 of the second side wall 16E) of the cylinder main body 16, thereby opening the valve portion VA (the valve portion VB).

However, in the inclined state of the fuel tank 100, the total weight of the rise/fall member 23 and the valve body 22 applied to the spring 17 decreases according to this inclined angle until it reaches 90 degrees, so that the spring 17 increases in an expansion length thereof. Accordingly, with decrease of the weight applied to the spring 17, the spring 17 pushes up the valve body 22 by the urge force thereof. In the predetermined length of the spring 17, the valve body 22 contacts with the convex portions 16T on the second side wall 16E (the inner surface 16E1 of the second side wall 16E) of the cylinder main body 16.

Accordingly, as shown in FIG. 22, in the inclined state of the fuel tank 100, the fuel passing through the groove 51D of the first resistance member 51 enters the small-diameter space 53A of the lid cap 53 through the groove 51 after the pressure reduction at the communication port 51E. Simultaneously, pressure of the fuel passing through the small-diameter space 53A around the upper portion 51B of the first resistance member 51 is also reduced by the upper portion 51B. The fuel passing through the groove 52B spouts, after the pressure reduction at the communication port 52C, into the space 23S of the rise/fall member 23 from the small-diameter space 50S1 passing through the groove 52A, the large-diameter space 50S2 of the blow-up member 50. Accordingly, the spouted fuel pushes up the valve body 22 and the rise/fall member 23 quickly together with the urge force of the spring 17, so that the lateral outer circumference CF of the valve body 22 is pressed onto the top portions of the convex portions 16T for point contacting (or the lateral outer circumference CF is line contacted with the inner surface 16E1 of the second side wall 16E). Thus, the valve portion VA (or the valve portion VB) is closed.

As mentioned above, in the inclined state of the fuel tank 100, the valve portion VA (or the valve portion VB) is kept closed until the inner pressure reaches the predetermined value, for example 5 kPa. Accordingly, no fuel gas in the first space S1 is discharged to the exterior of the fuel tank 100, i.e., exterior of the filler cap 10, through the gap between the side wall lower portion of the large-diameter portion 23A of the rise/fall member 23 and the blow-up member 50, the first space S1 (the gap 35), the second space S2 (including the first air passage 15 or the second air passage 15A) and the opening S3, thanks to the first passage resistance (or the second passage resistance) set in the valve portion VA (or the valve portion VB).

Accordingly, with suppressing discharge of the fuel to the exterior of the fuel tank 100, the valve mechanism portion functions as the safety valve, which can improve the fuel consumption and prevent the environmental contamination.

Also in the inclined fuel tank 100, when pressure of the fuel (liquid pressure) from the fuel tank 100 reaches for example 5 kPa, it lowers the rise/fall member 23 and the valve body 22 against the urge force of the spring 17, thereby opening the valve portion VA (or the valve portion VB).

When the fuel tank 100 returns to a horizontal state (including "a generally horizontal state"), the rise/fall member 23 and the valve body 22 descend with the total weight thereof to open the valve portion VA (or the valve portion VB) regardless of the pressure value in the fuel tank 100.

(5-2) Embodiment of the Urge Force of the Spring 17 being 1.0 Time(s) or More of the Total Weight of the Rise/Fall Member 23 and the Valve Body 22 (Refer to FIG. 21)

Next, the operation of the embodiment constructed as shown in FIG. 21 will be described, in which the urge force of the spring 17 is selected 1.0 time(s) or more, for example 1.1 times or more to 2.0 times or less, of the total weight of the rise/fall member 23 and the valve body 22.

First, in a generally horizontal state of the fuel tank 100, during stoppage of the engine 99, with increase of the air temperature, when the increased inner pressure in the fuel tank 100 is less than for example 5 kPa, the lateral outer circumference CF of the valve body 22 is pressed onto and point contacted with the top portions of the convex portions 16T (or is line contacted with the inner surface 16E1 of the second side wall 16E) by the urge force of the spring 17. Thus, the valve portion VA (or the valve portion VB) is closed. As a result, no VOC gas or no fuel in the first space S1 is discharged through the second space S2 and the opening S3 to the exterior of the fuel tank 100, i.e., exterior of the filler cap 10, thanks to the first passage resistance (or the second passage resistance) set in the valve portion VA (or the valve portion).

Here, the communication port 51E is formed in the first resistance member 51, the cylindrical upper portion 51B of the first resistance member 51 exists in the small-diameter space 53A of the lid cap 53, and the communication port 52C is formed in the second resistance member 51, thereby increasing the passage resistance. The increased passage resistance decreases the pressure of the VOC gas or the fuel flowing into the cylinder main body 16, which suppresses discharge of the VOC gas or the fuel to the exterior of the tank 100.

Thus, non-discharge of the harmful VOC gas evaporated from the fuel or the fuel to the exterior of the automobile 101 renders the valve mechanism portion the safety valve function, which results in improvement of the fuel consumption and prevention of the environmental pollution.

Also during stoppage of the engine 99, with further temperature rise of the external air, the VOC gas further increases in the generated amount thereof, or the fuel expands in the fuel tank 100 filled with the fuel or the near to this state, leading to the further pressure increase in the fuel tank 100. When the inner pressure reaches for example 5 kPa, the VOC gas or the fuel from the fuel tank 100 enters the space 13S of the rise/fall member 23 through the groove 51D, the communication port 51E and the groove 51C of the first resistance member 51, the small-diameter space 53A around the upper portion 51, the groove 52B, the communication port 52C and the groove 52A of the second resistance member 52, and the large-diameter space 50S2 and the small-diameter portion 50S1 of the blow-up member 50. The fuel or the VOC gas is discharged to the exterior of the automobile 101, through the gap between the side wall lower portion of the large-diameter portion 23A of the rise/fall member 23, and the blow-up member 50, the first space S1 (the gap 35), the second space S2 (including the first air passage 15 or the second air passage 15A), the opening S3, the space 12S, the space 44, the air passage 43, and the gap 40, i.e., through the filler cap 10.

Namely, the high-pressure VOC gas or the expanded fuel rises in the first air passage 15 (or the second the air passage 15A) formed on the second side wall 16E against the first passage resistance (or the second passage resistance) set in the valve portion VA (or the valve portion VB), passing through the valve portion VA (or the valve portion VB). Accordingly, the VOC gas or the fuel passes through and flows upwardly the valve portion VA (or the valve portion VB), which acts on the valve body 22 to depress it from obliquely upward to obliquely downward.

Accordingly, the valve body 22 and the rise/fall member 23 are lowered by the VOC gas or the fuel against the urge force of the spring 17, until the side wall lower portion of the large-diameter portion 23A of the rise/fall member 23 abuts to the upper surface of the large-diameter portion 50C of the blow-up member 50, thereby opening the valve portion VA (or the valve portion VB) (refer to FIG. 21).

When the pressure in the fuel tank 100 having reached 5 kPa opens the valve portion VA (or the valve portion VB) as mentioned above, the excessive pressure (including the VOC gas or the fuel) in the fuel tank 100 is discharged to the exterior of the automobile 101 through the filler cap 10.

This immediately changes pressure in the fuel tank 100 to the pressure value less than 5 kPa, and the rise/fall member 23 and the valve body 22 are raised by the urge force of the spring 17, so that the lateral outer circumference CF of the valve body 22 point contacts with the top portions of the plural convex portions 16T (or the similarly outer circumference CF line contacts with the inner surface 16E1 of the second side wall 16E), thereby closing the valve portion VA (or the valve portion VB). Thus, the valve mechanism portion functions as the safety valve, which can improve the fuel consumption and prevent the environmental contamination.

That is, with setting the open pressure of the valve portion VA (or the valve portion VB) for example in 5 kPa, in spite of the inclined state of the fuel tank 100, the valve portion VA (or the valve portion VB) does not open as long as the pressure in the fuel tank 100 is less than 5 kPa. Accordingly, the valve mechanism portion functions as the safety valve, which can improve the fuel consumption and prevent the environmental contamination.

In the inclined state of the fuel tank 100, when the VOC gas or the fuel having the open pressure of 5 kPa or more flows in the cylinder main body 16, the valve body 22 falls downwardly. Specifically, the valve body 22 falls downwardly from the point-contacted state with the top portions of the plural convex portions 16T protruded from the inner surface 16E1 of the second side wall 16E of the cylinder main body 16 (or from the line-contacted state with the inner surface 16E1) by the downward stroke of the rise/fall member 23. The VOC gas or the fuel in the fuel tank 100 is discharged to the exterior of the automobile 101 through the filler cap 10.

Meanwhile, the embodiment (5) employs the second resistance member 52, but employment of the first resistance member 51 is not essential.

(6) First Embodiment of the Valve Mechanism Element 60

The following explanations of the embodiments (6-1) and (6-2) relate to the valve mechanism element 60 employing the valve portion VA, but they are also applicable to the valve mechanism element 60 employing the valve portion VB.

(6-1) Embodiment of the Urge Force of the Spring 17 being 1.0 Time(s) or More of the Total Weight of the Rise/Fall Member 23 and the Valve Body 22 (Refer to FIG. 1 to FIG. 23)

The above-mentioned all embodiments shown in FIG. 1 to FIG. 22 relate to the filler cap 10 shown in FIG. 1 schematically showing the automobile 101. However, an element that is the same as this filler cap 10 can be used as the valve mechanism element 60 (refer to FIG. 23), which will be described hereinafter.

Figure 23:
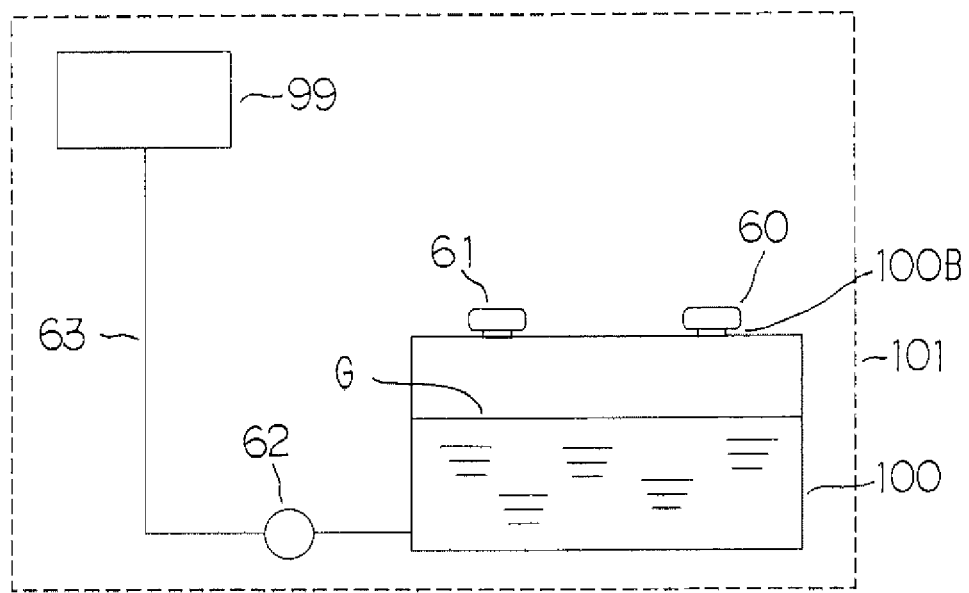
FIG. 23 is a schematic view showing an automobile applied with a valve body device for a fuel tank according to an embodiment.

First, as shown in FIG. 23, a filler cap 61 different from the filler cap 10 opens/closes the fill opening provided on the upper surface of the fuel tank 100, on pouring gasoline G as the fuel into the fuel tank 100.

That is, the interior of the fuel tank 100 and the atmosphere are communicated through the fill opening, which allows the gasoline G to pour in the fuel tank 100 through the filler cap 61. Closing the filler cap 61 interrupts the communication of the fuel tank 100 with the atmosphere through the fill opening.

The valve-mechanism element 60 is provided on the upper surface of the fuel tank 100, that is of structure the same as the filler cap 10 explained with reference to FIG. 1 from FIG. 22. A valve body device of the fuel tank 100 composed of the filler cap 61 and the valve mechanism element 60 mentioned above. The gasoline G in the fuel tank 100 is supplied to the engine 99 through the piping 63 by the pump 62.

In the valve body device thus constituted, the operation of the valve mechanism element 60 will be described, where the urge force of the spring 17 is selected 1.0 time(s) or more, for example 1.1 times or more to 2.0 times or less, of the total weight of the rise/fall member 23 and the valve body 22.

First, in a generally horizontal state or the inclined state of the fuel tank 100, during stoppage of the engine 99, in spite of increase of the inner pressure in the fuel tank 100 resulted from the increased air temperature, as long as it is less than for example 5 kPa, as mentioned above, the lateral outer circumference CF of the valve body 22 is pressed onto and point contacted with the top portions of the convex portions 16T (or the lateral outer circumference CF is line contacted with the inner surface 16E1 of the second side wall 16E) by the urge force of the spring 17. Thus, the valve portion VA (or the valve portion VB) is closed. As a result, no VOC gas or no fuel in the first space S1 is discharged through the second space S2 and the opening S3 to the exterior of the fuel tank 100, i.e., exterior of the valve mechanism element 60, thanks to the first passage resistance set in the first communication port RA (the second passage resistance set in the second communication port RB).

Also in a generally horizontal state or the inclined state of the fuel tank 100, during stoppage of the engine 99, with further temperature rise of the external air, the VOC gas further increases in the generated amount thereof, or the fuel expands in the fuel tank 100 filled with the fuel or the near to this state, which causes the further pressure increase in the fuel tank 100. When the inner pressure reaches for example 5 kPa, the VOC gas or the fuel from the fuel tank 100 rises in the first air passage 15 (or the second the air passage 15A) formed on the second side wall 16E of the cylinder main body 16, passing through the valve portion VA (or the valve portion VB). This rising VOC gas or fuel depresses the valve body 22 downwardly and the excessive pressure (including the VOC gas or the fuel) in the first space S1 is discharged to the exterior of the fuel tank 100.

(6-2) Embodiment of the Urge Force of the Spring 17 being Less than 1.0 Time(s) of the Total Weight of the Rise/Fall Member 23 and the Valve Body 22 (Refer to FIG. 1 to FIG. 23)

Next, an operation of the valve mechanism element 60 in the embodiment will be described, in which the urge force of the spring 17 is selected less than 1.0 time(s), for example 0.8 times or more to 0.93 times or less of the total weight of the rise/fall member 23 and the valve body 22.

In the embodiment where the times is selected 0.8 or more to 0.93 or less, in a generally horizontal state the fuel tank 100, the rise/fall member 23 and the valve body 22 are lowered with compressing the spring 17 by the urge force less than the total weight thereof, regardless of the pressure value in the fuel tank 100. Accordingly, the valve body 22 is not contacted with the convex portions 16T formed on the inner surface 16E1 of the second side wall 16E (or with the inner surface 16E1) of the cylinder main body 16, thereby opening the valve portion VA (or the valve portion VB).

However, when the fuel tank 100 is inclined, the weight of the rise/fall member 23 and the valve body 22 applied to the spring 17 decreases according to this inclined angle until it reaches 90 degrees. As a result, the spring 17 compressed in the horizontal state of the fuel tank 100, increases in its expansion length with increase of the inclined angle. Accordingly, with decrease of the weight applied to the spring 17, the spring 17 pushes up the valve body 22 by the urge force thereof. In the predetermined length of the spring 17, the lateral outer circumference CF of the pushed-up valve body 22 is pressed onto and point contacts with the top portions of the convex portions 16T formed on the inner surface 16E1 of the second side wall 16E (or line contacts with the inner surface 16E1) of the cylinder main body 16.

Accordingly, in the inclined state of the fuel tank 100, as mentioned above, the fuel flows in the rise/fall member 23 to increase the inner pressure thereof, until the inner pressure of the fuel tank 100 reaches to 5 kPa. The increased pressure pushes up the rise/fall member 23 and the valve body 22 together with the urge force of the spring 17, thereby closing the valve portions VA (or the valve VB). The fuel in the first space S1 does not flow out to the exterior of the fuel tank 100, i.e., the exterior of the valve mechanism element 60 through the second space S2 and the opening S3, thanks to the first passage resistance (or the second passage resistance) set in the valve portion VA (or the valve portion VB).

Accordingly, with suppressing discharge of the fuel to the exterior of the fuel tank 100, the valve mechanism portion of the valve mechanism element 60 functions as the safety valve, which can improve the fuel consumption and prevent the environmental contamination.

Also in the inclined fuel tank 100, when pressure of the fuel (liquid pressure) from the fuel tank 100 reaches for example 5 kPa, it lowers the rise/fall member 23 and the valve body 22 against the urge force of the spring 17, thereby opening the valve portion VA (or the valve portion VB).

Meanwhile, when the fuel tank 100 returns to a horizontal state (including "a generally horizontal state"), the rise/fall member 23 and the valve body 22 fall with the total weight thereof to open the valve portion VA (or the valve portion VB), regardless of the pressure value in the fuel tank 100.

(7) Second Embodiment of the Valve Mechanism Element 60 (Refer to FIG. 24 to FIG. 27)

Next, the second embodiment of the valve mechanism element 60 will be described with reference to FIG. 24 to FIG. 27, where a valve body device of the fuel tank 100 is constituted of the filler cap 61 and the valve-mechanism element 60 (refer to FIG. 23). Here, the valve body 22, the rise/fall member 23, the spring 17, the blow-up member 50, and the first resistance member 51 shown in FIG. 17 are omitted in FIG. 24, but they are employed for the valve mechanism element 60.

Figure 24:
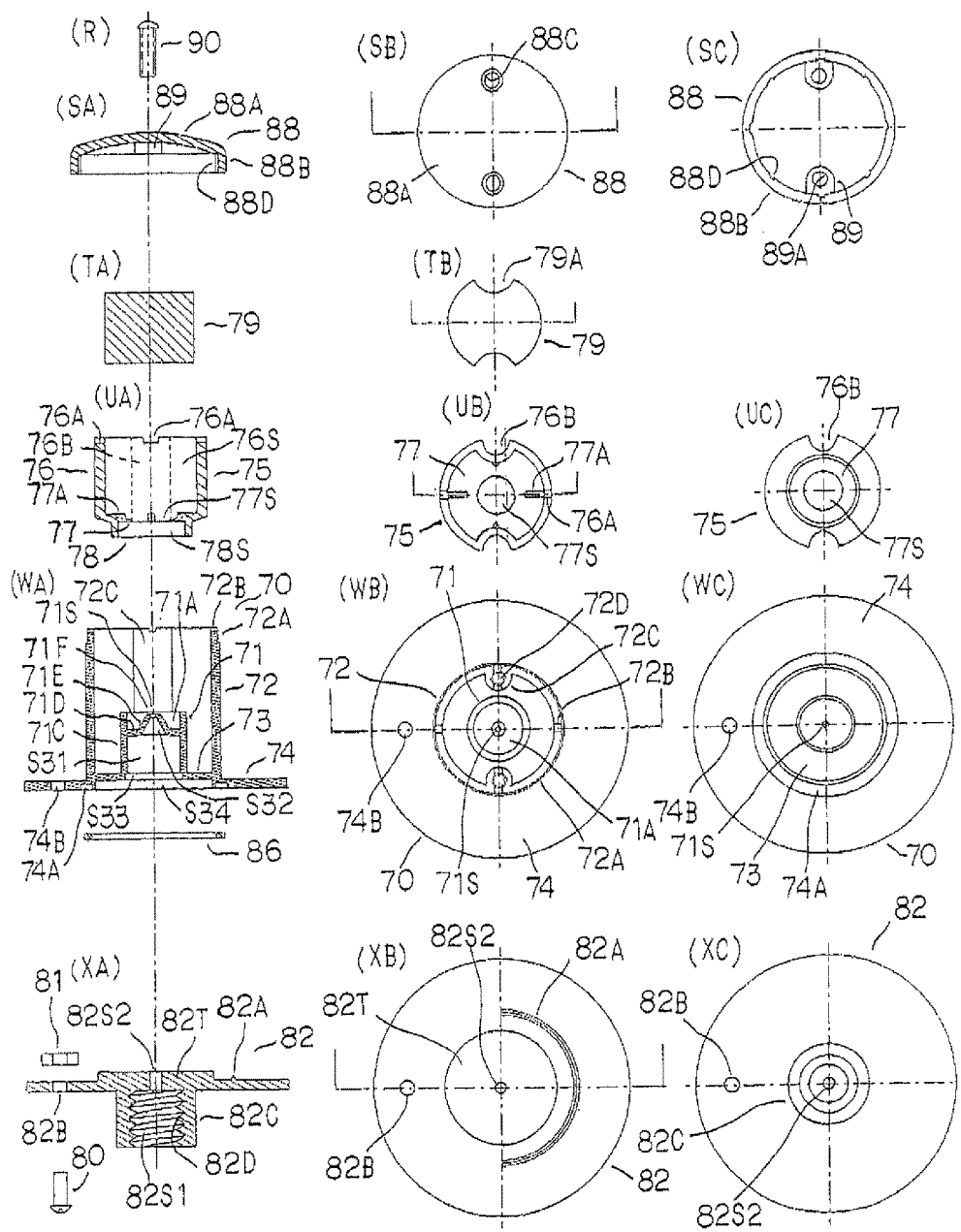
FIG. 24 is a longitudinal section views, plan views and bottom views showing the respective members in the valve body device according to the second embodiment of the valve mechanism element, which include a front view of a screw (R), a longitudinal section view of an upper cap (SA), a plan view of the upper cap (SB), a bottom view of the upper cap (SC), a longitudinal section view of a filter (TA), a plan view of the filter (TB), a longitudinal section view of an accommodation member (UA), a plan view of the accommodation member (UB), a bottom view of the accommodation member (UC), a longitudinal section view of the cylinder main body (WA), a plan view of the cylinder main body (WB), a bottom view of the cylinder main body (WC), a longitudinal section view of an attaching member (XA), a plan view of an attaching member (XB), a bottom view of the attaching member (XC)
Figure 25:
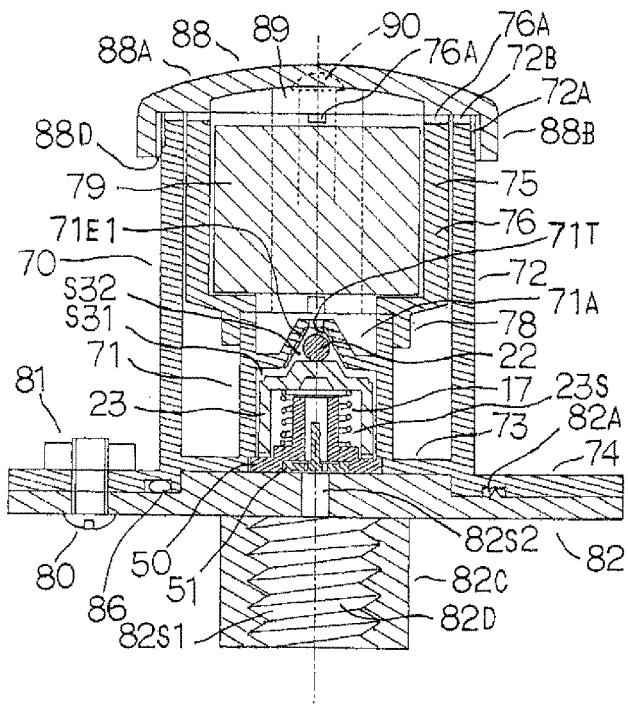
FIG. 25 is a longitudinal section view showing the valve mechanism element according to the second embodiment in a horizontal state, with the valve portion opened.
Figure 26:
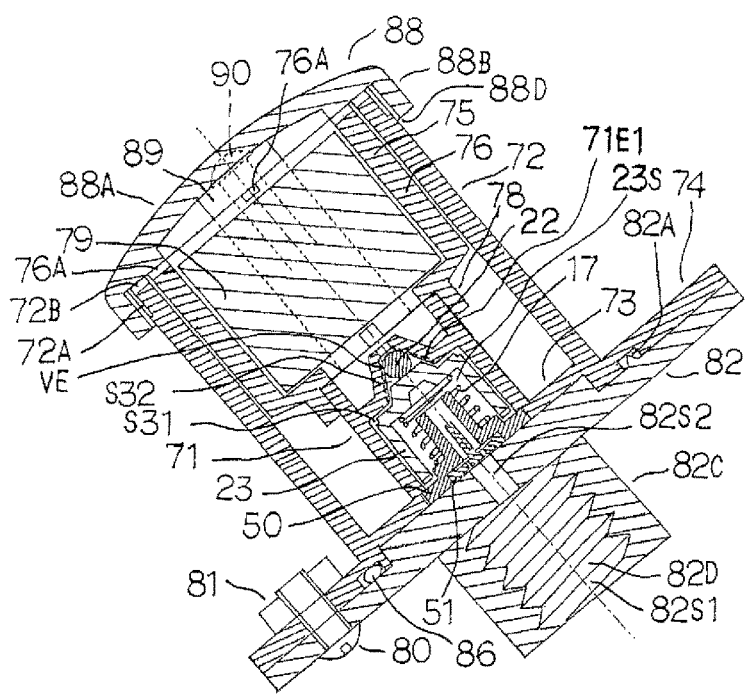
FIG. 26 is a longitudinal section view of the valve mechanism element according to the second embodiment in an inclined state, with the valve portion closed.

(7-1) Embodiment of the Urge Force of the Spring 17 being Less than 1.0 Time(s) of the Total Weight of the Rise/Fall Member 23 and the Valve Body 22 (Refer to FIG. 24 to FIG. 26)

In the following embodiment shown FIG. 24 to FIG. 26, urge force of the spring 17 is less than 1.0 time(s) or less, for example 0.8 times or more to 0.93 times or less, of the total weight of the rise/fall member 23 and the valve body 22, which will be described below.

The cylinder main body 70 is composed of an inner cylinder main body portion 71 accommodating the valve body 22 and the rise/fall member 23 therein, a hollow cylindrical outer cylinder main body portion 72 formed with a cut part 72A and openings 72B at an upper end thereof, a connection part 73 connecting the inner cylinder main body portion 71 and the outer cylinder main body portion 72, and an attaching portion 74 at a lower part of the cylinder main body portion 72. The cut part 72A is formed by removing an outer part of entire circumference to be thinned for allowing the fluid passage therethrough. The openings 72B are defined by four cut parts.

The attaching portion 74 is formed at the lower part of the inner cylinder main body portion 71 to extend outwardly with a step relative to the connection portion 73. Accordingly, the inner cylinder main body portion 71 is connected to the lower portion of the outer cylinder main body portion 72 in a generally center position of the outer cylinder main body portion 72.

The inner cylinder main body portion 71 is composed of a cylindrical first side wall 71C, a lower horizontal wall 71D internally provided at an upper part of the first side wall 71C, a second side wall 71E provided at an upper part of the lower horizontal wall 71D, and an upper horizontal wall 71F provided at an upper part of the second side wall 71E. The upper horizontal wall 71F is centrally formed with an opening 71s that communicates the space in the inner cylinder main body portion 71 and exterior of the fuel tank 100 (atmosphere). The first side wall 71C, the lower horizontal wall 71D and the second side wall 71E constructs a storage portion 71A for the fuel leaked to be described later.

The second side wall 71E has an inner surface 71E1 of which an inner diameter decreases upwardly.

Meanwhile, the inner cylinder main body portion 71 is formed, on the inner surface 71E of the second side wall 71E (the inner surface 71E forms the second space S32 to be described later), with plural convex portions 71T. The plural convex portions 71T are long in the up/down direction, and are protruded inwardly with leaving predetermined gaps. A first air passage is formed between the respective convex portions 71T.

An inner end part of the connection portion 73, i.e., a lower end part of the first side wall 71C of the inner cylinder main body portion 71 is cut and removed to form a third space S33. This third space S33 is communicated with a second space S32 of a truncated cone-shape through a first cylindrical space S31 in the inner cylinder main body portion 71. A lower part of the attaching portion 74 is removed to form a ring-like accommodation groove 74A on the undersurface thereof. A thick portion 82T of circular-shape in a planar view is centrally formed on the attaching member 82, by stepping the connection portion 73 and the attaching portion 74. With fitting the thick portion 82T into a fourth space S34 communicated with the third space S33 from a lower location, the cylinder main body 70 is fixed to the attaching member 82 using bolts 80 and nuts 81. Furthermore, the attaching portion 74 is formed with, at an intermediate position between the accommodation groove 74A and a circumferential end thereof, plural attaching holes 74B for allowing the bolt 80 to pass therethrough. That is, for fixing the cylinder main body 70 to the attaching member 82 by the bolt 80 and the nut 81, with accommodating an O-ring 86 in the accommodation groove 74A, the attaching hole 74B and the attaching hole 82B defined in the attaching member 82 are coincided. Then, the bolts 80 are inserted into the both holes, and the nuts 81 are screwed to the bolts for fixing (refer to the left half of the attaching member 82 shown in the lowest part of FIG. 24, and the left half of FIG. 25 and FIG. 26). When the fixation is performed by an ultrasonic adhesion, adhesion ribs 82A of circular shape in a planar view, studded on the upper surface of the attaching member 82, are fitted into the accommodation groove 74A. In this state, the ultrasonic adhesion is performed on the surface of the cylinder main body 70 formed with the accommodation groove 74A to fix the cylinder main body 70 to the attaching member 82 (refer to the right half of the attaching member 82 shown in the lowest part of FIG. 24, and the right half of FIG. 25, and FIG. 26).

The attaching member 82 is formed of, at the lower part, a hollow cylindrical cylinder portion 82C that communicates with a space (communication path) 82S1 communicated with a communication port 82S2 formed in the thick portion 82T thereof. A female screw 82D is formed on an inner surface of the cylindrical portion 82C. An attaching cylinder portion 100B of hollow shape is formed on the upper surface of the fuel tank 82, that is equipped with a space communicated with an opening defined on an upper surface of the fuel tank 100. Meshing the male screw formed on the outer surface of the attaching cylinder portion 100B with the female screw 82D formed in the cylindrical part 82C allows to attach the valve mechanism element 60 to the fuel tank 100.

An accommodation member 75 is arranged in the space of the outer cylinder main body portion 72, with leaving a gap between a side wall of the outer cylinder main body portion 72 and the accommodation member 75 itself. The accommodation member 75 accommodates therein a porous filter 79 such as an activated carbon filter excellent in an oil resistance, or a filter made of a urethane synthetic resin. On introducing the atmosphere into the fuel tank 100 for driving the engine 99, the filter 79 filters the atmosphere to collect of the foreign matters, such as dirt contained therein, thereby preventing its entry into the fuel tank 100. The accommodation member 75 is fitted, at a lower part thereof, to an upper part of the first side wall 71C of the inner cylinder main body portion 71 for attaching thereto. Here, the accommodation member 75 and the cylinder main body 70 are separately prepared followed by unification, but they can be originally unified.

Described in detail, the accommodation member 75 of hollow cylindrical shape includes a large-diameter portion 76 formed with a large-diameter space 76S and openings 76A, a small-diameter portion 78 formed with a small-diameter space 78S, and a connection portion 77 connecting the large-diameter part 76 and the small-diameter portion 78. The openings 76A are formed by cutting and removing the upper part at four points with leaving predetermined gaps for allowing the fluid passage. The connection portion 77 is formed with an opening 77S of diameter smaller than the small-diameter space 78S. The connection portion 77 has an upper surface inclined downwardly so that its thickness is gradually thinned from an outer location to an inner location. On an upper surface of the connection portion 77, four ribs 77A are formed with leaving predetermined intervals therebetween. The ribs 77A extend from the inner surface of the large-diameter part 76 in the length not to reach an inner end of the opening 77S of the connection part 77, and they have upper surfaces horizontally formed to support the filter 79 horizontally.

When the inner cylinder main body portion 71 the inner cylinder main body portion 71 is attached to the accommodation member 75, with abutting the upper part of the first side wall 71C of the inner cylinder main body portion 71 to the inner surface of the small-diameter portion 78 and the undersurface of the connection portion 77, the inner cylinder main body portion 71 is fitted to the accommodation member 75.

An upper lid or an upper cap 88 includes an end closed cylindrical upper wall 88A having a circular shape in a planar view and an arc shape in a longitudinally sectioned view, and a side wall 88B hung down from an circumferential end of the upper wall 88A. The upper cap 88 and related members are constructed as below. The upper cap 88 is attached to an upper parts of the outer cylinder main body portion 72 of the cylinder main body 70. In this state, the space in the accommodation member 75 is communicated with the atmosphere through the opening 76A of the accommodation member 75, the opening 72B and the removed portion 72A of the outer cylinder main body portion 72 of the cylinder main body 70, and the concave portion 88D of the upper cap 88.

At two opposed locations of the upper cap 88, guide members 89 are formed to extend from a circumference portion of an upper wall 88A inwardly. The guide member 89 is defined with, on an undersurface of the upper wall 88A, an insertion hole 89A having a diameter larger than the outer diameter of a shaft portion of a screw 90 and is smaller than an outer diameter of the head portion thereof. An insertion hole 88C is defined, which is concentric with the communication hole 89A and has a diameter larger than the communication hole 89A (larger than a head portion of the screw 90). Concave portions 88D are formed on an inner surface of the side wall 88B of the upper cap 88 every 45 degrees.

At two opposing locations on the filter 79, concave portions 79A of semi-circular in a planar view are formed in the up/down direction. The accommodation member 75 is formed on the large-diameter portion 76, two concave portions 76B of semicircular shape in a planar view and extend in the up/down direction, at two locations coinciding with a shape of the filter 79 that is accommodating. The outer cylinder main body portion 72 is formed with, at an upper part thereof, a swell portion 72C of semi-circular shape in a planar view and extending in the up/down direction, at two opposed locations coinciding with a shape of the large-diameter portion 76 of the accommodation member 75 that is accommodating. The swell portion 72C is formed with, the thread grooves 72D meshed by the screw 90.

Here, length of the spring 17 arranged in the space 23S of the rise/fall member 23 will be described. The length of the spring 17 is calculated by adding a dimension between an undersurface of the step wall 23E of the rise/fall member 23, and an upper surface of the step portion 50B of the blow-up member 50 (same for the embodiment of FIG. 17 to FIG. 27, between the undersurface of the step wall 23E and the upper surface of the spring 33 for the embodiment of FIG. 7 to FIG. 11, and between the undersurface of the step wall 23E and the upper surface of the cap 18 for the embodiment of FIG. 12) and 1.0 time(s) or more to 3.0 times or less times of the movable stroke of the rise/fall member 23. Also, the length of the spring 17 is determined, by being compressed by the total weight of the valve body 22 and the rise/fall member 23 applied thereto, in the horizontal state of the fuel tank 100. In this case, a repulsion force ("returning urge force" same as above) of the spring 17 increases, with increase of the compressed amount. Accordingly, the pressure that allows the fuel to pass through the valve portion VE flowing in the inclined state of fuel tank 100 is set up by magnitude of the repulsion force according to the compressed degree of the spring 17, and the first passage resistance set up based on the area size of the valve portion VE.

Here, the valve portion VE of the same structure as the above valve portion VA is composed of the part CF1 of the lateral outer circumference CF of the valve body 22 located between the point-contact positions and does not make a point-contact, and a first communication port which is a cut port of the first air passage 15. At the point-contact positions, the lateral outer circumference CF of the valve body 22 is pressed onto the top portions of the plural convex portions 71T protruded into the inner surface 71E1 of the second side wall 71E for point contacting. The first communication port is obtained by cutting the inner surface 71E1 forming the first air passage and the both convex portions 71T each adjacent to the inner surface 71E1, by the surface obtained by outwardly extending the surface CS (for example, the conic surface) formed by connecting the center CO of the valve body 22 and the lateral outer circumference CF.

Meanwhile, there may be valve portion that has a structure same as the valve portion VB, instead of the valve portion VE in the embodiment (7). This valve portion is composed of the part CF2 of the lateral outer circumference CF of the valve body 22 between the line-contact positions and does not make a line-contact, and a second communication port that is a cut port of the second air passage. At the line-contact positions, the lateral outer circumference CF of the valve body 22 is pressed onto the inner surface 71E of the second side wall 71E for line contacting. The second communication port is obtained by cutting the surface for forming concave portions to form the second air passage, by a plane obtained by outwardly extending the surface CS (for example, the conic surface) formed by connecting the center CO of the valve body 22 and the lateral outer circumference CF.

Accordingly, in the inclined state of the fuel tank 100, the valve body 22 and the rise/fall member 23 are pushed up by the repulsion force of the spring 17, and pressure of the flowing in fuel. As a result, the lateral outer circumferences CF of an upper hemisphere of the valve body 22 in the up/down direction, e.g. at ½ position are pressed onto the top portions of the convex portions 71T of the second side wall 71E of the inner cylinder valve body portion 71 for point contacting therewith (or onto the inner surface 71E1 of the second side wall 71E for line contacting therewith). Thus, the valve portion VE (or the valve portion of the same structure as the valve portion VB) is closed. When the set-up pressure value is reached, the pressure of the flowed fuel opens the valve portion VE (or the valve portion of the same structure as the valve portion VB).

Hereinafter, an attaching order of the valve mechanism element 60 (refer to FIG. 24 to FIG. 26) to the fuel tank 100 will be described. First, likewise the embodiment shown in FIG. 17, for example, the rise/fall member 23 is accommodated with placing the valve body 22 thereon in the space of the inner cylinder main body portion 71.

Then, the small-diameter portion 23B of the rise/fall member 23 enters with placing the valve body 22 thereon into the second space S32, and also the large-diameter portion 23A enters the first space S31.

Next, the spring 17 is accommodated in the space 23S of the rise/fall member 23, the lower portion 51A of the first resistance member 51 is accommodate in the large-diameter space 50S2 of the blow-up member 50, and the upper portion 51B is accommodated (arranged) in the small-diameter space 50S1. The large-diameter portion 50C of the blow-up member 50 is abutted at the upper peripheral portion thereof to the undersurface of the step portion 16G, and the small-diameter portion 50A of the blow-up member 50 is accommodated in the spring 17 accommodated in the space 23S of the rise/fall member 23 for loose insertion. Accordingly, the first communication port 51E of the first resistance member 51 is communicated with the small-diameter space 50S1 of the blow-up member 50 and the fuel tank 100.

Then, the cylinder main body 70 is attached to the attaching member 82. Here, for fixing the cylinder main body 70 to the attaching member 82 by the bolt 80 and the nut 81, with accommodating the O-ring 86 in the accommodation groove 74A, the attaching hole 74B of the attaching portion 74 and the attaching hole 82B of the attaching member 82 are coincided. Then, the bolts 80 are inserted into the both holes, and the nuts 81 are screwed to the bolts for fixing. When the ultrasonic adhesion is used for fixing, with fitting the adhesion ribs 82A on the upper surface of the attaching member 82 into the accommodation groove 74A, the ultrasonic adhesion is performed on the formed surface of the accommodation groove 74A for fixing.

The filter 79 is accommodated in the large-diameter space 76S of the accommodation member 75, and the upper cap 88 is attached to the outer cylinder main body portion 72 of the cylinder main body 70 to cover an upper of the accommodation member 75 and the upper part of the outer cylinder main body portion 72 from above. The screw 90 is inserted into the insertion holes 88C, 89A to mesh with the thread groove 72D formed in the swell portion 72C of the outer cylinder main body portion 72 along the concave portion 79A of the filter 79. Thus, the upper cap 88 is attached to the outer cylinder main body portion 72 of the cylinder main body 70 for fixing.

The above-mentioned procedure completes assembling of the valve mechanism element 60. On attaching the valve mechanism element 60 thus constituted to the fuel tank 100, the male screw of the attaching cylinder portion 100B formed on the outer surface of the fuel tank 100 is meshed with the female screw 82D formed on the cylindrical portion 82C of the attaching member 82.

In the embodiment where the urge force of the spring 17 is less than 1.0 time(s) or less, for example 0.8 times or more to 0.93 times or less of the total weight of the rise/fall member 23 and the valve body 22, in a generally horizontal state the fuel tank 100, the rise/fall member 23 and the valve body 22 are lowered as shown in FIG. 25 with compressing the spring 17 by the urge force less than the total weight thereof, regardless of the pressure value in the fuel tank 100.

Accordingly, the valve body 22 is not contacted with the convex portions 71T on the inner surface 71E1 of the second side wall 71E (or with the inner surface 71E1 of the second side wall 71E) of the inner cylinder main body portion 71, thereby opening the valve portion VE (or the valve portion of the same structure as the valve portion VB). However, when the fuel tank 100 inclines, the weight of the rise/fall member 23 and the valve body 22 applied to the spring 17 decreases according to this inclined angle until it reaches 90 degrees. As a result, the spring 17 compressed in the horizontal state of the fuel tank 100 increases in an expansion length thereof, with increase of the inclined angle. Accordingly, with reduction of the weight applied to the spring 17, the spring 17 pushes up the valve body 22 by the urge force thereof. In the predetermined length of the spring 17, the valve body 22 contacts with the convex portions 71T on the inner surface 71E1 of the second side wall 71E (or with the inner surface 71E1 of the second side wall 71E) of the inner cylinder main body portion 71. Accordingly, as shown in FIG. 26, in the inclined state of the fuel tank 100, the fuel enters the space 23S of the rise/fall member 23, through the space of the attaching cylinder portion 100B of the fuel tank 100, and through the space 82S1 and the communication port 82S2 of the attaching member 82, the groove 51D, the communication port 51E and the groove 51C of the first resistance member 51, the small-diameter space 50S1 around the upper portion 51B. Here, the fuel pressure is reduced at the communication port 51E of the first resistance member 51, and simultaneously, pressure of the fuel passing through the small-diameter space 50S1 around the upper portion 51B of the first resistance member 51 is reduced by the upper portion 51B. In this way, the fuel having increased in the flow velocity thereof spouts into the space 23S of the rise/fall member 23. Accordingly, the spouted fuel pushes up the valve body 22 and the rise/fall member 23 quickly together with the urge force of the spring 17, thereby closing the valve portion VE (or the valve portion of the same structure as the valve portion VB).

The pressure value 5 kPa that is a predetermined value to be described later in the embodiment of (7-1) is set based on the first passage resistance (or the second passage resistance) set based on the area size of the valve portion VE (or the valve portion of the same structure as the valve portion VB), and magnitude of the urge force of the spring 17 that is less than a total weight of the valve body 22 and the rise/fall member 23.

As mentioned above, in the inclined state of the fuel tank 100, the valve portion VE (or the valve portion of the same structure as the valve portion VB) is kept closed until the inner pressure reaches the predetermined value, for example 5 kPa. As a result, no fuel in the first space S31 of the inner cylinder main body portion 71 enters into the large-diameter space 76S of the accommodation member 75 through the opening 71S of the upper horizontal wall 71F. Accordingly, no fuel is discharged to the exterior of the fuel tank 100, i.e., exterior of the valve mechanism element 60, thanks to the first passage resistance (or the second passage resistance) set in the valve portion VE (or the valve portion of the same structure as the valve portion VB).

Accordingly, with suppressing discharge of the fuel to the exterior of the fuel tank 100, the valve mechanism portion of the valve mechanism element 60 functions as the safety valve, which can improve the fuel consumption and prevent the environmental contamination.

Also in the inclined fuel tank 100, when pressure of the fuel (liquid pressure) from the fuel tank 100 reaches for example 5 kPa, it lowers the rise/fall member 23 and the valve body 22 against the urge force of the spring 17, thereby opening the valve portion VA (or the valve portion of the same structure as the valve portion VB). Thus, the fuel flow in, through the opening 71S of the inner cylinder main body portion 71, the storage portion 71A of the inner cylinder main body portion 71, the small space 78S and the large-space 76S of the accommodation member 75.

For this reason, the filter 79 in the large-diameter space 76S absorbs (takes in) the fuel in a space inside the filter 79. However, the fuel of amount larger than an absorbable amount flow to the exterior of the valve mechanism element 60, through the opening 76A of the accommodation member 75, the opening 72B and the removed portion 72A of the outer cylinder main body portion 72 of the cylinder main body 70, and the concave portion 88D of the upper cap 88.

When the fuel tank 100 returns to a horizontal state (including "generally horizontal state"), the valve body 22 and the rise/fall member 23 fall by the weight thereof with compressing the spring 17, thereby opening the valve portion VE (or the valve portion of the same structure as the valve portion VB). The fuel absorbed into the filter 79 is guided to the storage portion 71A via a direct drip by its own weight or through the connection portion 77 having an upper surface inclined inwardly. When the inner pressure of the fuel tank 100 changes to the negative pressure with the fuel consumption by the engine 99, while permitting flow-in of the atmosphere through the concave portion 88D of the upper cap 88, the removed portion 72A and the opening 72B of the outer cylinder main body portion 72, and the opening 76A of the accommodation member 75, the fuel absorbed into the filter 79 is guided to the storage portion 71A. As mentioned above, the fuel stored in the storage portion 71A is returned, by its own weight or due to fuel consumption, to the fuel tank 100 together with the atmosphere, when the pressure in the fuel tank 100 changes to the negative pressure by the fuel consumption by the engine 99. In this way, the filter 79 is reproduced to the state before absorbing the fuel.

When the urge force of the spring 17 is selected less than 1.0 time(s) of the total weight of the rise/fall member 23 and the valve body 22, the valve mechanism element 60 operates as follow. In the generally horizontal state of the fuel tank 100, the fuel in the fuel tank 100 may generate an undulation by vibration, resulting in the increased fuel pressure. Even in this case, the fuel pressure reduced by the communication port 51E of the first resistance member 51, and the small-diameter space 50S1 of the blow-up member 50 that accommodates the upper part 51B of the first resistance member 51 thereon. Further, the fuel flowing out of the opening 71S upwardly is absorbed into the filter 79, if any. In this way, flow-out of the fuel to the exterior of the valve mechanism element 60 is suppressed. Even in the above-mentioned embodiment (6-2), the liquid is reduced in its liquid pressure by the first resistance member 51 or the second resistance member 52, which similarly suppress the fuel flow-out to the exterior of the valve mechanism element 60.

Figure 27:
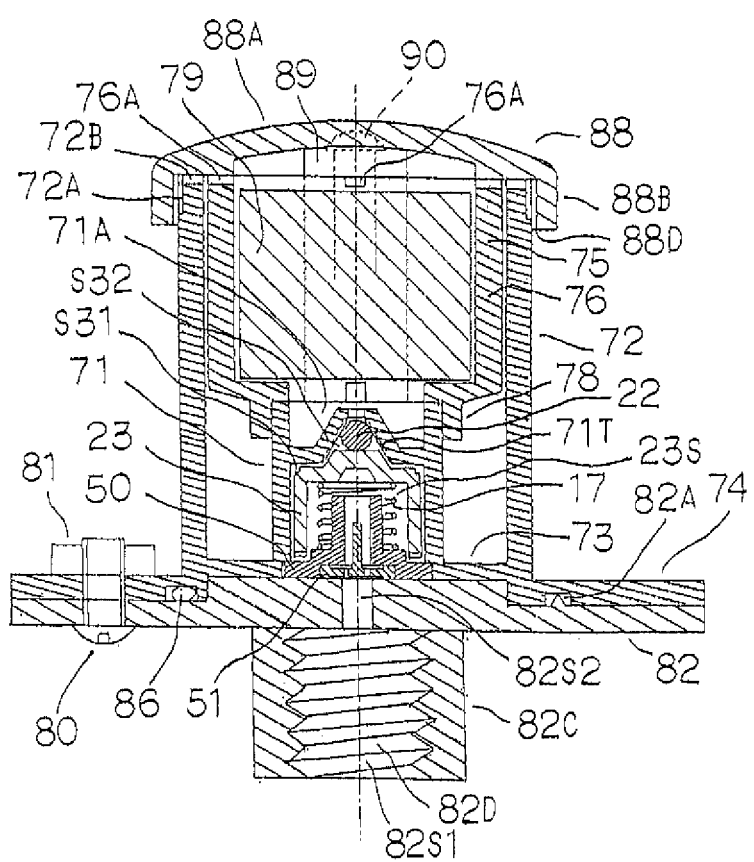
FIG. 27 is a longitudinal section view of the valve mechanism element according to the second embodiment in a horizontal state, with the valve portion closed.

(7-2) Embodiment of the Urge Force of the Spring 17 being 1.0 Time(s) or More of the Total Weight of the Rise/Fall Member 23 and the Valve Body 22 (Refer to FIG. 24 and FIG. 27)

In the following embodiment shown in FIG. 27, the upper surface of the spring 17 is 1.0 time(s) or more, for example 1.1 times or more to 2.0 times or less of the total weight of the rise/fall member 23 and the valve body 22, as described below.

First, in a generally horizontal state or the inclined state of the fuel tank 100, during stoppage of the engine 99, in spite of increase of the inner pressure in the fuel tank 100 resulted from the increased air temperature, as long as it is less than for example 5 kPa, as mentioned above, the lateral outer circumference CF of the valve body 22 is point contacted with the top portions of the convex portions 71T formed on the inner surface 71E1 of the second side wall 71E of the inner cylinder main body portion 71 (or similarly the lateral outer circumference CF is line contacted with the inner surface 71E1 of the second side wall 71E) by the urge force of the spring 17. Thus, the valve portion VE (or the valve portion of the same structure as the valve portion VB) is closed. As a result, no VOC gas or no fuel in the first space S31 is discharged through the second space S32 and the opening 71S to the exterior of the fuel tank 100, i.e., exterior of the valve mechanism element 60, thanks to the first passage resistance (or the second passage resistance) (refer to FIG. 27).

The pressure value 5 kPa that is a predetermined value to be described later in the embodiment (7-2) is set based on the first passage resistance (or the second passage resistance) set up based on the area size of the valve portion VE (or the valve portion of the same structure as the valve portion VB), and magnitude of the urge force of the spring 17 that is more than a total weight of the valve body 22 and the rise/fall member 23.

Also in a generally horizontal state or the inclined state of the fuel tank 100, during stoppage of the engine 99, with further temperature rise of the external air, the VOC gas further increases in the generated amount thereof, or the fuel expands in the fuel tank 100 filled with the fuel or the near to this state, which causes the further pressure increase in the fuel tank 100. When the inner pressure reaches for example 5 kPa, the VOC gas or the fuel from the fuel tank 100 rises in the first air passage (or the second the air passage) formed on the inner surface 71E1 of the second side wall 71E of the inner cylinder main body portion 71, passing through the valve portion VE (or the valve portion of the same structure as the valve portion VB). This rising VOC gas or fuel lowers the valve body 22 and the rise/fall member 23 downwardly against the urge force of the spring 17, thereby opening the valve portion VE (or the valve portion of the same structure as the valve portion VB). Accordingly, the VOC gas or the fuel flows in, through the opening 71S of the inner cylinder main body portion 71, to the storage portion 71A of the inner cylinder main body portion 71, the small space 78S and the large space 76S of the accommodation member 75.

In this way, the VOC gas is discharged to the exterior of the valve mechanism element 60 through the filter 79 in the large-diameter space 76S, and through the opening 76A of the accommodation member 75, the opening 72B and the removed portion 72A of the outer cylinder main body portion 72 of the cylinder main body 70, and the concave portion 88D of the upper cap 88. The fuel is absorbed in the inner space of the filter 79 located in the large-diameter space 76S. Here, the fuel of amount larger than an absorbable amount is discharged to the exterior of the valve mechanism element 60, through the opening 76A of the accommodation member 75, the opening 72B and the removed portion 72A of the outer cylinder main body portion 72 of the cylinder main body 70, and the concave portion 88D of the upper cap 88. That is, the excessive pressure of the fluid (the VOC gas and the fuel) from the fuel tank 100 is discharged to the exterior of the valve mechanism element 60.

When the inner pressure of the fuel tank 100 reaches the pressure value of less than 5 kPa resulted from discharge of the VOC gas or the fuel, the rise/fall member 23 and the valve body 22 are raised by the urge force of the spring 17. As a result, the lateral outer circumference CF of the valve body 22 point contacts with the plural convex portions 71T (or similarly the lateral outer circumference CF line contacts with the inner surface 71E1 of the second side wall 71E), thereby closing the valve portion VE (or the valve portion of the same structure as the valve portion VB). Thus, the valve mechanism portion functions as the safety valve, which can improve the fuel consumption and prevent the environmental contamination.

In the closed state of the valve portion VE (or the valve portion of the same structure as the valve portion VB), when the fuel tank 100 is in generally horizontal state, the fuel absorbed into the filter 79 is guided to storage portion 71A by the direct drip with its own gravity, or via the connection portion 77 having the upper surface inclined inwardly. The inner pressure of the fuel tank 100 changes to the negative pressure by consumption of the fuel for driving the engine 99. Here, while permitting the atmosphere to flow in the fuel tank 100 through the concave portion 88D of the upper cap 88, the removed portion 72A and the opening 72B of the outer cylinder main body portion 72, and the opening 76A of the accommodation member 75, the fuel absorbed into the filter 79 is guided to the storage portion 71A. As mentioned above, when the fuel consumption for driving the engine 99 changes the pressure in the fuel tank 100 to the negative pressure, the fuel stored in the storage portion 71A by its own gravity or with its consumption returns to the fuel tank 100 together with the atmosphere. In this way, the filter 79 is reproduced to the state before absorbing the fuel.

Meanwhile, the valve mechanism element 60 of the embodiments (7-1) and (7-2) can also be used as the above-mentioned filler cap 10

(8) Others

In all the above-mentioned embodiments, the attaching method or mechanism of the filler cap 10 or the valve mechanism element 60 to the fuel tank 100 have been explained by employing the screw or the spring 33. However, the screw or the spring 33 does not limit the attaching method or mechanism. The valve-mechanism element 60 may be attached to the fuel tank 100 directly, or attached indirectly via a connection member such as a hose, without requiring any specific attaching method or the structure.

In all the embodiments mentioned above, the valve portion VA, VB, VC and/or VE is the narrowest opening among the possible openings that are formed between the lateral outer circumference of the valve body 22 or the valve body portion 22A, and the inner surface 16E1 of the cylinder main body 16 (including the convex portions or the concave portions) or the inner surface 71E1 of the inner cylinder main body portion 71 (including the convex portions or the concave portions).

That is, in all the embodiments mentioned above, the valve portion VA, VB and/or VE is composed of
(a) the part of the lateral outer circumference CF of the valve body 22 (or the part of the lateral outer circumference CP of the hemisphere portion 22A1 of the valve body portion 22A) located between the point-contact positions on the rise/fall member 23 where the lateral outer circumference CF of the valve body 22 (or the lateral outer circumference CP of the hemisphere portion 22A1) is pressed onto the plural convex portions 16T, 71T, that does not make a point-contact, or
(b) the part of the lateral outer circumference CF of the valve body 22 (or the part of the lateral outer circumference CP of the hemisphere portion 22A1) located between line-contact positions on the rise/fall member 23 where the lateral outer circumference CF of the valve body 22 (or the lateral outer circumference CP of the hemisphere portion 22A1) is pressed onto the inner surface 16E1, 71E1 of the second side wall 16E, 71E, that does not make the line-contact, and
(c) the first communication port which is the cut port of the first air passage obtained by cutting the inner surface 16E1, 71E1 and the both convex portions 16T, 71T each adjacent to the inner surface 16E1, 71E1 forming the first air passage, so that among openings formed between the part of the lateral outer circumference CF not point contacting (the part of the lateral outer circumference CP not point contacting) and the inner surface 16E1, 71E1 and both adjacent convex portions, the narrowest opening is formed, or
(d) the second communication port which is the cut port of the second air passage by cutting a plane for forming concave portions to form the second air passage, so that among openings formed between the part of the lateral outer circumference CF not line contacting (the part of the lateral outer circumference CP not line contacting) and the inner surface 16E1, 71E1, the narrowest opening is formed.

Meanwhile, in all the embodiments explained above, the fuel tank 100 may be subjected to a heat insulation processing to suppress increase of the inner pressure. The filler cap 10 or the valve mechanism element 60 further suppress, when combined with such fuel tank, the discharge of the VOC gas or the fuel to the exterior of the fuel tank 100, leading to improvement of the fuel consumption and prevention of the environmental contamination. Such suppressed discharge may also meet with of examining method in California, U.S.A.

According to the above-mentioned embodiment, the filler cap or the valve mechanism element 60 for the fuel tank can be provided, that can further prevent the environmental pollution and can improve the fuel consumption, compared with the technology shown in the above-mentioned patent documents 1 and 2, without discharging the fuel or the harmful VOC gas evaporated therefrom externally. Hereinbefore, the embodiments have been explained, but a person skilled in the art may conceive various alternation, corrections or modification based on the above-mentioned explanation. The embodiment contains above-mentioned various alternative examples, corrected examples, or modified examples without deviating from the scope of the embodiment.

EXPLANATION OF REFERENCE 10 filler cap
12 outer cap
13 inner cap
15 first air passage
15a second air passage
16 cylinder main body
16E1 inner surface
16T convex portion
17 spring
22 valve body
23 rise/fall member
23A large-diameter portion
23B small-diameter portion
23s space
24, 25 air passage
50 blow-up member
50S1 small-diameter space
50S2 large-diameter space
51 first resistance member
51E communication port
52 second resistance member
52c communication port
60 valve mechanism element 60
61 filler cap
70 cylinder main body
71 inner cylinder main body portion
71A storage portion
71E second side wall
71S opening
72 outer cylinder main body portion
73 connection portion
74 attaching portion
75 accommodation member
79 filter
82 attaching member
98 fill opening
100 fuel tank
S1 first space
S2 second space
S3 opening
VA, VB, VE valve portion
RA first communication port
RB second communication port

What is claimed is:

1. A filler cap configured to be attached to a fuel tank, the filler cap comprising:
a cap main body including an outer cap and an inner cap,
an air passage communicating an interior and an exterior of the fuel tank, and
a valve mechanism portion disposed in the air passage, the valve mechanism portion including:
a cylinder main body centrally disposed inside the inner cap, the cylinder main body being formed with a cylindrical first space communicating with the interior of the fuel tank, a second space of truncated cone shape communicating with the first space, and an opening communicating with the second space and with the exterior of the fuel tank at an upper surface, the cylinder main body being formed with, on an inner surface forming the second space, a plurality of convex portions extending in an up/down direction and protruding inwardly, the plurality of convex portions being spaced apart at intervals from one another forming a first air passage between respective convex portions, or on the inner surface, a plurality of concave portions extending in the up/down direction and spaced apart at intervals from one another forming a second air passage;
a rise/fall member with a hollow cylindrical shape and having a closed upper surface and an opened lower surface, the rise/fall member having a large-diameter portion at a lower part and being accommodated in the first space, and the rise/fall member having a small-diameter portion of a truncated cone shape in an outer profile at an upper part and being accommodated in the second space;

a spherical valve body disposed on an upper surface of the small-diameter portion of the rise/fall member, a lateral outer circumference of the valve body contacting at a point with the plurality of convex portions protruding to the inner surface of the cylinder main body forming the second space, or the lateral outer circumference contacting on a line with the inner surface of the cylinder main body forming the second space; and an urge member disposed in a space of the large-diameter portion of the rise/fall member, the urge member being configured to: push up the rise/fall member such that the lateral outer circumference of the valve body disposed on the small-diameter portion is pressed onto the plurality of convex portions in order to urge a point-contact therewith, or push up the rise/fall member such that the lateral outer circumference of the valve body disposed on the small-diameter portion is pressed onto the inner surface of the cylinder main body in order to urge a line-contact therewith, wherein:

a valve portion includes:
  (a) a part of the lateral outer circumference of the valve body on the rise/fall member located between portions of point-contact and not being portions of point-contact when the lateral outer circumference of the valve body is pressed onto the plurality of convex portions, or (b) a part of the lateral outer circumference of the valve body on the rise/fall member located between portions of line-contact and not being portions of line-contact when the lateral outer circumference of the valve body is pressed onto the inner surface, and
  (c) a first communication port being a cut port of the first air passage obtained by cutting the inner surface and the convex portions adjacent to the inner surface forming the first air passage by a surface obtained by outwardly extending from the lateral outer circumference a surface formed by connecting a center of the valve body and the lateral outer circumference, or (d) a second communication port being a cut port of the second air passage obtained by cutting a plane forming the concave portions to form the second air passage by the surface obtained by outwardly extending from the lateral outer circumference the surface formed by connecting the center of the valve body and the lateral outer circumference, and in a state where the lateral outer circumference of the valve body on the rise/fall member is pressed by the urge member against the convex portions to contact on the point, or in a state where the lateral outer circumference of the valve body on the rise/fall member is pressed by the urge member against the inner surface of the cylinder main body to contact on the line, with an increase of pressure in the fuel tank due to an evaporated gas resulting from vaporized fuel in the fuel tank, when the pressure in the fuel tank reaches a predetermined pressure value set based on a first passage resistance or a second passage resistance set up based on an area size of the valve portion constituted of the part of the lateral outer circumference that is not a portion of point contact, or the part of the lateral outer circumference that is not line contacted and the first communication port or the second communication port, and a magnitude of a pressing force of the urge member being more than a total weight of the valve body and the rise/fall member, the evaporated gas rises in the first air passage against the first passage resistance, or in the second air passage against the second passage resistance, passing through the valve portion, and the rising evaporated gas lowers the valve body and the rise/fall member downwardly against the pressing force of the urge member, and opens the valve portion to discharge an excessively large pressure in the fuel tank to the exterior of the fuel tank through the first space, the second space and the opening.

\* \* \* \* \*